(12) United States Patent
Iwamatsu et al.

(10) Patent No.: US 6,487,236 B1
(45) Date of Patent: Nov. 26, 2002

(54) METHOD AND APPARATUS FOR ACHIEVING DEMODULATION IN RADIO COMMUNICATIONS SYSTEM USING M-SEQUENCE ORTHOGONAL MODULATION

(75) Inventors: Takanori Iwamatsu, Kawasaki (JP); Mamoru Fukui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/358,619

(22) Filed: Jul. 21, 1999

(30) Foreign Application Priority Data

Sep. 30, 1998 (JP) .............................. 10-278384

(51) Int. Cl.[7] .......................... H04B 15/00; H04K 1/00; H04L 27/30
(52) U.S. Cl. ...................... 375/148; 375/144; 375/150; 375/142
(58) Field of Search ................................ 375/140, 141, 375/142, 144, 147, 148, 150

(56) References Cited

U.S. PATENT DOCUMENTS

| | | | |
|---|---|---|---|
| 5,581,575 A | * 12/1996 | Zehavi et al. | 375/200 |
| 6,108,324 A | * 8/2000 | Brown et al. | 370/335 |
| 6,229,841 B1 | * 5/2001 | Levin et al. | 375/147 |
| 6,295,311 B1 | * 9/2001 | Sun | 375/147 |
| 6,414,985 B1 | * 7/2002 | Furukawa et al. | 375/142 |

FOREIGN PATENT DOCUMENTS

JP 11-88293 3/1999

* cited by examiner

Primary Examiner—Phuong Phu
(74) Attorney, Agent, or Firm—Katten Muchin Zavis Rosenman

(57) ABSTRACT

An apparatus for achieving demodulation in a radio communications system using M-sequence orthogonal modulation capable of achieving a good characteristic near the error rate characteristic obtained in the case of a synchronous detection system while suppressing an increase in the size of the hardware, including a demodulation apparatus having a reliability computing unit for computing a certainty of a value of a correlation energy as a reliability R for the correlation energy of every Walsh number, a correcting unit for obtaining a corrected correlation energy by introducing a corresponding reliability R with respect to the correlation energies, and a maximum energy selecting unit for selecting the maximum correlation energy from among obtained corrected correlation energies based on the same and demodulating a signal corresponding to a Walsh number corresponding to this maximum correlation energy as a received signal.

80 Claims, 38 Drawing Sheets

METHOD AND APPARATUS FOR ACHIEVING DEMODULATION IN RADIO COMMUNICATIONS SYSTEM USING M-SEQUENCE ORTHOGONAL MODULATION

BACKGROUND OF THE INVENTION

1. Field of the Invention

The present invention relates to a method and an apparatus for achieving demodulation in a radio communications system using M-sequence orthogonal modulation, more particularly relates to a method and an apparatus for achieving demodulation for a reverse-link demodulation unit in the radio communications system.

The "code division multiple access (CDMA)" has come into attention as a next generation mobile communications system. In the U.S., there is already a standard system called the "IS-95". Further, there is a possibility that the CDMA system used for the semifixed mobile communications system called a "wireless local loop (WWL)" will be used as one, means of construction of the infrastructure.

This is the CDMA with a chip rate of 1.2288 Mcps proposed by Qualcomm of the U.S. It employ a synchronous detection system using an externally inserted pilot signal for the downstream channels (forward-links). On the other hand, an asynchronous detection system using M-sequence orthogonal-modulation has been adopted for upstream channels (reverse-links).

In the IS-95 standard system, in the asynchronous detection system using the M-sequence orthogonal modulation for the upstream channels, the reception side converts an amplitude signal to electric power so as to eliminate the phase error due to fading or the like and prevent deterioration of the error rate characteristic. However, since it is an asynchronous detection system, the error rate characteristic thereof becomes worse than that of the case of a synchronous detection system.

The present invention describes method and apparatus for achieving demodulation not causing any deterioration of the error rate characteristic in a reverse-link demodulation unit operating under an asynchronous detection system using M-sequence orthogonal modulation such as in a communication system based on IS-95 (N-CDMA).

2. Description of the Related Art

As will be explained in detail later by using the drawings, in a demodulation method in a radio communications system using the M-sequence orthogonal modulation of the related art, the use of an asynchronous detection system has as a natural result the frequent occurrence of a state where both an energy of a signal of a Walsh No. 0 and an energy of a signal of a Walsh No. 35 are larger than the energy of a signal of a Walsh No. 1. For this reason, error tends to occur in the result of judgment of the Walsh number obtained from a finger demodulating unit and therefore the error rate characteristic, for example, the Eb/No vs BER characteristic, is considerably degraded. That is, the quality of demodulated data is degraded.

On the other hand, the synchronous detection system has been proposed as an alternative to the asynchronous detection system. The synchronous detection system is a system predicated on the assumption that a reception side (base station) can obtain by some means or another the phase information on a phase plane of signals of respective Walsh numbers transmitted from a transmission side (terminal) and rotates one vector shown in the figure mentioned later by exactly a predetermined phase angle corresponding to the phase information to align the vector with one axis, for example, the I-axis, and at that time rotates other vectors together by exactly that predetermined phase angle. When doing this, the situation where a large number of variety of vectors end up being concentrated at one axis (I-axis) is avoided, and the error rate characteristic is naturally improved. However, according to the synchronous detection system, there is the disadvantage of a major increase in the size of the hardware.

SUMMARY OF THE INVENTION

Accordingly, in consideration with the above problem, an object of the present invention is to provide a method and an apparatus for achieving demodulation in a radio communications system using M-sequence orthogonal modulation capable of achieving a good characteristic near the error rate characteristic obtained in the case of a synchronous detection system while suppressing an increase in the size of the hardware.

To attain the above object, according to the present invention, there is provided a demodulation apparatus having a reliability computing means (21) for computing a certainty of a value of a correlation energy as a reliability R for the correlation energy of every Walsh number, a correcting means (22) for obtaining a corrected correlation energy by introducing a corresponding reliability R with respect to the correlation energies, and a maximum energy selecting means (19) for selecting the maximum correlation energy from among obtained corrected correlation energies based on the same and demodulates a signal corresponding to a Walsh number corresponding to this maximum correlation energy as a received signal. Due to this, a demodulation apparatus in a radio communications system using M-sequence orthogonal modulation which is an asynchronous system, but can obtain a good error rate characteristic equivalent to that by the synchronous system is realized.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 35:
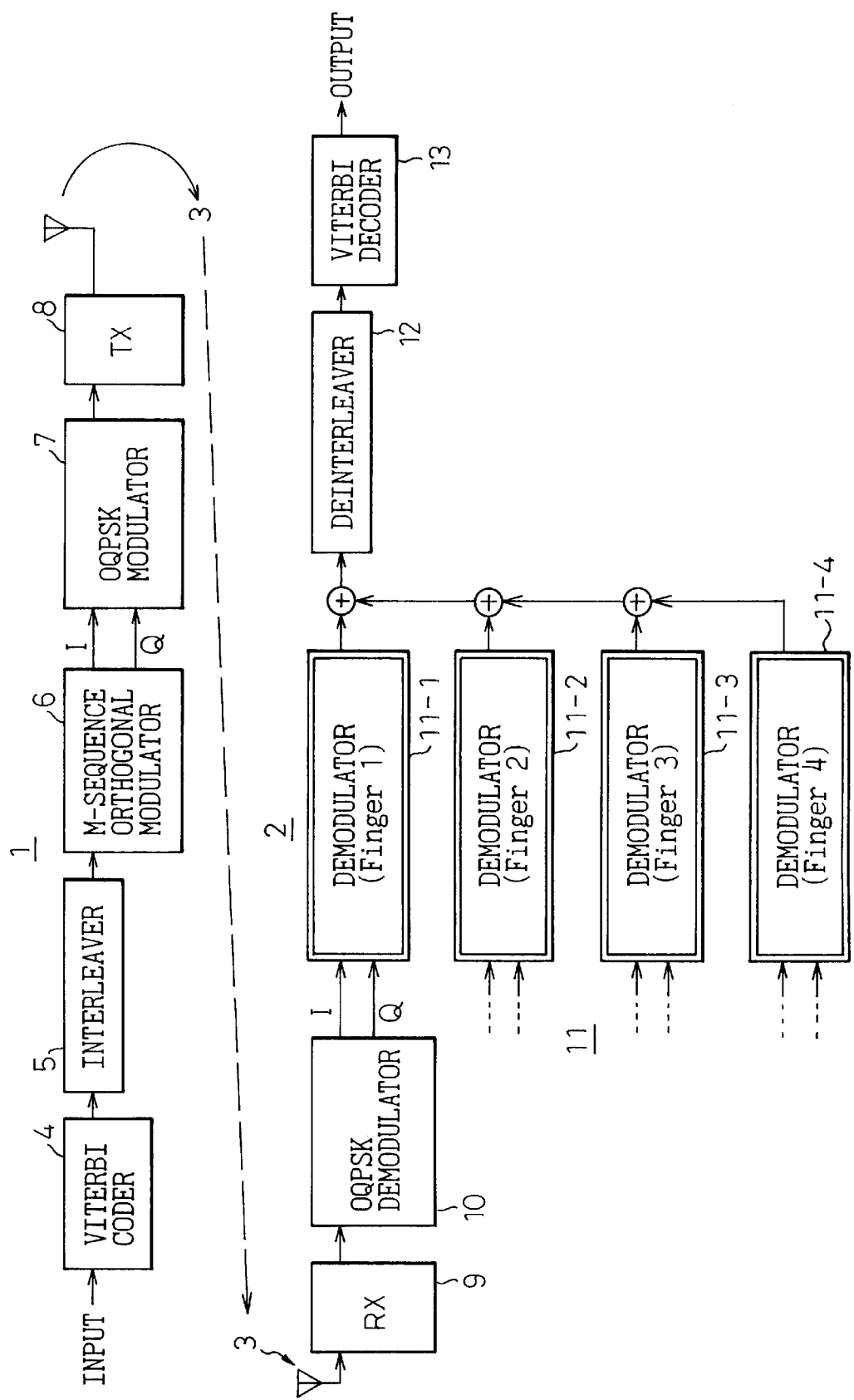
FIG. 35 is a view of a known reverse-link demodulating unit to which the present invention is applied.

FIG. 35 is a view of a known reverse-link demodulation unit to which the present invention is applied.

In FIG. 35, the blocks at the top show a terminal of subscriber side, while the blocks at the bottom show a base station. Usually, a plurality of terminals 1 and a plurality of base stations 2 are connected via radio transmission paths 3.

At the terminal 1, first an input signal such as a voice signal from a subscriber is input to a Viterbi coder 4 and Viterbi coding carried out there. The output thereof is further input to an interleaver 5. The interleaver 5 functions to make the data output from the Viterbi coder 4 discrete in the time domain. This is for preventing a burst error causing continuous errors by making the data discrete in the time domain. The output of this interleaver 5 is input to an M-sequence orthogonal modulator 6 next.

The M-sequence orthogonal modulator 6 is a circuit based on the IS-95 standard and realizes the so-called "spread spectrum" procedure. Specifically, for example, it spreads a 6-bit input code (Walsh number) to a 64-bit output code (Walsh code). This Walsh code will be explained in detail later in the drawings, but usage of this Walsh code is extremely advantageous in the point that codes can be separated from each other, though there is the accompanying disadvantage that the frequency is increased 64-fold and the transmission bandwidth is expanded.

An I-channel (Ich) signal and a Q-channel (Qch) signal from the M-sequence orthogonal modulator 6 are input to a next offset quadrature phase shifting keying (OQPSK) modulator 7 and become an OQPSK modulated output signal. This OQPSK modulated signal is a signal where the Ich signal and the Qch signal are shifted from each other by exactly a phase $\pi$. When an eye pattern of the Ich signal becomes the maximum, the eye pattern of the Qch signal becomes the minimum (or vice versa). Due to this, a peak level of the signal can be lowered.

Therefore, a transmitter (TX) 8 of the last stage of the terminal 1 receives the output from the OQPSK modulator 7 which reduced the peak level of the signal and can transmit a radio output having a reduced distortion of the transmission power to the radio transmission path 3.

The base station 2 receives the transmitted radio output at an initial stage first receiver (RX) 9 and converts the radio input signal received at this receiver 9 to an IF signal by frequency conversion. This IF signal is input to a next OQPSK demodulator 10 where it is subjected to an inverse operation to that at the OQPSK modulator 7 mentioned before and then becomes a digital Ich input signal (baseband signal) and Qch input signal (baseband signal).

These Ich and Qch input (baseband) signals are further input to the finger demodulating unit 11 where an inverse spreading to the spreading carried out at the M-sequence orthogonal modulator 6 of the transmission side (terminal 1) is carried out. This finger demodulating unit 11 comprises four demodulators, that is, a demodulator (Finger 1) 11-1 to a demodulator (Finger 4) 11-4.

The finger demodulating unit 11 performs a processing referred to as "RAKE combining". It considers the fact that a radio output reaches an antenna of the reception side (base station 2) from the antenna of the transmission side (terminal 1) by multiple paths, i.e., directly or after reflecting from a building, mountain, etc. In the case of the present figure, a maximum of three types of delay are given to the received signal. These delayed signals are aligned in phase and combined to obtain the maximum output.

The Ich and Qch input signals subjected to the inverse spreading and RAKE combining by the finger demodulating unit 11 are then input to a deinterleaver 12. Here, the signal made discrete in the time domain at the interleaver 5 of the transmission side (terminal 1) is returned to its original form. Further, a Viterbi decoder 13 performs error correction to obtain the intended signal as the output. Next, a more detailed explanation will be made of the finger demodulating unit 11.

Figure 36:
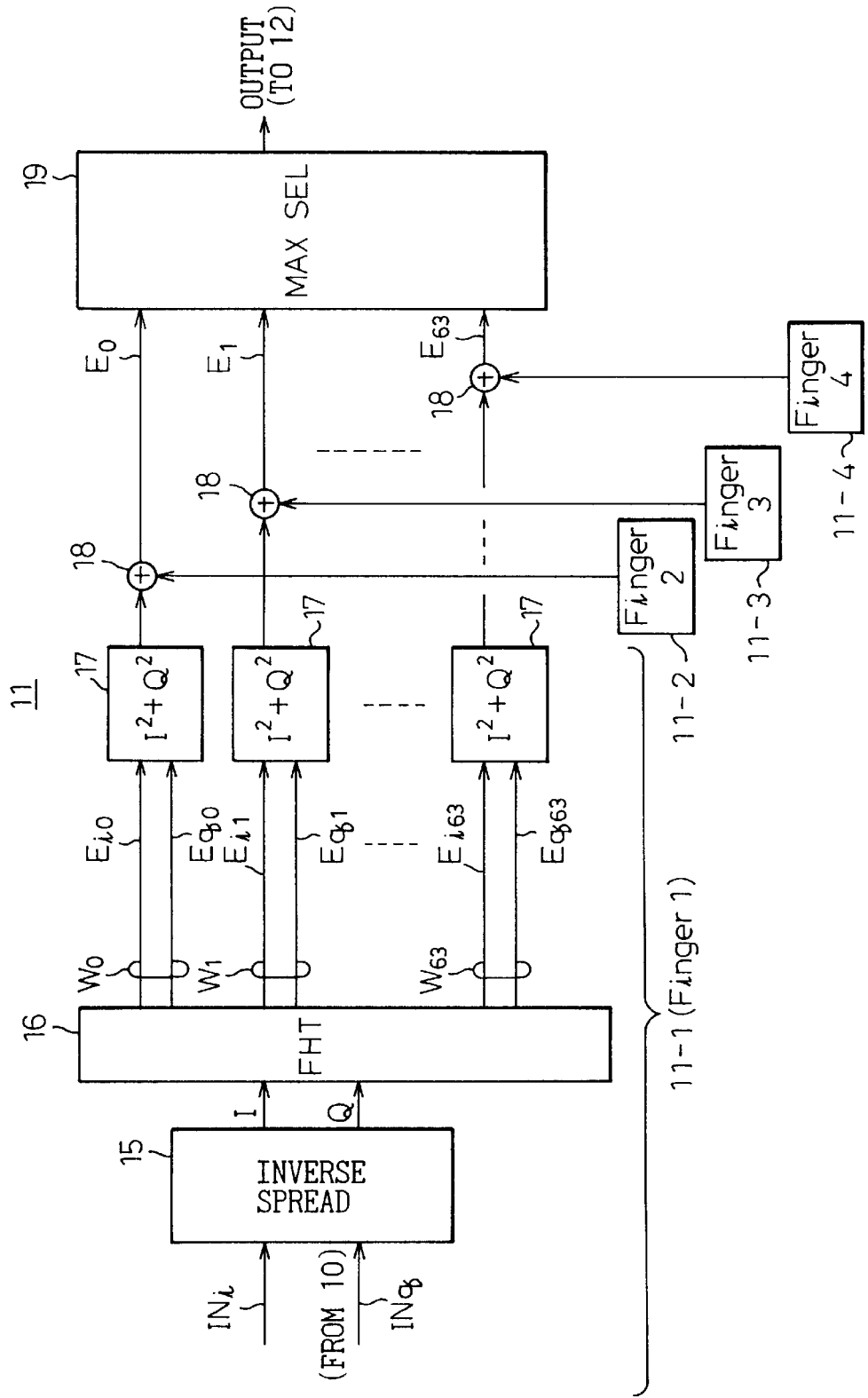
FIG. 36 is a view of a concrete configuration of a finger demodulating unit 11 shown in FIG. 35.

FIG. 36 is a view of a concrete structure of the finger demodulating unit 11 shown in FIG. 35. In the figure, reference numeral 15 is the inverse spread unit. This inverse spread unit 15, based on IS-95, performs a first inverse spread by multiplying a PN code representing a short code of the base station 2 and input signals (INi, INq) and further performs a second inverse spread by multiplying a PN code representing a long code of a subscriber and the input signals thereof (INi, INq). Note that the inverse spread is not related to the present invention per se and therefore will not be explained in further detail.

The inverse spread input signals (INi, INq) are input to the next Fast Hadamard Transform (FHT) unit 16. This performs Fast Hadamard Transform processing to the input signals (INi, INq) to obtain correlation values for every Walsh number,(W0, W1, . . . , W63). These correlation values are represented as electric powers Ei0, Eq0; Ei1, Eq1; . . . , Ei63, Eq63. Thus, 64 correlation electric powers (Ei, Eq) are obtained for each of the Ich's and Qch's.

The correlation electric powers (Ei, Eq) of the Ich's and Qch's are further input to the energy calculating units ($I^2+Q^2$) 17 provided for every Walsh number (W0, W1, . . . , W63). There, correlation energies (E0, E1, . . . , E63) for every Walsh number from which the phase component of the input signal is eliminated are obtained.

In the figure, the process for finding the correlation energies (E0, E1, . . . , E63) at the demodulator (Finger 1) 11-1 was concretely shown, but a similar process is executed at the other demodulators (Finger 2 to Finger 4) 11-1 to 11-4 as well. Results having the same Walsh number are combined with each other. The combining units 18 provided in correspondence with each Walsh number perform this task.

The correlation energies (E0, E1, . . . , E63) from the combining units 18 are input to a maximum energy selecting unit (MAX SEL) 19. One correlation energy having the maximum energy among 63 is selected. When assuming this is W1, it is judged that the transmission side (terminal 1) transmitted a Walsh code corresponding to Walsh No. 1, and this becomes the output. Note that where a Dual Max procedure defined in IS-95 is used, it is output from the selecting unit 19 as a Viterbi soft decision value.

A slightly more detailed explanation will be made of the "correlation" mentioned above. First, when viewing the transmission side (terminal 1), the transmission side transmits the transmission signal as one of the 64 Walsh No. 0 to No. 63. In this case, each Walsh number is transmitted in the form of a Walsh code having a 64-times greater frequency. This is shown in the following table.

TABLE

| | Walsh Codes | | | | |
|---|---|---|---|---|---|
| | 0 | 1 | 2 | . . . | 63 (hours) → |
| W0 | 0 | 0 | 0 | . . . | 0 |
| W1 | 0 | 0 | 0 | . . . | 1 |
| . | . | . | . | . | . |
| . | . | . | . | . | . |
| . | . | . | . | . | . |
| W63 | 1 | 1 | 1 | . . . | 1 |

Looking at the middle W32, this is comprised of 32 consecutive "0's" and 32 consecutive "1's". Note that the above table is defined in IS-95.

It should be noted regarding the Walsh codes shown in the above table that if the correlation is obtained for the transition of any Walsh code from a certain time to the code of the next time (Walsh symbol time), the correlation value becomes 50%, that is, uniform.

The Fast Hadamard Transform unit 16 of the reception side (base station 2) can find the correlation for 63 codes at a high speed. The one having the strongest correlation in the end is decided to be the correct Walsh code.

Figure 37:
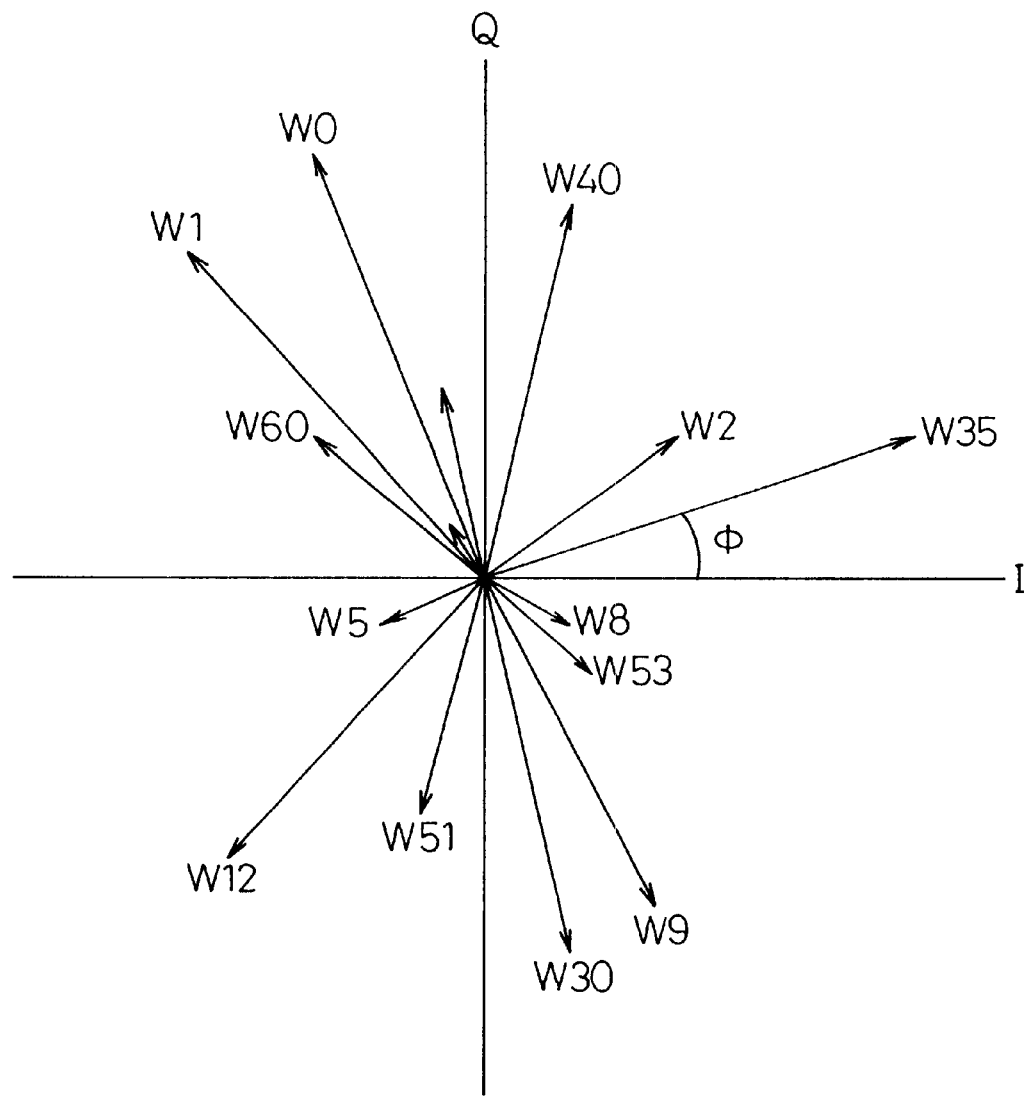
FIG. 37 is a view of an example in which an input signal on a reception side (base station 2) is represented on a phase plane.

FIG. 37 is a view of an example of the input signal at the reception side (base station 2) on the phase plane. Specifically, the output signal from the Fast Hadamard Transform unit 16 of FIG. 36 is viewed on the phase plane. Walsh No. 0, No. 1, No. 2, . . . , No. 35, . . . , No. 40, etc. are shown as vectors. A large number of terminals 1 send a variety of signals at random through one radio space. Accordingly, the correlation electric power appears with the pattern as illustrated on the phase plane.

The asynchronous detection system eliminates the phase component for the variety of vectors represented in FIG. 37 and finds their magnitudes.

Figure 38:
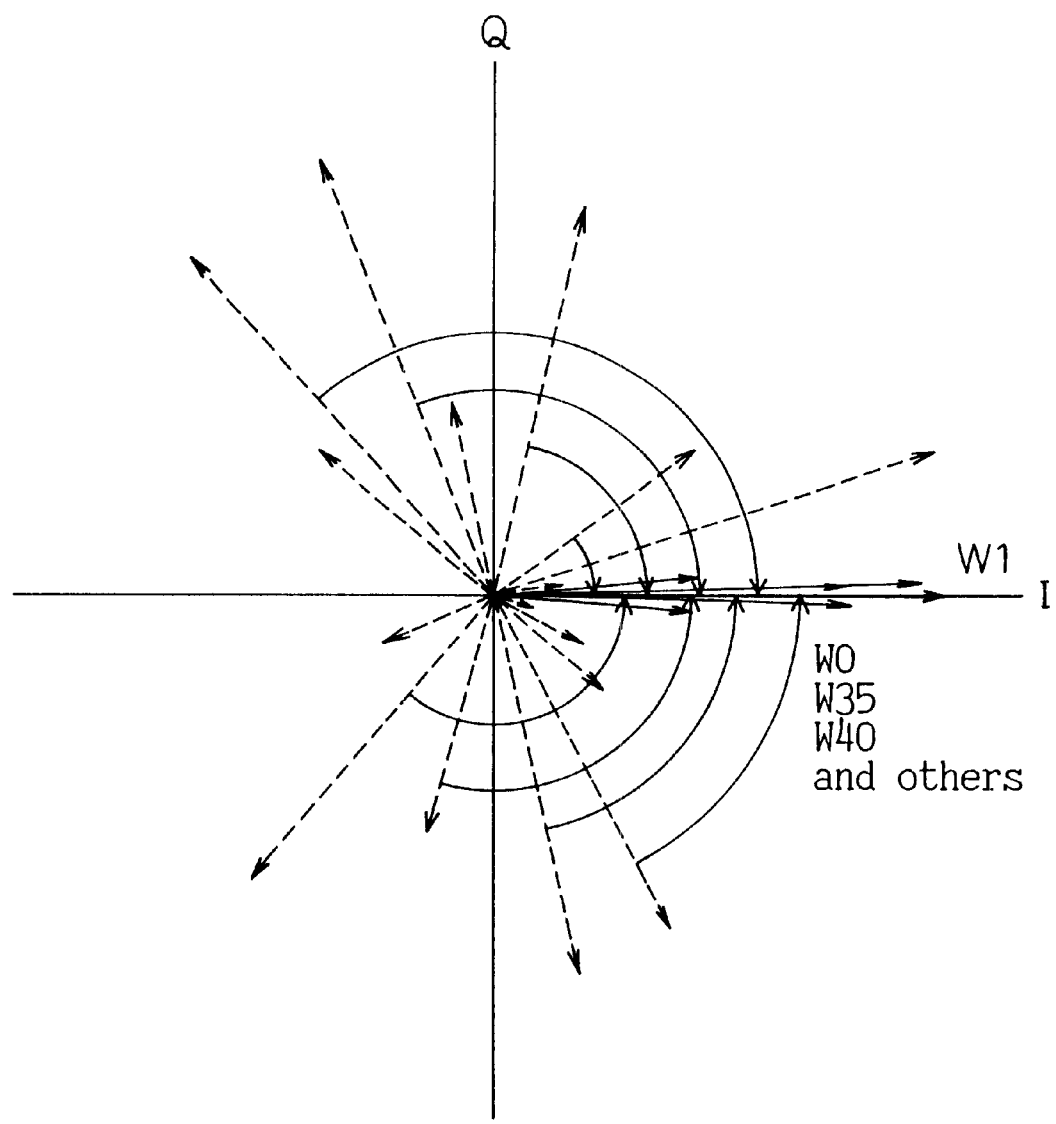
FIG. 38 is a view of an example in which an output from an energy calculating unit 17 in FIG. 36 is represented on the phase plane.

FIG. 38 is a view of an example in which the output from the energy calculating unit 17 in FIG. 36 is represented on a phase plane. Vectors (W0, W1, . . . ) shown in FIG. 37 are all concentrated on the I axis and represented as magnitudes (correlation energies) of the vectors. These are 63 combined outputs from the energy calculating units 17 inside the demodulators (Fingers).

As explained earlier, in a demodulation method in a radio communications system using the M-sequence orthogonal modulation of the related art, the use of an asynchronous detection system has as a natural result, as shown in FIG. 38 as well, the frequent occurrence of a state where both an energy of a signal of a Walsh No. 0 and an energy of a signal of a Walsh No. 35 are larger than the energy of a signal of a Walsh No. 1. For this reason, error tends to occur in the result of judgment of the Walsh number obtained from a finger demodulating unit 11 and therefore the error rate characteristic, for example, the Eb/No vs BER characteristic, is considerably degraded. That is, the quality of demodulated data is degraded.

On the other hand, the synchronous detection system has been proposed as an alternative to the asynchronous detection system. The synchronous detection system is a system predicated on the assumption that a reception side (base station 2) can obtain by some means or another the phase information on a phase plane of signals of respective Walsh numbers transmitted from a transmission side (terminal 1) and rotates one vector shown in FIG. 37 by exactly a predetermined phase angle corresponding to the phase information to align the vector with one axis, for example, the I-axis, and at that time rotates other vectors together by exactly, that predetermined phase angle. When doing this, the situation where a large number of variety of vectors end up being concentrated at one axis (I-axis), as shown in FIG. 38 (asynchronous detection system) is avoided, and the error rate characteristic is naturally improved. However, according to the synchronous detection system, there is the disadvantage of a major increase in the size of the hardware.

In consideration with the above problem, the present invention provides a method and an apparatus for achieving demodulation in a radio communications system using M-sequence orthogonal modulation capable of achieving a good characteristic near the error rate characteristic obtained in the case of a synchronous detection system while suppressing an increase in the size of the hardware.

Figure 1:
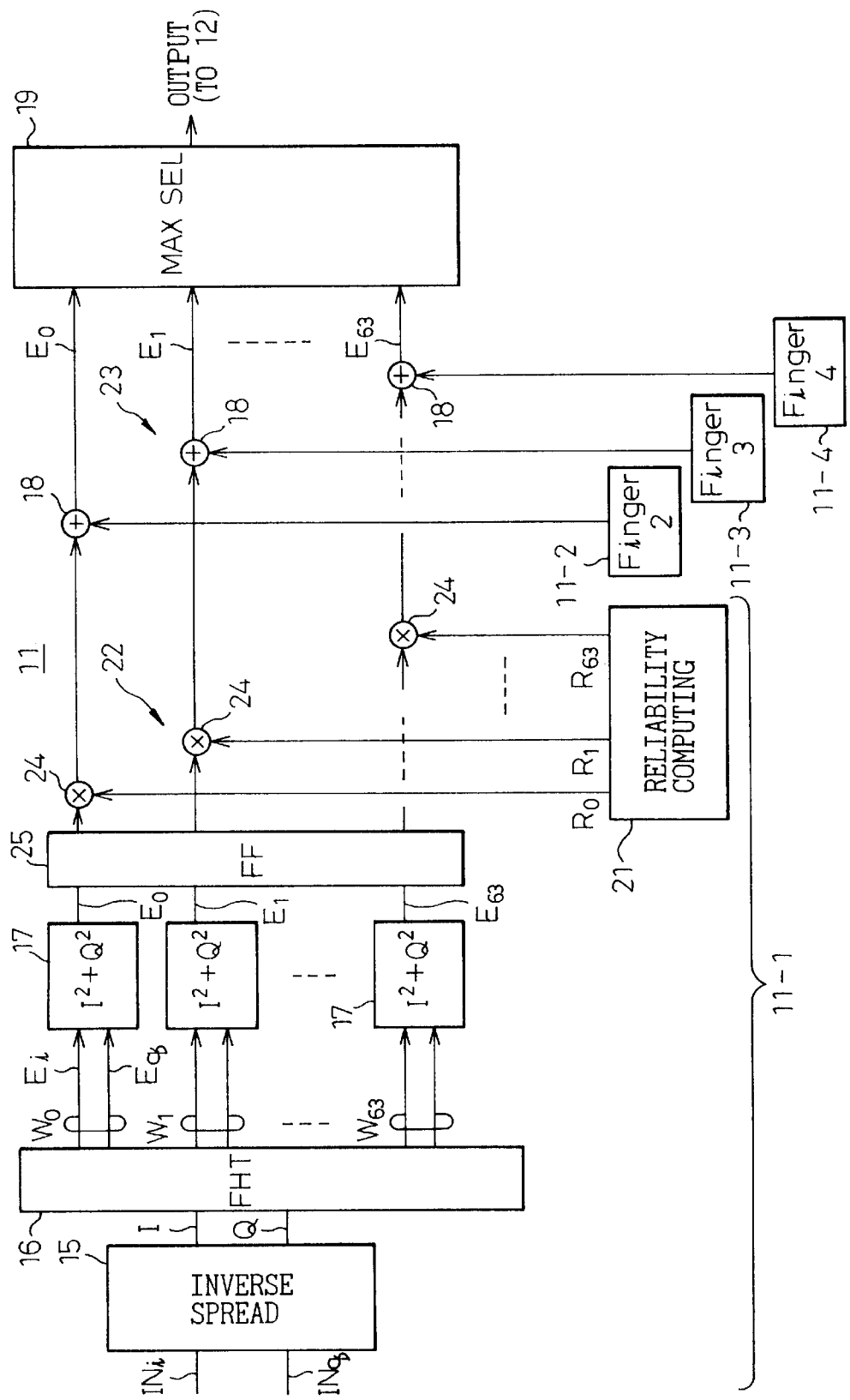
FIG. 1 is a view of the basic configuration of a demodulation apparatus for realizing a demodulation method according to the present invention.

FIG. 1 is a view of the basic configuration of a demodulation apparatus for realizing the demodulation method according to the present invention. Note that similar constituent elements are indicated by the same reference numerals or symbols throughout all of the figures.

In the finger demodulating unit 11 shown in FIG. 1, the inverse spread unit 15, Fast Hadamard Transform unit 16, energy calculating unit 17, the combining unit 18, and the maximum energy selecting unit 19 are as already explained by referring to FIG. 36.

Accordingly, the parts newly introduced in FIG. 1 are a reliability computing means 21 and a correcting means 22. The demodulation method according to the present invention which can be executed by these newly introduced parts (21, 22) is as follows.

This demodulation method is one which, in the same way as explained by referring to FIG. 35 and FIG. 36, has radio output signals subjected to M-sequence orthogonal modulation and transmitted from the transmission side as Walsh codes corresponding to Walsh numbers received at reception units (9, 10, 15) and reproduced as I-channel input signals and Q-channel input signals, obtains correlation energies (E0, E1, . . . ) for every Walsh number from the output after Fast Hadamard Transform (16), selects (at 19) the maximum correlation energy among these correlation energies, and demodulates a signal corresponding to the Walsh number corresponding to this as the received signal. Here, the fundamental steps characterizing the present invention are the following first to third steps:

First step: Computing the certainty of the value of each correlation energy as the reliability (R0, R1, . . . ) for the correlation energy for every Walsh number.

Second step: Introducing the reliabilities (R0, R1, . . . ) corresponding to the correlation energies to obtain the corrected correlation energies.

Third step: Using the obtained corrected correlation energies to select the maximum correlation energy from among them.

More practically, the demodulation method according to the present invention is executed by the following first to fourth steps.

When the demodulation is carried out by the finger demodulating unit (11) comprised of the plurality of demodulators (11-1 to 11-4) connected to each other in parallel, each demodulator, 1'st step: Computes the certainty of the value of each correlation energy as the reliability (R0, R1, . . . ) for the correlation energy for every Walsh number (same as above first step).

2'nd step: Introduces the reliabilities (R0, R1, . . . ) corresponding to the correlation energies to obtain the corrected correlation energies (same as above second step).

3'rd step: Collects and combines the corrected correlation energies obtained at all said demodulators for every Walsh number.

4'th step: Uses the corrected correlation energies obtained by that combination to select the maximum correlation energy (corresponding to above third step).

Referring to FIG. 1, the first step (also same for 1'st step) is executed by the reliability computing means 21. The figure shows a situation where 64 reliabilities R0, R1, . . . , R63 are output corresponding to 64 Walsh numbers (W0, W1, . . . , W63). An FF unit 25 is provided in order to compensate for the delay of the computation time by this computing means 21. Further, the above second step (also same for 2'nd step) is executed by the correcting means 22. The correcting means 22 can be constituted by an adder unit, a multiplier unit, or the like. In the figure, the multiplier unit is represented by reference numeral 24. Furthermore, the above 3'rd step is executed by the combining means 23 of the figure. This combining means 23 is the already mentioned combining unit 18 and acts as the adder unit.

Still further, the above third step (also same for 4'th step) is executed by the maximum energy selecting unit (MAX SEL) 19 as in the related art.

The output from the Fast Hadamard Transform unit 16 originally or inherently shows the certainty of the energy corresponding to each Walsh number, but the present invention makes the certainty further reliable from viewpoints different from the above. This is the reliability (R0, R1, . . . , R63). In the final analysis, in the present invention, the correlation energy Ewn finally to be applied to the maximum energy selecting unit 18 is represented by the following equation (1):

$$Ewn = \sum_{f} \{(Eiwn^2 + Eqwn^2) \times Rwn\} \qquad (1)$$

In equation (1), the suffixes wn represent 0, 1, . . . , 63 in the Walsh numbers W0, W1, . . . , W63, and Ewn is the corrected correlation energy for a certain Walsh number wn. Eiwn is the correlation electric power of the I-channel, Eqwn is the correlation electric power of the Q-channel, the correlation energy ($Eiwn^2 + Eqwn^2$) is obtained from them, and further the reliability Rwn based on the present invention is introduced with respect to this correlation energy. In this case, the reliability Rwn is multiplied with the above energy.

The values of ($Eiwn^2 + Eqwn^2$)×Rwn obtained here are combined for all demodulators (Fingers) 11-1 to 11-4 by the combining means 23 of FIG. 1. $\Sigma$ of equation (1) indicates the combination. The values are combined over f=1 to f=4.

As mentioned above, the demodulating apparatus in a radio communications system using M-sequence orthogonal modulation based on the present invention is constituted by:

a reliability computing means 21 for computing the certainty of the value of each correlation energy as the reliability for the correlation energy for every Walsh number;

a correcting means 22 for introducing corresponding reliabilities (R1, R0, . . . ) with respect to the correlation energies to obtain corrected correlation energies; and a maximum energy selecting means 19 for using the obtained corrected correlation energies to select the maximum correlation energy from among obtained corrected correlation energies.

Further, when the above-mentioned demodulation is carried out by the finger demodulating unit 11 comprising a plurality of demodulators 11-1 to 11-4 connected to each other in parallel, the apparatus is configured having, in front of the maximum energy selecting means 19, a combining means 23 for collecting and combining the corrected correlation energies obtained at all demodulators 11-1 to 11-4 for every Walsh number.

Thus, a demodulating apparatus is realized exhibiting an error rate characteristic comparable to that of a synchronous detection system while suppressing. the increase of the size of the hardware to the extent of adding the reliability computing means 21.

Below, an explanation will be made of some embodiments, and examples of application thereof, of the reliability computing means 21.

Referring to FIG. 37 again, a receiving phase angle Φ (shown for wn=35 as one example) of the phase modulation signal from the transmission side can be found from the correlation electric power Eiwn of the I-channel and the correlation electric power Eqwn of the Q-channel. This is shown in the following equation (2).

$$\left. \begin{array}{l} \cos\Phi = Eiwn \\ \sin\Phi = Eqwn \end{array} \right\} \quad (2)$$

$$\downarrow$$

$$\Phi = \tan^{-1}(\sin\Phi/\cos\Phi)$$
$$= \tan^{-1}(Eiwn/Eqwn)$$

According to this embodiment of the present invention, the reliabilities R (R0, R1, . . . , R63) are computed by utilizing the information of this receiving phase angle Φ (phase angle information).

Figure 2:
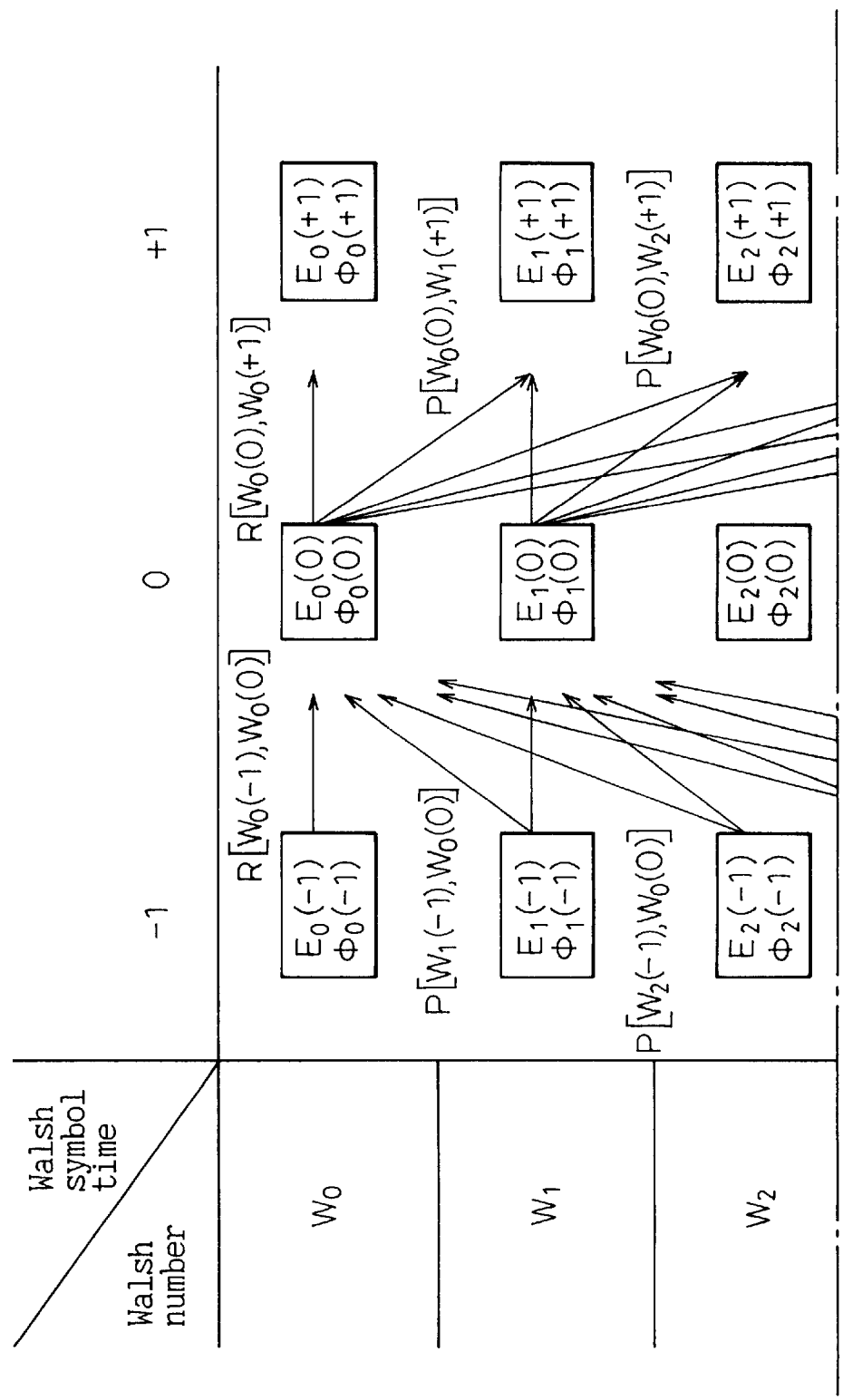
FIG. 2 is a first part of a view for explaining the principle of derivation of a reliability R.
Figure 3:
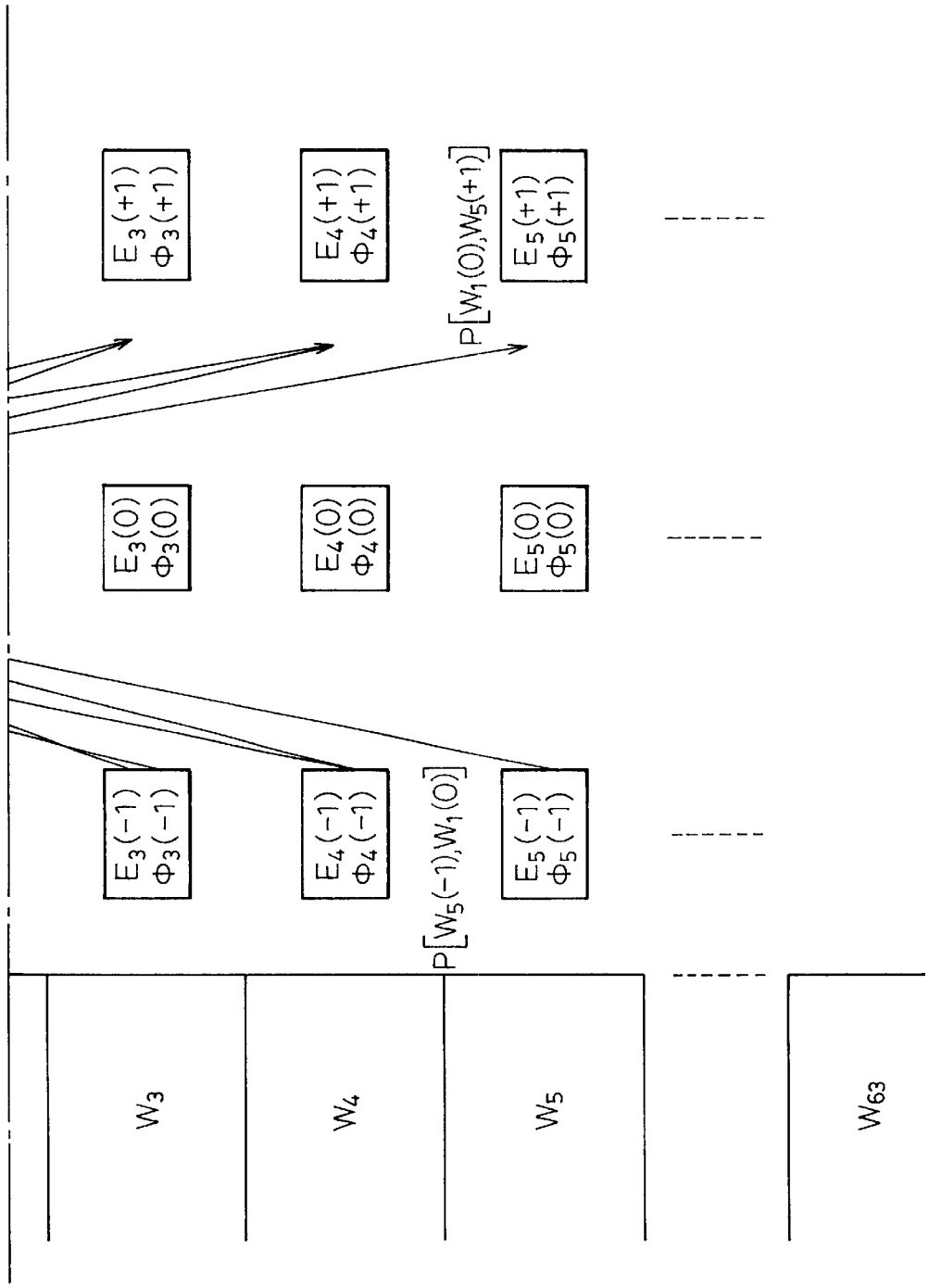
FIG. 3 is a second part of a view for explaining the principle of derivation of there liability R.

FIG. 2 and FIG. 3 are first and second parts of a view for explaining the principle of derivation of the reliability R.

In FIG. 2 and FIG. 3, the ordinate indicates the Walsh numbers (wn), that is, W0, W1, W2, . . . , W63, and the abscissa indicates the Walsh symbol times (Tws), namely, times corresponding to 0, 1, 2, . . . , 63 in the above table. Note that in FIG. 2 and FIG. 3, any three consecutive Walsh symbol times (Tws) adjoining each other in the time domain are shown. Namely, 0 represents the present Tws, −1 represents the Tws preceding the present Tws (0) by exactly 1 Tws, and +1 represents the Tws following the present Tws (0) by exactly 1 Tws.

For example, when looking at the row of the Walsh No. W0, E0(0), E0(−1), and E0(+1) indicate the present correlation energy, the correlation energy preceding this, and the correlation energy following this, respectively, for a signal having the Walsh No. W0. Further, Φ0(0), Φ0(−1), and Φ0(+1) indicate a present receiving phase angle, the receiving phase angle preceding this (0), and the receiving phase angle following this (0) for a signal having the Walsh No. W0 (output of the Fast Hadamard Transform unit 16). Φ at this time is derived from equation (2).
Further, $$R[W0(-1), W0(0)]$$

shown at the top of FIG. 2 indicates the reliability in the transition of the signal from Tws(−1) to Tws(0) for the Walsh No. W0, and $$R[W0(0), W0(+1)]$$

indicates the reliability in the transition of the signal from Tws(0) to Tws(+1) for the Walsh No. W0.

Accordingly, FIG. 2 and FIG. 3 show the transitions of signals from TWS(−1) to Tws(0), that is, the transition of the correlation energy and the transition of the receiving phase angle for Walsh Nos. W0, W1, . . . and, at the same time, show the transitions of signals from Tws(0) to Tws(+1) for the Walsh Nos. W0, W1, . . . , respectively.

In FIG. 2, attention is paid to the signal having the Walsh No. 0 (W0) at the Walsh symbol time =0 (Tws=0). When assuming that the signal of W0 at this time (Tws=0) (E0(0), Φ0(0)) is correct (W0 is transmitted from the transmission side) (since if it is correct has not yet been ascertained), it can be considered that the signal changed from either of the signals of W0, W1, . . . , W63 at the preceding Tws(−1) to W0 at Tws(0). Then, further, it can be considered that the signal (E0(0), Φ0(0)) at that time (Tws=0) will change to either of the signals of W0, W1, . . . , W63 at the following Tws(+1). These changes are represented by arrows in FIG. 2 and FIG. 3.

Here, consideration will be given to the change of the receiving phase angle Φ. The magnitude of the change of this receiving phase angle Φ within 1 Walsh symbol time (Tws) is very-small. The reliability in the present embodiment is computed taking note of this fact.

Namely, taking as an example the IS-95 system mentioned above, where

Walsh symbol frequency=4,800 Hz and deviation of reference carrier frequency=300 Hz, the receiving phase angle Φ changing within 1 Walsh symbol time (Tws) is about 22 deg (22°). Then, it can be considered that the smaller the change of the receiving phase angle Φ, that is, the phase difference angle, the higher the reliability (R) of the signal transitions indicated by arrows in FIG. 2 and FIG. 3. Note that the "deviation of the reference carrier frequency" means the difference of the reference carrier frequency between the transmission side and the reception side.

As described above, the derived reliability (R) can be represented by the following equation (3):

$$R[W0(-1), W0(0)] = (180 \text{ deg} - |\Phi0(0) - \Phi0(-1)|)/180 \text{ deg} \quad (3)$$

Note that the method of expression used in equation (3) is just one example. The phase difference angle is represented by |Φ0(0)−Φ0(−1)| in equation (3).

Equation (3) shows the reliability R as a value of 0 to 1 for easy understanding. Namely, it is normalized by 180 deg. For example, if the phase difference angle is 0 deg, the reliability (R) becomes the maximum value 1, while conversely, if it is 180 deg, the reliability (R) becomes the minimum value 0. Along with the change of the phase difference angle from 180 deg→0 deg, the reliability (R) becomes from 0 to 1.

The reliability (R0) in equation (3) was represented by focusing on the Walsh No. 0 (W0), but, similarly, 64 reliabilities in total are computed, for example, W1(−1)→W0(0), W2(−1)→W0(0), W3(−1)→W0(0), . . . , W63(−1)→W0(0). This is represented by the following equation (4). Namely, the reliability R0(−1, 0) for the signal of W0(0) is:

$$R0(-1, 0) = \max\{R[W0(-1), W0(0)], R[W1(-1), W0(0)] \ldots R[W63(-1), W0(0)]\} \quad (4)$$

Note that max { } means to select the maximum reliability from among 64 reliabilities in { }. The maximum reliability (R) is selected in this way because since it is assumed that the transition of the signal providing the related maximum reliability (if R1 is the maximum, the transition of W1→W0) is correct, the maximum can be obtained.

Thus, the reliability of the signal W0(0) is found and the corrected correlation-energies (E0, E1, . . . ) are defined by referring to equation (1).

Note that equation (4) was shown for the signal W0(0), but becomes the following equation (5) if the reliability Rn thereof is generally represented for any signal Wn (n=0,1, 2, ..., 63).

$$Rn(-1, 0) = max\{R[W0(-1), Wn(0)], R[W1(-1), Wn(0)] \ldots R[W63(-1), Wn(0)]\} \quad (5)$$

Further, equation (3) was shown for the transition from the signal of W0(−1) to the signal of W0(0), so when generally shown as the reliability in the transition from any signal of Wn(−1) to the signal of W0(0), it becomes as in the following equation (6):

$$R[Wn(-1), W0(0)] = (180 \text{ deg} - |\Phi 0(0) - \Phi n(-1)|)/180 \text{ deg} \quad (6)$$

The above explanation was made for the case of finding the reliability (R) by taking note of the transition of the signal from Tws(−1) to Tws(0) of the Walsh symbol time in FIG. 2, but it is also possible to find the reliability (R) by taking note of the transition of the signal of the Walsh symbol time in FIG. 2 of from Tws(0) to Tws(+1). In the latter case, equation (3) is modified as follows:

$$R[W0(0), W0(+1)] = (180 \text{ deg} - |\Phi 0(+1) - \Phi 0(0)|)/180 \text{ deg} \quad (7)$$

Further, equation (4) is modified to the following equation (8):

$$R0(0,+1) = max\{R[W0(0), W0(+1)], R[W1(0), W0(+1)] \ldots R[W63(0), W0(+1)]\} \quad (8)$$

Furthermore, equation (5) is modified to the following equation (9):

$$Rn(0, +1) = max\{R[W0(0), Wn(+1)], R[W1(0), Wn(+1)] \ldots R[W63(0), Wn(+1)]\} \quad (9)$$

Further, equation (6) is modified to the following equation (10):

$$R[Wn(0), W0(+1)] = (180 \text{ deg} - |\Phi 0(+1) - \Phi n(0)|)/180 \text{ deg} \quad (10)$$

Thus, according to the present invention, as exemplified in equations (3) to (6), the reliability (R) can be obtained from the maximum reliability among reliabilities computed based on the phase difference angle between the receiving phase angle Φ(0) at the present Walsh symbol time Tws(0) and the receiving phase angle Φ(−1) at the Walsh symbol time Tws(−1) preceding this (0), detected for every Walsh number (W0, W1, ..., W63).

Further, as exemplified in equations (7) to (10), it is also possible to obtain the reliability (R) from the maximum reliability among reliabilities computed based on the phase difference angle between the receiving phase angle Φ(0) at the present Walsh symbol time Tws(0) and the receiving phase angle Φ(+1) at the Walsh symbol time Tws(+1) following this (0), detected for every Walsh number (W0, W1, ...)

Also, by further developing this, it is also possible to determine the reliability (R) from the maximum reliability (first reliability) among reliabilities computed based on the preceding phase difference angle between the receiving phase angle Φ(0) at the present Walsh symbol time Tws(0), and the receiving phase angle Φ(−1) at the Walsh symbol time Tws(−1) preceding to this (0), detected for every Walsh number (W0, W1, ...), and the maximum reliability (second reliability) among reliabilities computed based on the following phase difference angle between the receiving phase angle Φ(0) at the present Walsh symbol time Tws(0), and the receiving phase angle Φ(+1) at the Walsh symbol time Tws(+1) following this (0), detected for every Walsh number (W0, W1, ...)

When computing the reliability based on both of the preceding and following phase difference angles in this way, a further higher precision reliability (R) can be obtained. In this case, concretely, preferably an average value of the first reliability obtained based on the preceding phase difference angle and the second reliability obtained based on the following phase difference angle is calculated and is defined as the reliability (R) to be sought. When representing this by an equation for the signal (Wn) of any Walsh number, the following equation (11) results. Namely, the reliability Rn(0) thereof becomes:

$$Rn(0) = \{Rn(-1, 0) + Rn(0, +1)\}/2 \quad (11)$$

Further, it is convenient if the reliability (R) mentioned above is represented by normalizing the phase difference angle (ΔΦ) like the equation (180 deg−|ΔΦ|)/180 deg, but the method of representation of this is not limited to this.

Figure 4:
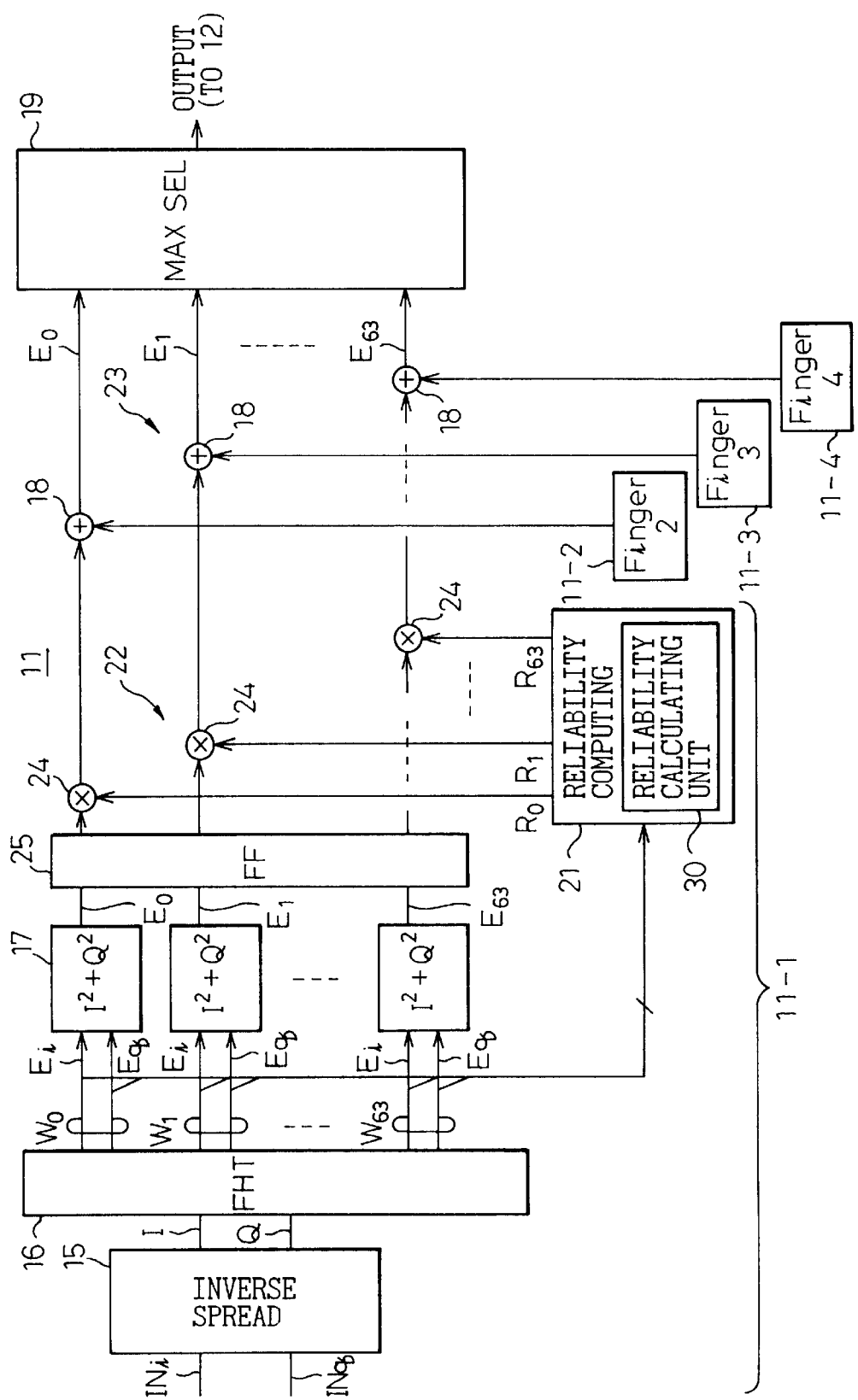
FIG. 4 is a view of a first embodiment of a demodulation apparatus based on the present invention.

FIG. 4 is a view of a first embodiment of the demodulation apparatus based on the present invention. The reliability computing means 21 shown in the present figure has a reliability calculating unit 30. This reliability calculating unit 30 receives as its inputs the I-channel correlation electric power Ei and the Q-channel correlation electric power Eq output from the Fast Hadamard Transform unit 16 for every Walsh number, finds the receiving phase angle Φ of every Walsh number for at least one of two consecutive Walsh symbol times Tws(−1) and Tws(0) and Tws(0) and Tws(+1) (at least one of Tws(−1) and Tws(0) or Tws(0) and Tws(+1)) based on the predetermined calculation equation, and further finds the phase difference angle (ΔΦ) between receiving phases corresponding to two consecutive Walsh symbol times (Φ(0) and Φ(−1) or Φ(0) and Φ(+1), or both of them). Further, it calculates the reliability for every Walsh number based on the phase difference angle. Note that the predetermined calculation equation is as already shown in equation (1) to equation (11).

In this way, the reliability computing means 21 according to the present invention has the reliability calculating unit 30. This reliability calculating unit 30 receives as its inputs the I-channel correlation electric power (Ei) and the Q-channel correlation electric power (Eq) obtained after the transformation by the Fast Hadamard Transform unit 16 for every Walsh number and calculates the receiving phase angle Φ from values of these I-channel and Q-channel correlation electric powers for each of the consecutive two Walsh symbol times. Further, it is constituted so as to output the reliability based on the obtained receiving phase angle.

The phase difference angle between two receiving phase angles Φ obtained here is calculated and the reliability R to be sought is output based on this phase difference angle.

In this case, the reliability is computed based on the phase difference angle for every Walsh number, and the maximum reliability among computed reliabilities is output as the reliability R to be sought.

Note that when the phase difference angle is ΔΦ, preferably the reliability R is computed by the phase difference angle normalized by:

$$(180 \text{ deg} - |\Delta\Phi|)/180 \text{ deg}$$

Figure 5:
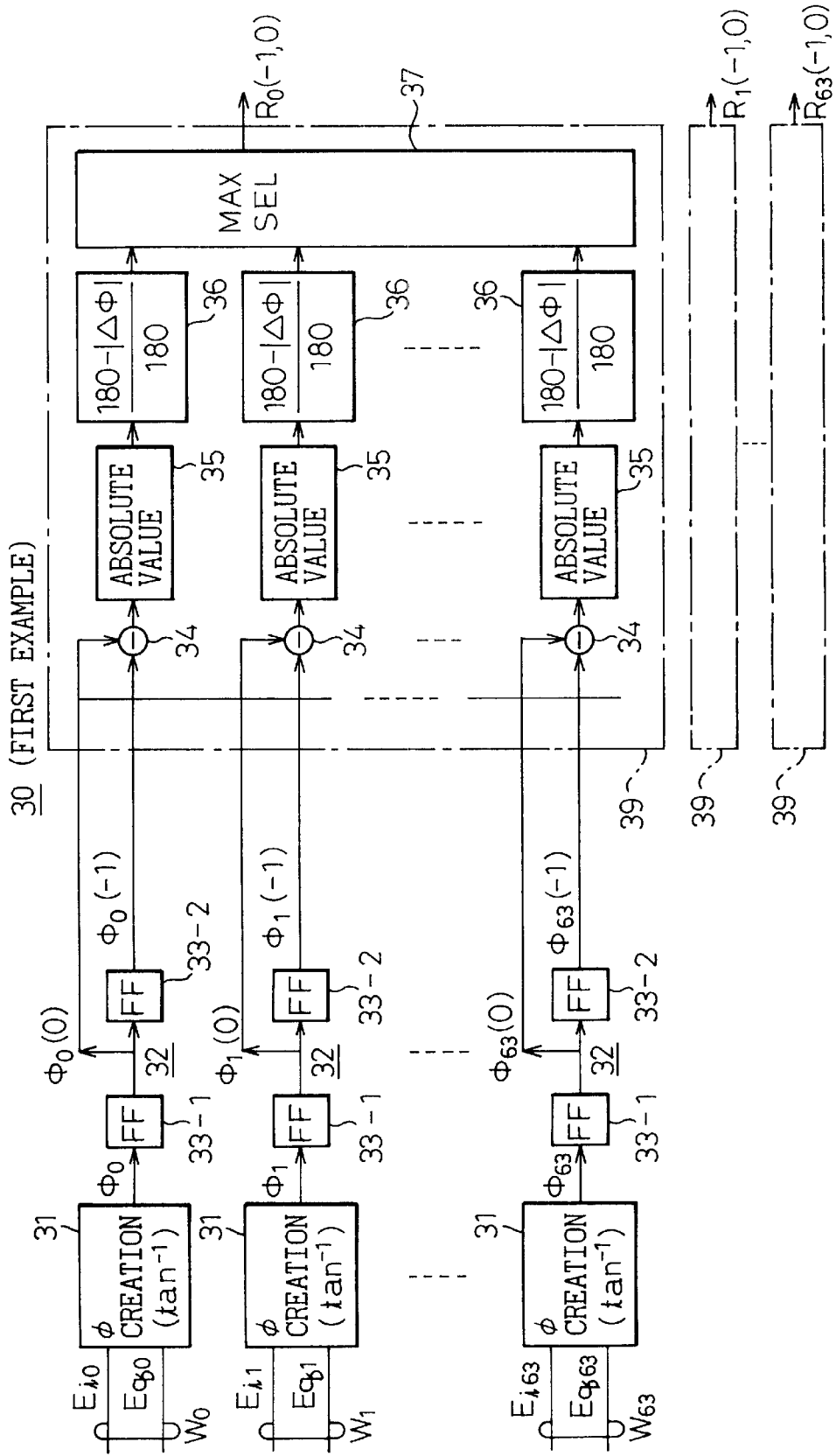
FIG. 5 is a view of a first example of a reliability calculating unit 30.

FIG. 5 is a view of a first example of the reliability calculating unit 30.

This reliability calculating unit 30 (first example) receives as its inputs the correlation electric powers (Ei, Eq) after the Fast Hadamard Transform from the Fast Hadamard Transform unit 16 in correspondence with the Walsh numbers (W0, W1, ..., W63), (left end of the same figure) and outputs the reliabilities R0(-1, 0), R1(-1, 0), corresponding to the Walsh numbers.

First, the input stage is provided with a receiving. phase angle (Φ) creation circuit 31 in correspondence with the Walsh numbers (W0, W1, ..., W63). This performs the calculation of tan based on equation (2). The receiving phase angles Φ0, Φ1, ..., Φ63 for every Walsh number obtained in this way are applied to corresponding signal transition circuits 32. Such a circuit 32 is constituted by for example two cascade-connected flip-flops (FF) 33-1 and 33-2. When viewing a division having a Walsh No. W0, the receiving phase angle Φ0(0) at the present Walsh symbol time (Tws= 0) is obtained from the output of the flip-flop 33-1 of the first stage, and the receiving phase angle Φ0(-1) 1 Tws before is obtained from the output of flip-flop 33-2 of the second stage.

These Φ0(0) and Φ0(-1) are input to a subtractor 34. Due to this, the already mentioned preceding phase difference angle ΔΦ(=Φ0(0)-Φ0(-1)) is obtained. This corresponds to the term of Φ0(0)-Φ0(-1) in equation (3).

The output of the subtractor 34 is input to an absolute value circuit 35. The term of |Φ0(0)-Φ0(-1)| in equation (3) is calculated there.

Further, the reliability calculating circuit 36 calculates the entire equation (3) to obtain the reliability R0[W0(-1), W0(0)] to besought.

The same calculation operation is used for the other divisions of the Walsh numbers (W1, ..., W63). The reliability for every division is obtained from the reliability calculating circuits. Then, the reliabilities obtained from all of the divisions of the Walsh numbers are input to the maximum reliability selecting circuit (MAX SEL) 37, the maximum reliability among them is selected, and the output R0(-1, 0) to be sought is obtained. This corresponds to equation (4).

The above operation is also applied to the other Walsh Nos. W1, ..., W63, whereby the outputs (reliabilities) R1(-1, 0), ..., R63(-1, 0) to be sought are obtained. This corresponds to the case of n=1, ..., 63 in equation (5).

As mentioned above, the reliability calculating unit 30 of the present invention is constituted so as to include therein a receiving phase angle creation circuit 31 for receiving as its inputs the I-channel correlation electric power (Ei) and the Q-channel correlation electric power (Eq) obtained after the Fast Hadamard Transform by the Fast Hadamard Transform unit 16 for every Walsh number (W0, W1, ..., W63) and creating the receiving phase angle from values of the I-channel and Q-channel correlation electric powers.

Further, this reliability calculating unit 30 contains a signal transition circuit 32 for receiving as its inputs the receiving phase angles and obtaining the receiving phase angle for each consecutive two Walsh symbol times. Here, the signal transition circuit 32 comprises the cascade-connected flip-flops 33-1 and 33-2.

Furthermore, this reliability calculating unit 30 is constituted so as to include therein a subtractor 34 for receiving as its inputs two receiving phase angles individually created for consecutive two Walsh symbol times from values of the I-channel correlation electric power (Ei) and the Q-channel correlation electric power (Eq) obtained after the Fast Hadamard Transform, taking the difference between them, and outputting this and is further provided with an absolute value circuit 35 taking the absolute value of the phase difference angles.

Further, the reliability calculating unit 30 is configured so as to contain therein a reliability calculating circuit 36 for obtaining receiving phase angles created from values of the I-channel correlation electric power (Ei) and the Q-channel correlation electric power (Eq) obtained after the Fast Hadamard Transform for two consecutive Walsh symbol times, obtaining the phase difference angle as the difference between them, and calculating the reliability (R) based on this phase difference angle. Here, this reliability calculating circuit 36 is constituted so as to calculate the reliability (R) by:

(180 deg-|ΔΦ|)/180 deg if the phase difference angle is ΔΦ.

Further, this reliability calculating unit 30 is configured so as to contain therein a maximum reliability selecting circuit 37 for obtaining two receiving phase angles obtained for two consecutive Walsh symbol times from values of the I-channel correlation electric power (Ei) and the Q-channel correlation electric power (Eq) obtained after the Fast Hadamard Transform for every Walsh number (W0, W1, ..., W63), selecting the maximum reliability from among reliabilities for every Walsh number calculated based on the phase difference angle obtained by taking the difference between them, and outputting the reliability (R) to be sought.

Figure 6:
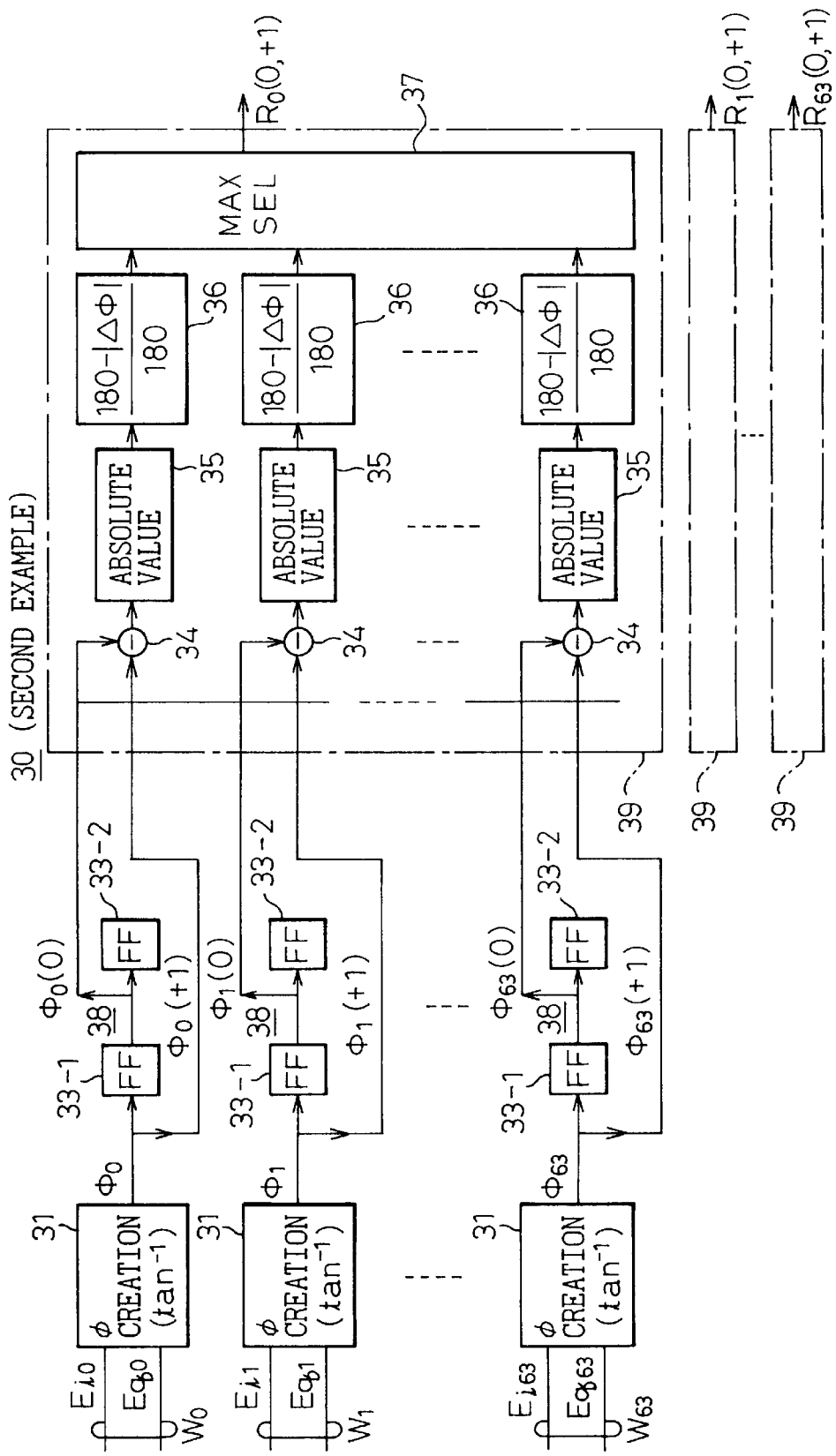
FIG. 6 is a view of a second example of the reliability calculating unit 30.

FIG. 6 is a view of a second example of the reliability calculating unit 30. The reliability calculating unit 30 (first example) shown in FIG. 5 mentioned above calculates the reliability R[W0(0), W0(-1)] by taking note the transition of the signal from the preceding Tws (-1) to the present Tws(0) of the Walsh symbol time (Tws), but the reliability calculating unit 30 of the second example shown in FIG. 6 calculates the reliability R[W0(0), W0(+1)] by taking note the transition of the signal from the present Tws(0) to the following Tws (+1). This is as already mentioned and equations (7), (8), (9), and (10) are applied.

The point of difference in the hardware of this second example with respect to the first example resides in a signal transition circuit 38 in FIG. 6. This has the same structure as that of the signal transition circuit 32 shown in FIG. 5, but differs in the method of picking up the output. This is for picking up the phase angle Φ(+1) following the present phase angle Φ(0). Note, in this case, the flip-flop 33-2 becomes a dummy.

Each of the reliability calculating unit 30 of the first example (FIG. 5) and the reliability calculating unit 30 of the second example (FIG. 6) can be used alone, but preferably the two are simultaneously used.

Figure 7:
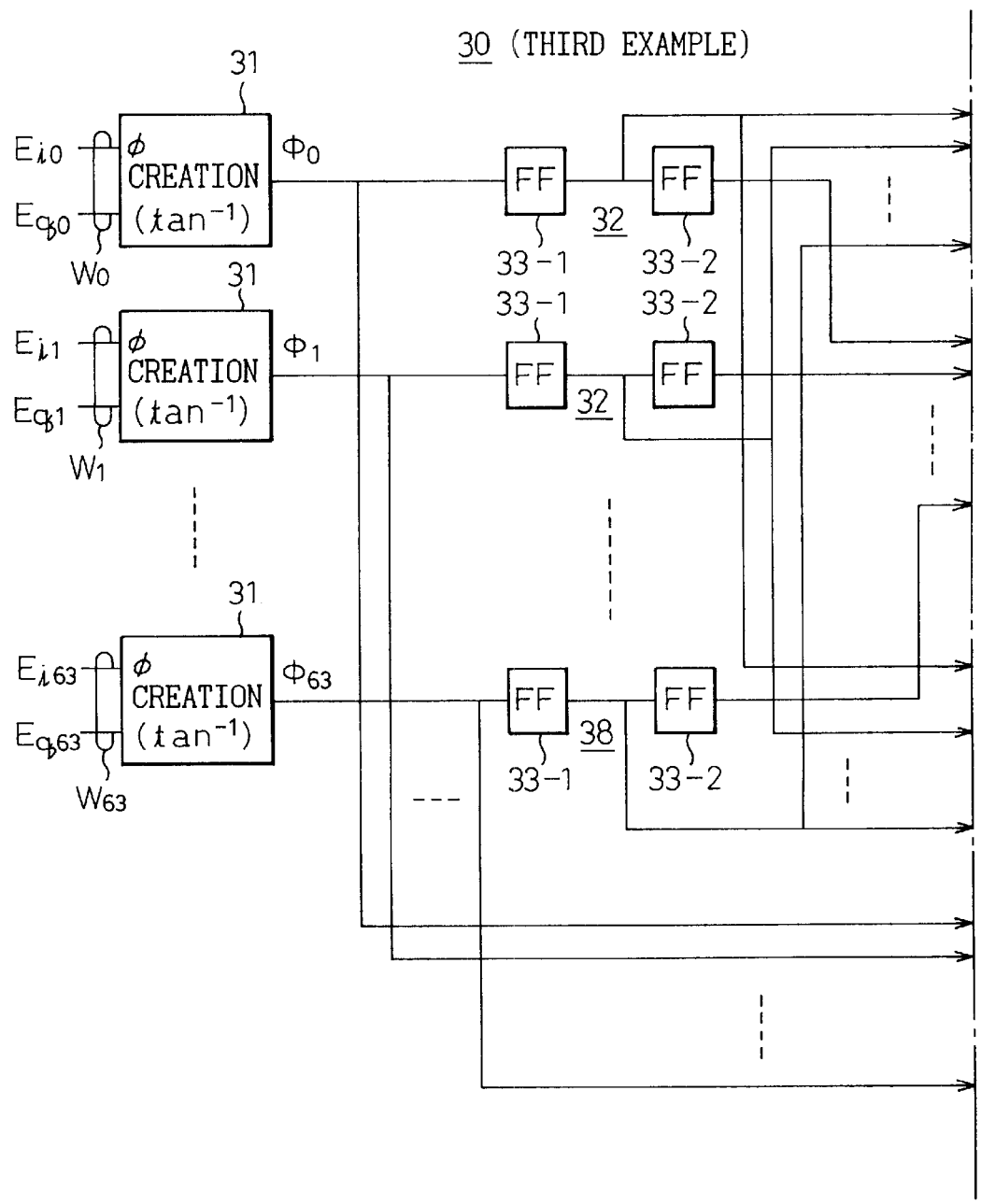
FIG. 7 is a first part of a view of a third example of the reliability calculating unit 30.
Figure 8:
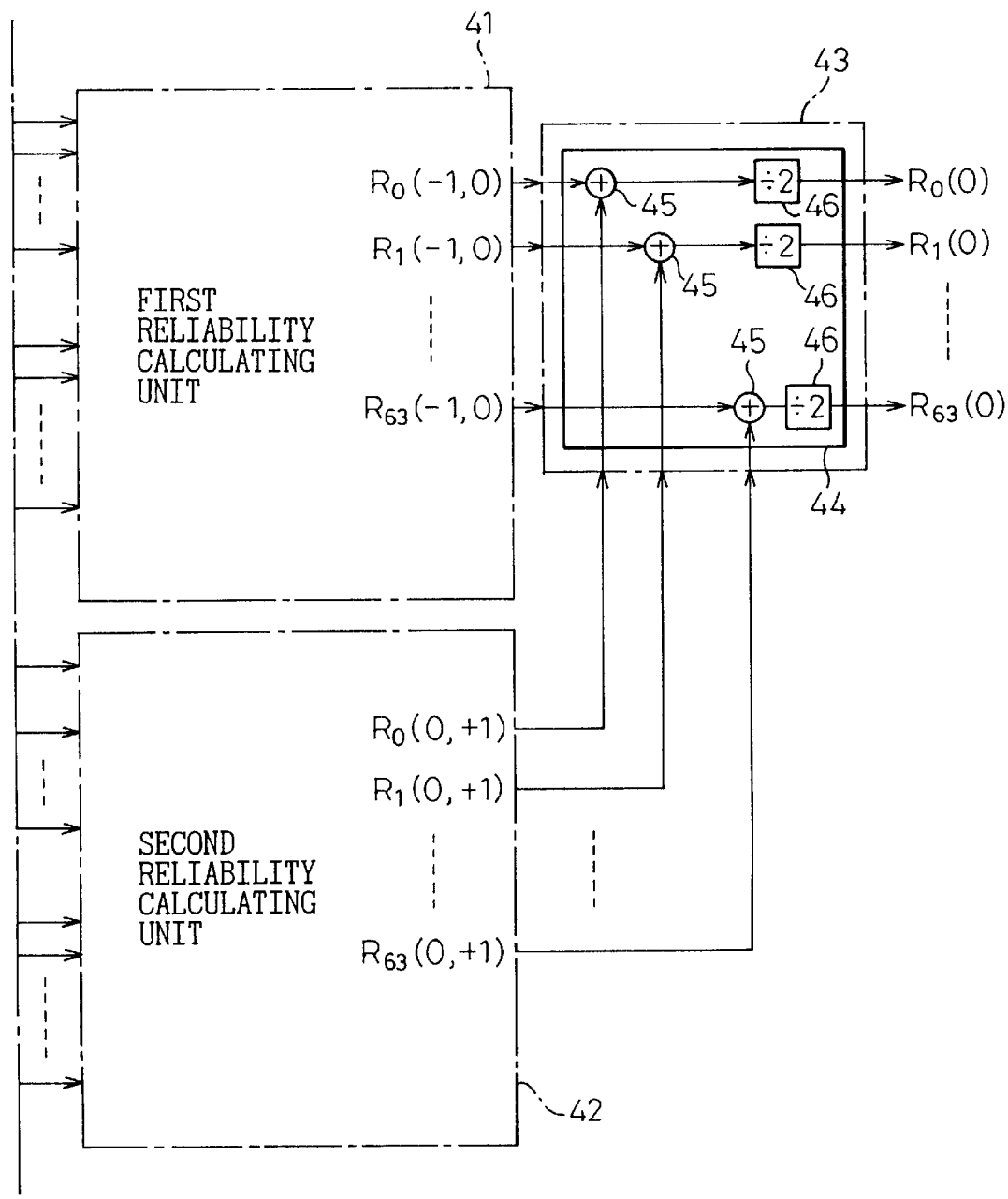
FIG. 8 is a second part of a view of the third example of the reliability calculating unit 30.

FIG. 7 and FIG. 8 are first and second parts of view of a third example of the reliability calculating unit 30.

The reliability calculating unit 30 of the third example shown in FIG. 7 and FIG. 8 combines the calculating unit utilizing the preceding phase difference ΔΦ(-1) and the calculating unit utilizing the following phase difference ΔΦ(+1) shown in FIG. 5 and FIG. 6 and in addition processes the reliabilities from these two calculating units by a certain processing means to calculate further higher precision reliabilities R0(0), R1(0), ..., R63(0). Note that an upper portion in FIG. 7 corresponds to a left half of FIG. 5, and a lower portion in FIG. 7 corresponds to the left half of FIG. 6. The upper portion in FIG. 8 shows a first reliability calculating unit 41, and the lower portion in FIG. 8 shows a second reliability calculating unit 42. The structures of the two are the same as that of the calculating part 39 shown in FIG. 5 and FIG. 6.

Further, the above certain processing means is shown as a processing means 43 in FIG. 8.

Thus, the reliability computing means (21) exemplified here has:

(i) a first reliability calculating unit 41 which obtains two receiving phase angles Φ(0) and Φ(-1) created for the present Walsh symbol time (Tws=0) and the Walsh symbol time (Tws=-1),preceding this (0) from values of the I-channel correlation electric power (Ei) and the Q-channel correlation electric power (Eq) obtained after the Fast Hadamard Transform for every Walsh number (W0, W1, . . . , W63), calculates the first reliability based on the first phase difference angle between these receiving phase angles, and outputs the same;

(ii) a second reliability calculating unit 42 which obtains two receiving phase angles Φ(0) and Φ(+1) created for the present Walsh symbol time (Tws=0) and the Walsh symbol time (Tws=+1) following this (0) from values of the I-channel correlation electric power (Ei) and the Q-channel correlation electric power (Eq) obtained after the Fast Hadamard Transform for every Walsh number, calculates the second reliability based on the second phase difference angle between these receiving phase angles, and outputs the same; and further (iii) a processing means 43 for performing predetermined processing with respect to the first reliability and the second reliability and outputting the reliability (R) to be sought.

Here, preferably the processing means 43 is an average circuit 44 for taking the average value of the first reliability and second reliability.

The average circuit 44 can be constituted by for example an adder 45 for adding signals representing the first and second reliabilities and a ½ divider 46 for averaging the outputs of this adder 45.

Figure 9:
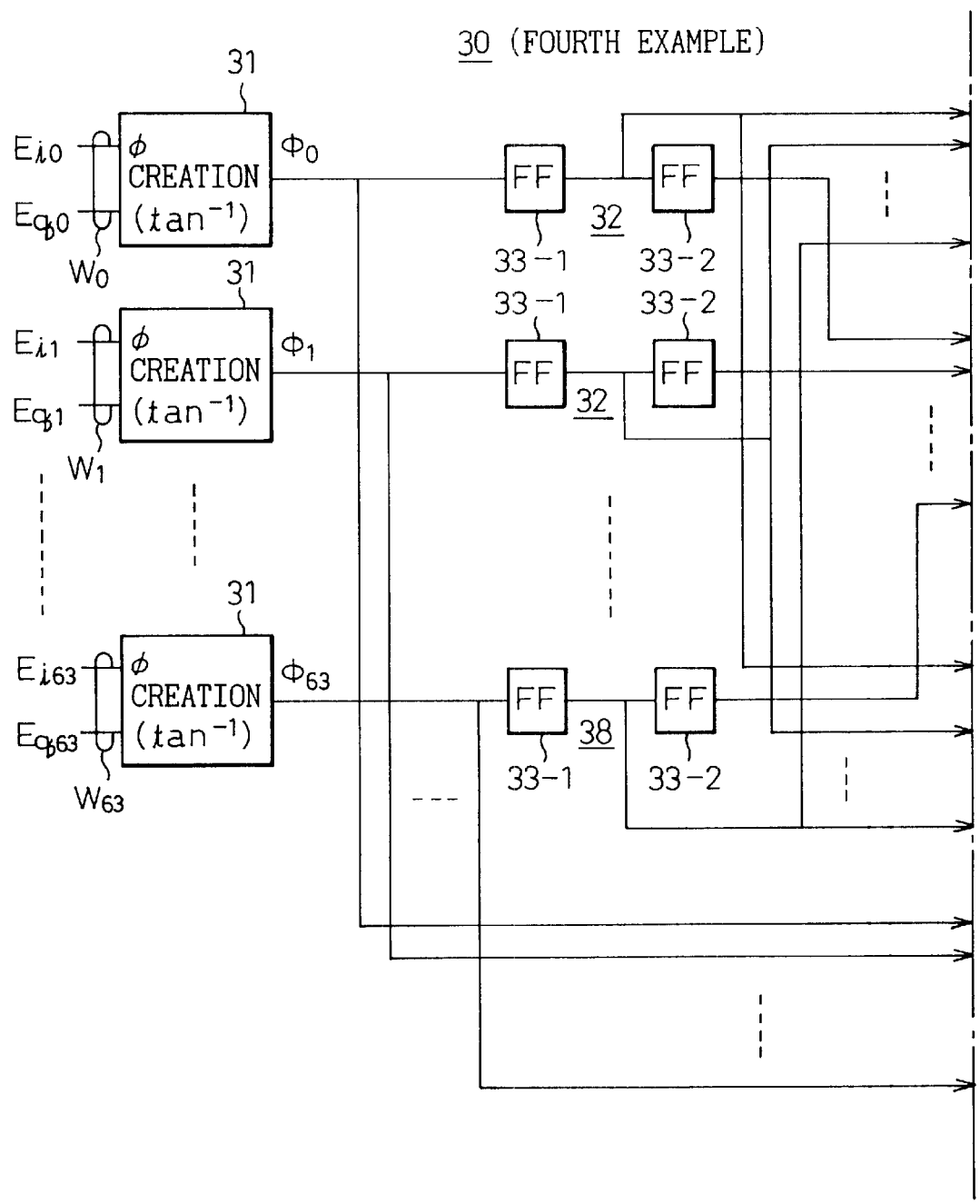
FIG. 9 is a first part of a view of a fourth example of the reliability calculating unit 30.
Figure 10:
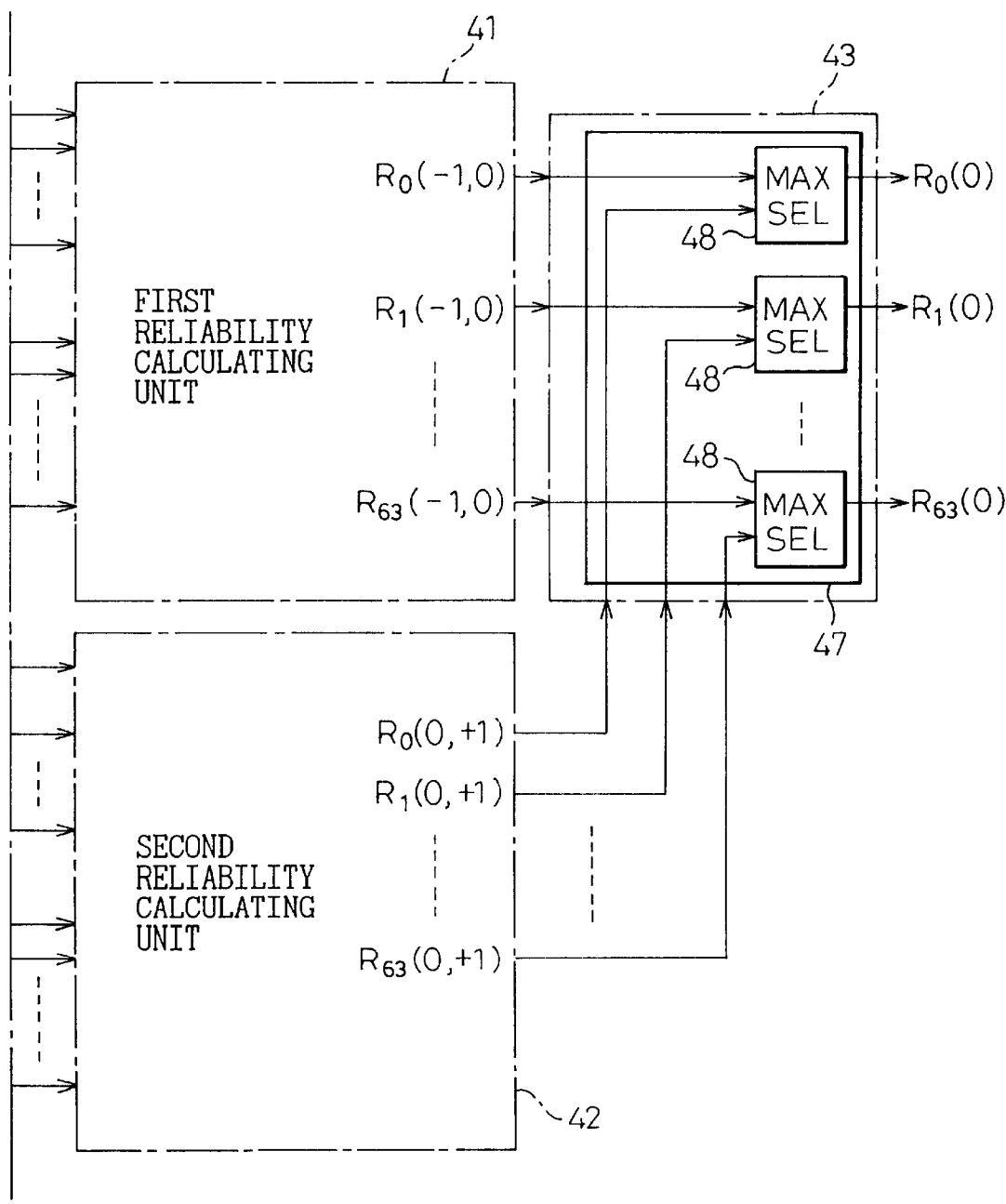
FIG. 10 is a second part of a view of the fourth example of the reliability calculating unit 30.

FIG. 9 and FIG. 10 are first and second parts of a view of a fourth example of the reliability calculating unit 30.

The reliability calculating unit 30 of this fourth example is different from the reliability calculating unit 30 of the third example in the structure of the processing means 43 (FIG. 10). In this fourth example, the larger reliability between the first reliability R1 obtained based on the preceding phase difference angle ΔΦ(-1) and the second reliability R2 obtained based on the following phase difference angle ΔΦ(+1) is selected and defined as the reliability R to be sought. This is carried out for every Walsh number (W0, W1, . . . , W63). In the final analysis, this means that the maximum reliability is selected from among 128 (=64×2) signal transitions.

Accordingly, the reliability Rn(0) for any Walsh No. Wn (n=0, 1, 2, . . . , 63) becomes as shown in the following equation (12):

$$Rn(0)=max\{Rn(-1, 0), Rn(0, +1)\} \quad (12)$$

Note that max { } means to select the larger of the terms in { }.

Referring to FIG. 10, the processing means 43 is constituted by the maximum value selecting unit 47 and performs the selection according to equation (12). As a concrete example, in the figure, the maximum value selecting unit 47 is constituted by a selector 48 provided in correspondence for each Walsh number. According to the reliability calculating unit 30 of this fourth example, the following inherent effect will be obtained.

This inherent effect is that the reliability R is correctly obtained even if the transmission signal from the transmission side becomes a burst signal. In the reverse-link defined in IS-95, a burst signal of a unit of power control groups (=6 Walsh symbols) is sometimes generated. This is because when for example the interval of generation of a voice from the transmission side becomes long, the transmission rate is lowered and as a result the transmission signal becomes a burst signal. When receiving such a burst signal, there may occur a case where even if the first reliability obtained by the already mentioned preceding phase difference angle can not be relied upon at all, the second reliability obtained by the already mentioned following phase difference angle is correct. Also, reverse cases to this may occur. This being so, the possibility that the larger of the first reliability and the second reliability is not influenced by the burst signal is high and the larger reliability can be utilized as the correct one. This is the inherent effect by the fourth example.

Figure 11:
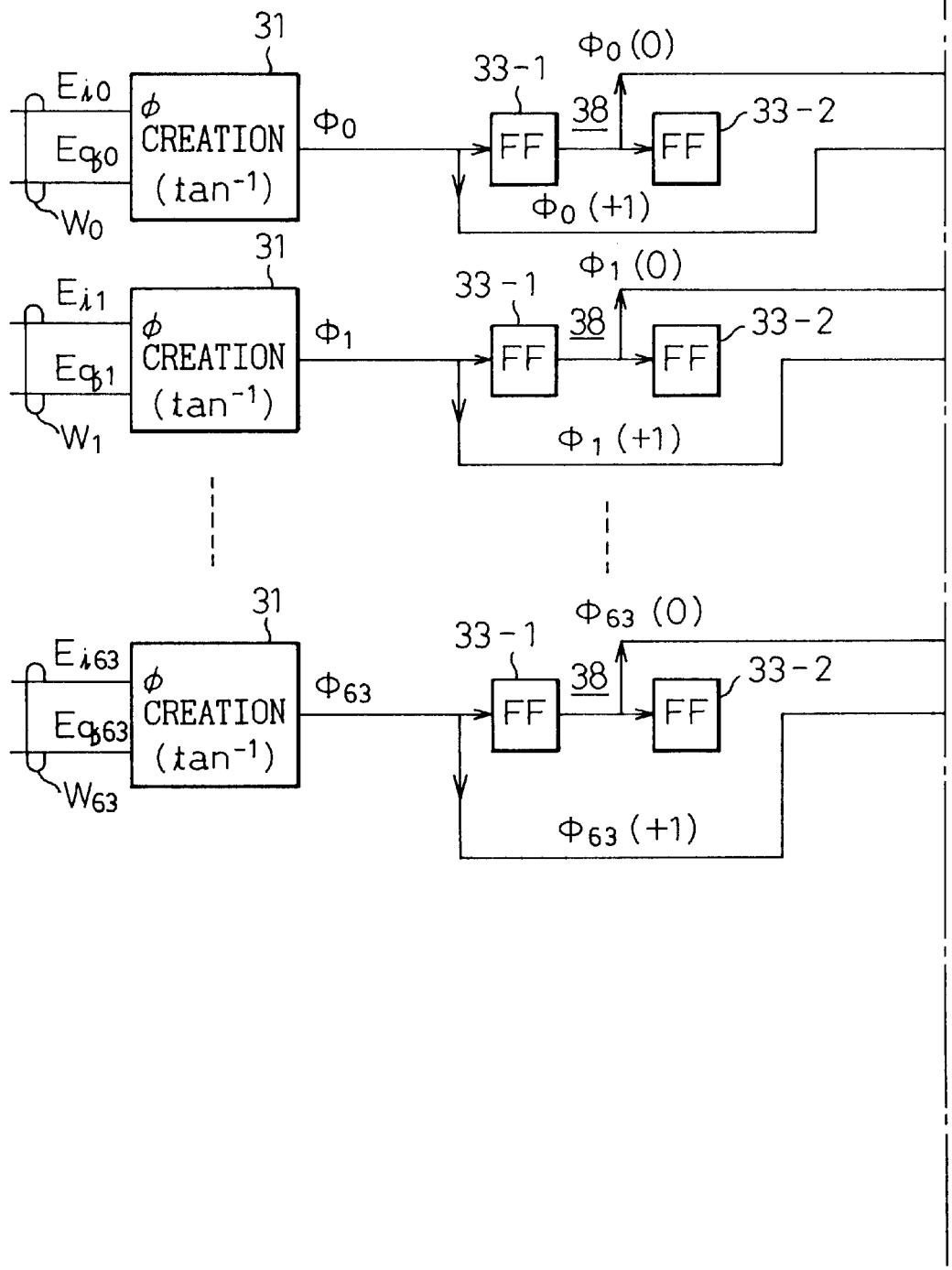
FIG. 11 is a first part of a view of a fifth example of the reliability calculating unit 30.
Figure 12:
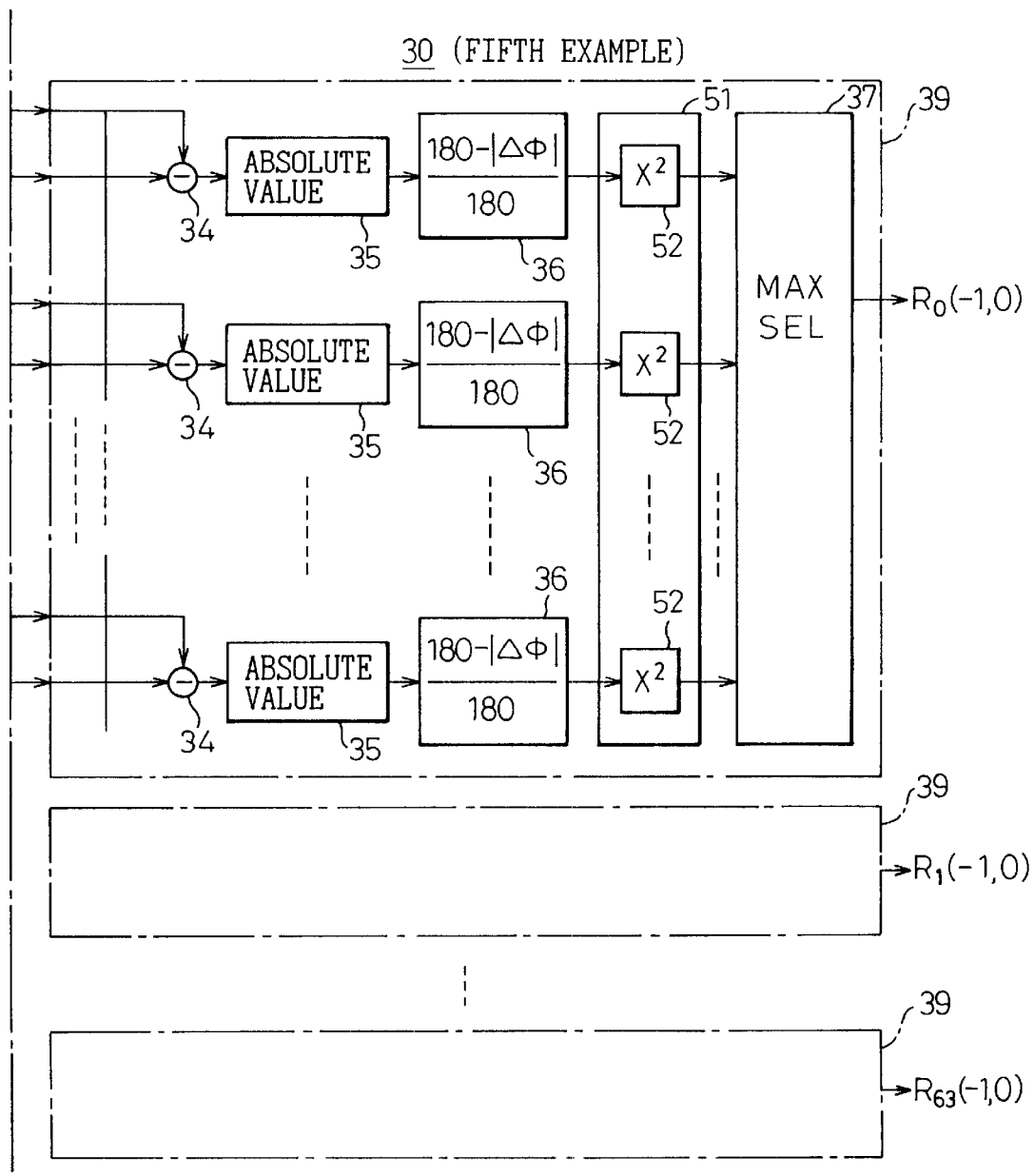
FIG. 12 is a second part of a view of the fifth example of the reliability calculating unit 30.

FIG. 11 and FIG. 12 are first and second parts of a view of a fifth, example of the reliability calculating unit 30.

The configuration of this reliability calculating unit 30 of the fifth example is obtained by adding a weighting circuit 51 to for example the configuration of the first example shown in FIG. 5. Namely, in this fifth example, in the computation of the reliability R, weighting is performed so that the reliability R is made larger along with the reduction of the phase difference angle ΔΦ. Further, if necessary, the reliability R is made smaller along with the increase of the phase difference angle ΔΦ.

In the explanation heretofore, as shown by equation (3) and equation (7), the reliability R was treated as if it changed with a primary function, but in this fifth example, the above mentioned weighting is carried out for this primary function depending on the system situation. This is to sharply bring the reliability to 1 as the phase difference angle approaches 0 deg.

Here, various statuses can be considered as the system situation. For example, the occurrence of the above-mentioned burst signal in a system is one such situation. Further, the mode of distribution of noise on the radio transmission path is another such situation. The weighting may be set case by case in accordance with the actual operating system.

Referring to FIG. 12, the reliability calculating unit 30 is constituted so as to contain therein such a weighting circuit 51 that makes the reliability R smaller along with the increase of the phase difference angle ΔΦ and makes the reliability R larger along with the reduction of the phase difference angle ΔΦ. A square circuit 52 is shown as an example of realization of the weighting circuit 51. The reliability R[Wn(0), W0(0)] in this case can be shown by the following equation (13), where n is indicated as n=0, 1, . . . , 63.

$$R[Wn(-1), W0(0)] \times \{(180 \text{ deg}-|\Phi 0(0)-\Phi n(-1)|)/180 \text{ deg}\}^2 \quad (13)$$

Figure 13:
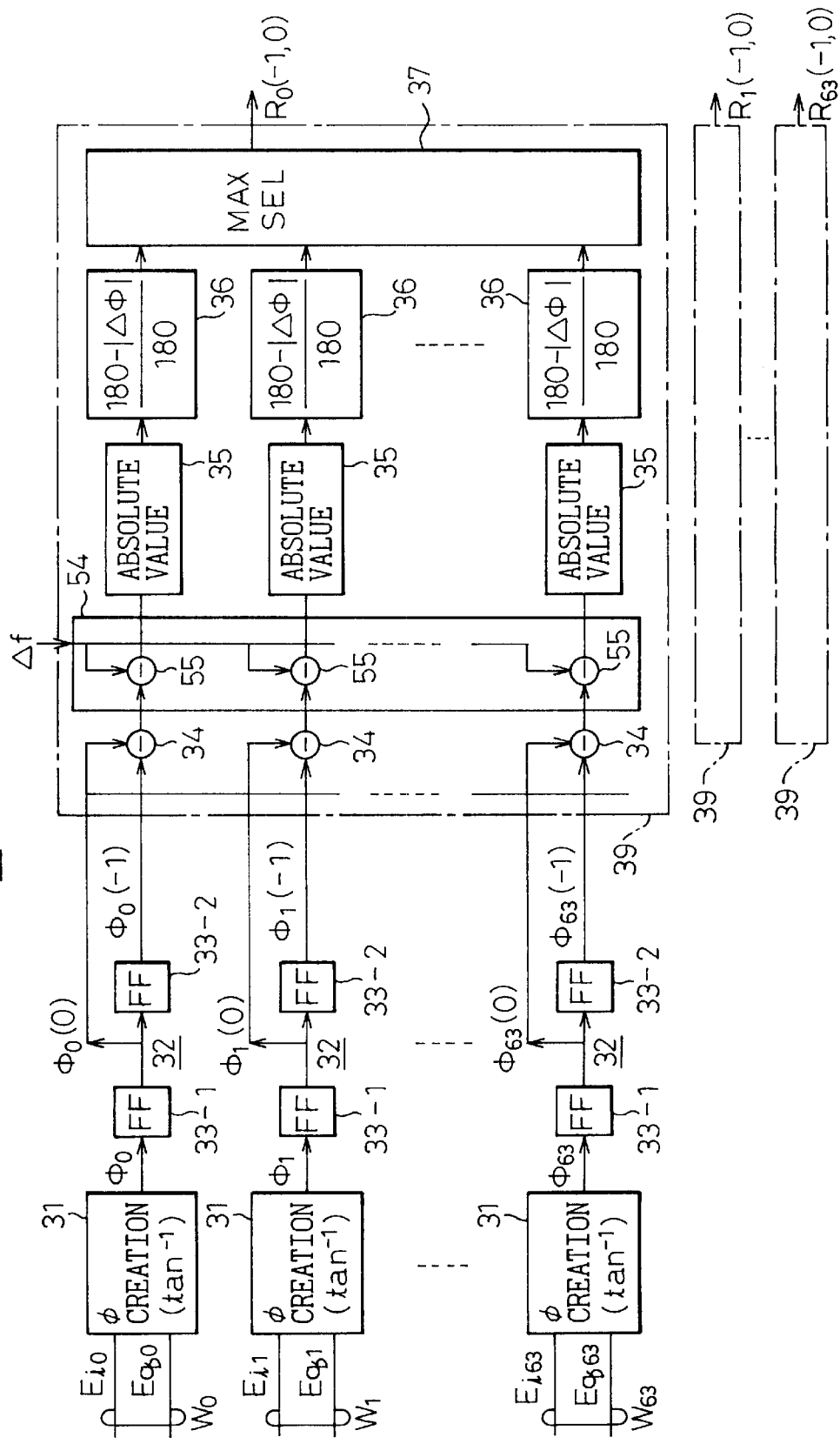
FIG. 13 is a view of a sixth example of the reliability calculating unit 30.

FIG. 13 is a view of a sixth example of the reliability calculating unit 30.

This reliability calculating unit 30 of the sixth example is obtained by adding the frequency difference compensating unit 54 to for example the first example shown in FIG. 5. Namely, in this sixth example, in the computation of the reliability R, the above computation is carried out by using the compensated phase difference angle obtained by compensation for the phase difference angle ΔΦ by the frequency difference between the received reference carrier frequency and the reference carrier frequency on the transmission side. Namely, the reliability R[Wn(-1), W0(0)] shown in equation (6) is shown as in the following equation (14):

$$R[Wn(-1), W0(0)]=180 \text{ deg}-|\Delta f-(\Phi 0(0)-\Phi n(-1))|)/180 \text{ deg} \quad (14)$$

In the explanation heretofore, the reliability R was computed by regarding the frequency difference thereof being almost 0 (Δf=0). This is because, in the IS-95 standard, Δf is defined as 300 Hz or less. However, in terms of the operation of the next generation mobile communications systems, it has been requested that the restriction that Δf<300 Hz be eased. For example, it is desirable that a high precision reliability R be obtained up to for example Δf≈1000 Hz.

Referring to FIG. 37, the reliability R was computed by regarding the receiving phase angle (indicated for example for the vector W35 as being fixed on the phase plane, but if the frequency difference Δf cannot be ignored, each vector starts rotating on the phase plane at a speed proportional to the magnitude of this Δf. The frequency difference compensating unit 54 shown in FIG. 13 seemingly stops this rotation. As an example of its realization, a subtractor 55 is shown in the figure. Thus, the reliability calculating unit 30 based on the sixth example is configured so as to contain therein the frequency difference compensating unit 54 for compensating for the phase difference angle ΔΦ by the frequency difference between the received reference carrier frequency and the reference carrier frequency on the transmission side.

Note that the frequency difference Δf can be found by utilizing the output of an automatic frequency discriminating circuit provided on the reception side (demodulation side). Alternatively, it is also possible to calculate the frequency difference Δf by a desktop computer or the like and use this Δf.

Figure 14:
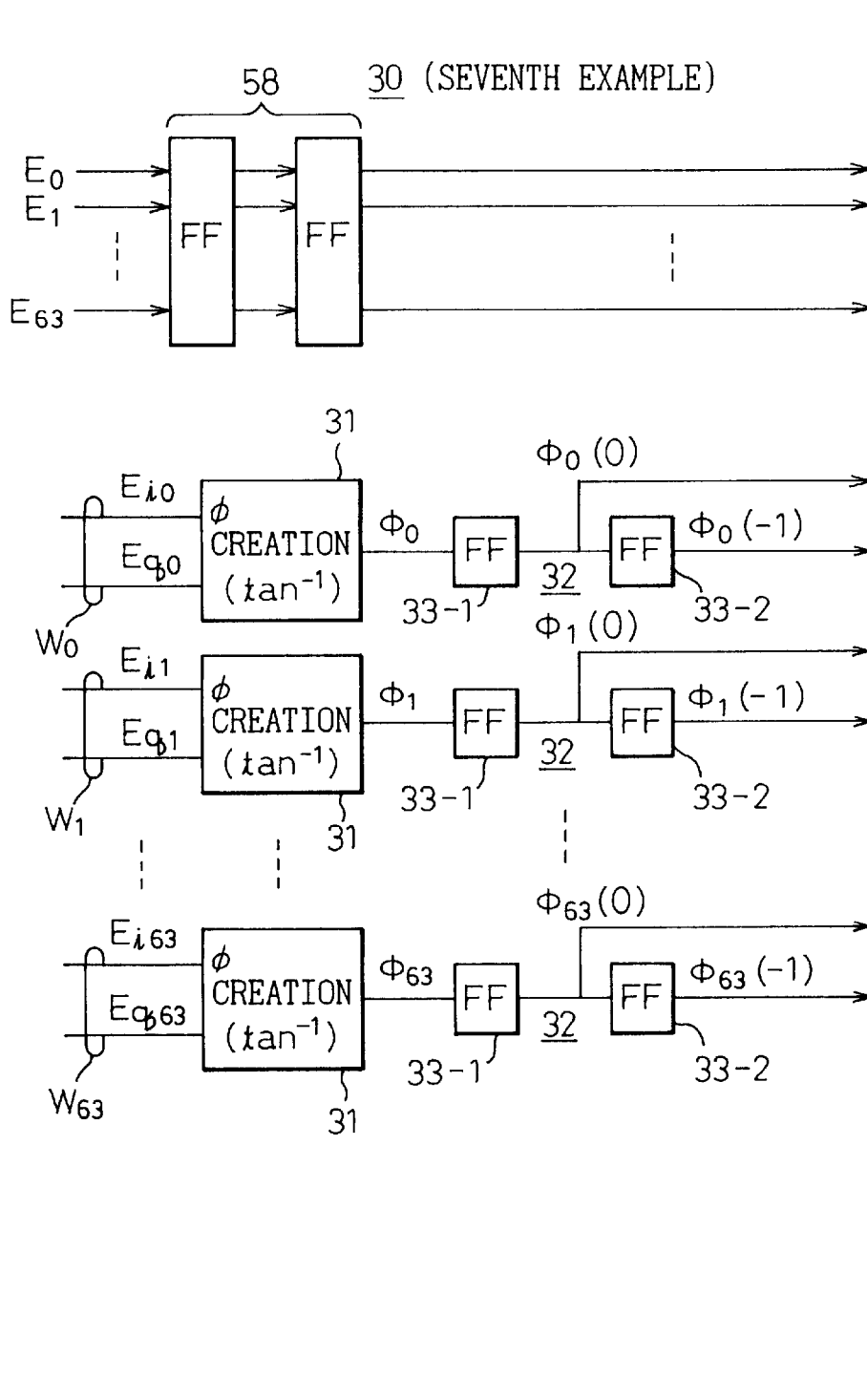
FIG. 14 is a first part of a view of a seventh example of the reliability calculating unit 30.
Figure 15:
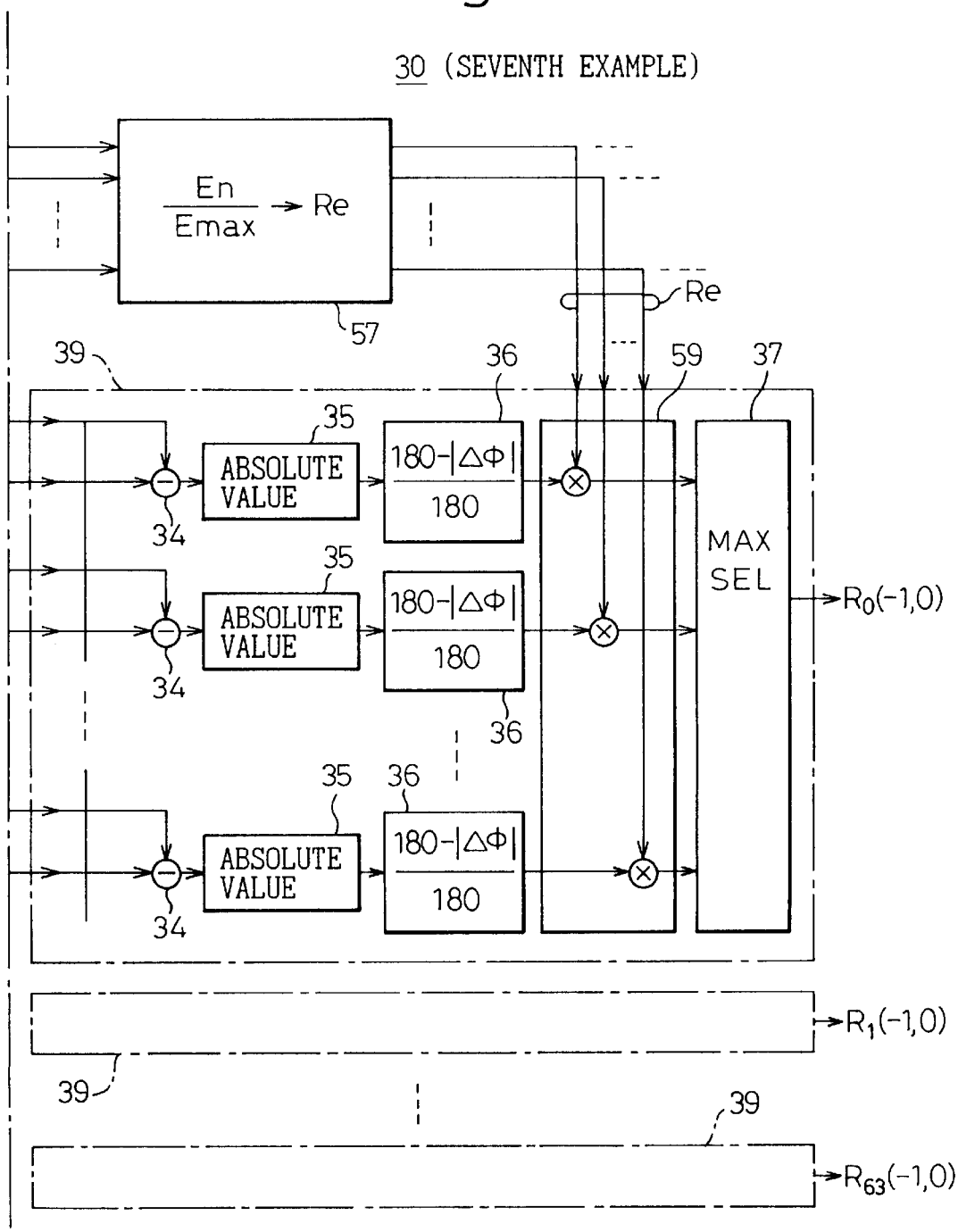
FIG. 15 is a second part of a view of the seventh example of the reliability calculating unit 30.

FIG. 14 and FIG. 15 are first and second parts of a view of a seventh example of the reliability calculating unit 30.

The configuration of this reliability calculating unit 30 of the seventh example is obtained by adding a reliability compensating unit 57 (FIG. 15) to for example the configuration of the first example shown in FIG. 5. Note that a new flip-flop stage 58 in FIG. 14 is the flip-flop for the time adjustment. This seventh example stands based on the following basic concept, namely, in the computation of the reliability R, a compensated reliability Re calculated based on the correlation energies E0, E1, . . . , E63 (refer to FIG. 1) for every Walsh symbol time detected for every Walsh number (W0, W1, . . . , W63) is further introduced. Further concretely, in this seventh example, the compensated reliability Re is calculated as the ratio of the correlation energy for every Walsh number with respect to the maximum correlation energy Emax among correlation energies En detected, for every Walsh number, one Walsh symbol time (Tws) before the correlation energies (E0, E1, . . . , E63) detected at the present Walsh symbol time.

Accordingly, this compensated reliability Re can be basically represented by the following equation (15):

$$Re = En/Emax \qquad (15)$$

Note, n=0, 1, . . . , 63. Re means the reliability (R) obtained by noting the energy (e). When noting only the already mentioned phase difference angle ΔΦ, the smaller the ΔΦ, the higher the reliability (R). However, there may also occur a case where the correlation energy (correlation energy from the energy calculating unit ($I^2+Q^2$) 17) is small irrespective of the fact that the ΔΦ is small, and therefore the reliability (R) calculated based on that ΔΦ seems to be not certain. The basic concept is produced by assuming such a case. Namely, the reliability calculating unit 30 contains the reliability compensating unit 57 which calculates the compensated reliability based on the correlation energy at every Walsh symbol time detected for every Walsh number and further introduces this compensated reliability Re with respect to the reliability.

Then, according to the hardware structure shown in FIGS. 14 and 15, the reliability compensating unit 57 selects the maximum correlation energy Emax from among correlation energies En detected, for every Walsh number, one Walsh symbol time before the correlation energy detected at the present Walsh symbol time and outputs the value of the ratio of the correlation energy En for every Walsh number with respect to this maximum correlation energy Emax as the compensated reliability Re. This Re is introduced to the already mentioned reliability. In the example shown in FIG. 15, Re is multiplied with respect to that reliability at a multiplier unit 59.

According to equation (15), this means that the vector of the Walsh number having the highest energy is the compensated reliability 1 (Re=1).

When generally showing this for all vectors in further detail, the compensated reliability Re [Wn(−1), W0(0)] is represented by the following equation (16):

$$Re[Wn(-1), W0(0)] = En(-1)/Emax \qquad (16)$$

Here, −1 means "one Walsh symbol time before".

In the end, the final reliability (R) shown in FIG. 14 and FIG. 15 becomes as in the following equation (17) if generally representing this (R[Wn(−1), W0(0)]):

$$R[Wn(-1),W0(0)]=(180\ deg-|\Phi0(0)-\Phi n(-1)|)/180\ deg \times Re[Wn(-1),W0(0)]=(180\ deg-|\Phi0(0)-\Phi n(-1)|)/180\ deg \times En(-1)/Emax(-1) \qquad (17)$$

Thus, a further higher precision reliability (R) is obtained by introducing not only the phase difference angle, but also the correlation energy.

In the seventh example, the basic concept is realized by using the correlation energy En(−1) detected one Walsh symbol time before, but the same can be realized also with the use of the correlation energy En (+1) detected one Walsh symbol time after. Namely, the compensated reliability Re is calculated as the ratio of the correlation energy for every Walsh number with respect to the maximum correlation energy Emax among correlation energies En (+1) detected for every Walsh number W0, W1, . . . , W63 after one Walsh symbol time continuing from the correlation energy En(0) detected at the present Walsh symbol time.

The reliability compensating unit 57 of FIG. 15 in this case selects the maximum correlation energy Emax from among correlation energies En(+1) detected for every Walsh number after one Walsh symbol time continuing from the correlation energy detected at the present Walsh symbol time and outputs the value of the ratio of the correlation energy En(+1) for every Walsh number with respect to this maximum correlation energy Emax as the compensated reliability Re.

Accordingly, equation (16) is changed as in the following equation (18):

$$Re[W0(0),Wn(+1)] = En(+1)/Emax \qquad (18)$$

Here, +1 means after one Walsh symbol time.

Further, equation (17) is modified to the following equation (19):

$$R[W0(0),Wn(+1)]=(180\ deg-|\Phi n(+1)-\Phi0(0)|)/180\ deg \times Re[W0(0),Wn(+1)]=(180\ deg-|\Phi n(+1)-\Phi0(0)|)/180\ deg \times En(+1)/Emax(+1) \qquad (19)$$

The demodulation apparatus incorporating the reliability calculating unit 30 of the seventh example mentioned above will be explained below.

Figure 16:
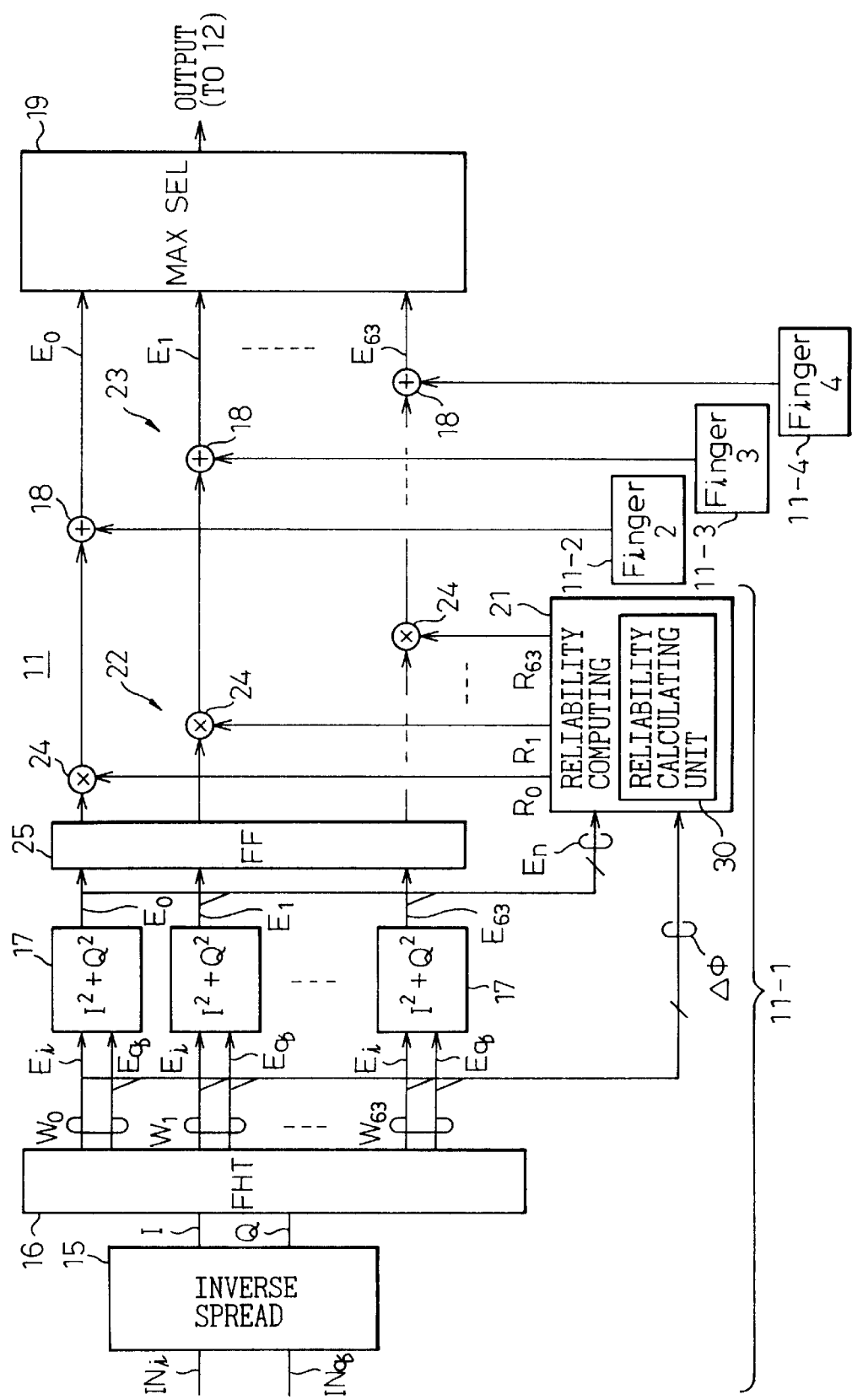
FIG. 16 is a view of a second embodiment of the demodulation apparatus based on the present invention.

FIG. 16 is a view of a second embodiment of the demodulation apparatus based on the present invention. In this second embodiment, the reliability computing means 21 not only has the phase difference angle ΔΦ as the first input information (same as FIG. 4), but also has the correlation energy En in the seventh example as the second input information.

Figure 17:
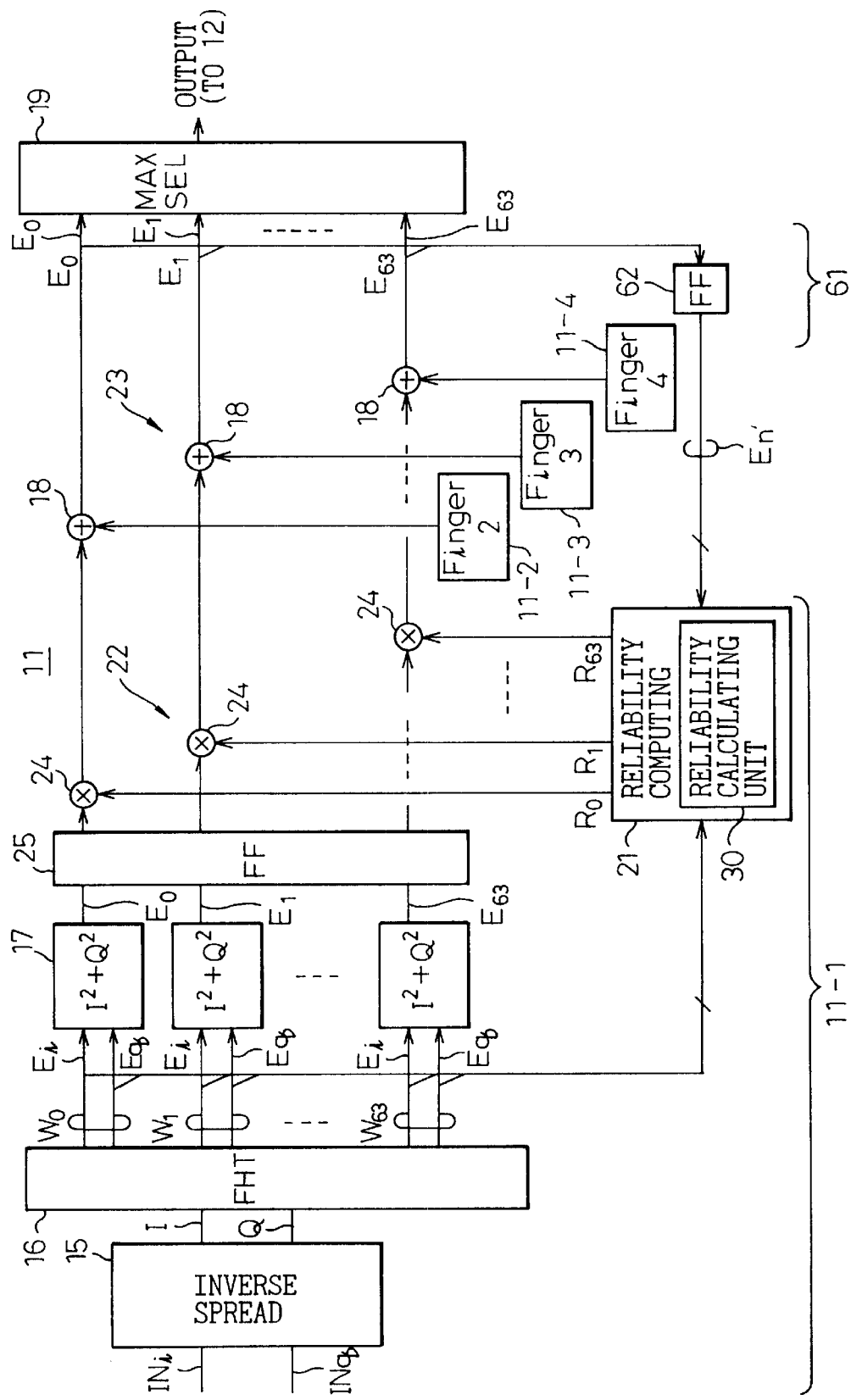
FIG. 17 is a view of a third embodiment of the demodulation apparatus based on the present invention.

FIG. 17 is a view of a third embodiment of the demodulation apparatus based on the present invention. When compared with the second embodiment shown in FIG. 16, the method of picking up the second input information, taking note of the correlation energy, is different. In FIG. 16, it was fetched into the reliability computing means 21 as the illustrated En, but in FIG. 17, it is fetched into the means 21 as En'.

Thus, in the third embodiment, when calculating the compensated reliability Re based on the correlation energy En, the already mentioned corrected correlation energy, that is, the correlation energy to be input to the maximum energy selecting unit (MAX SEL) 19, is used as this correlation energy En. This is indicated as En' in FIG. 17. Referring to the figure, the reliability calculating unit 30 is provided with a feed back part 61 for feeding back the corrected correlation energy as the correlation energy to be applied to the reliability compensating unit 57 (FIG. 15). Note that, 62 is the flip-flop for time adjustment.

Figure 18:
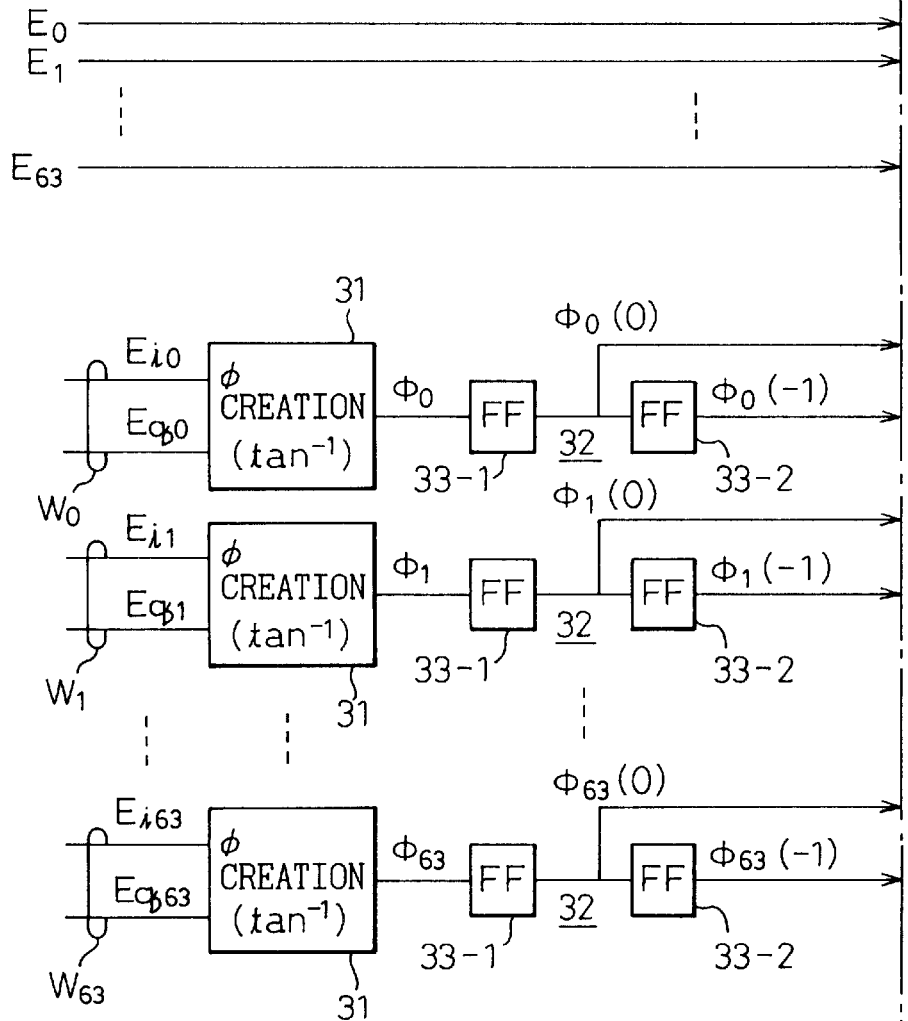
FIG. 18 is a first part of a view of an example of the reliability calculating unit 30 applied to the third embodiment (FIG. 17)
Figure 19:
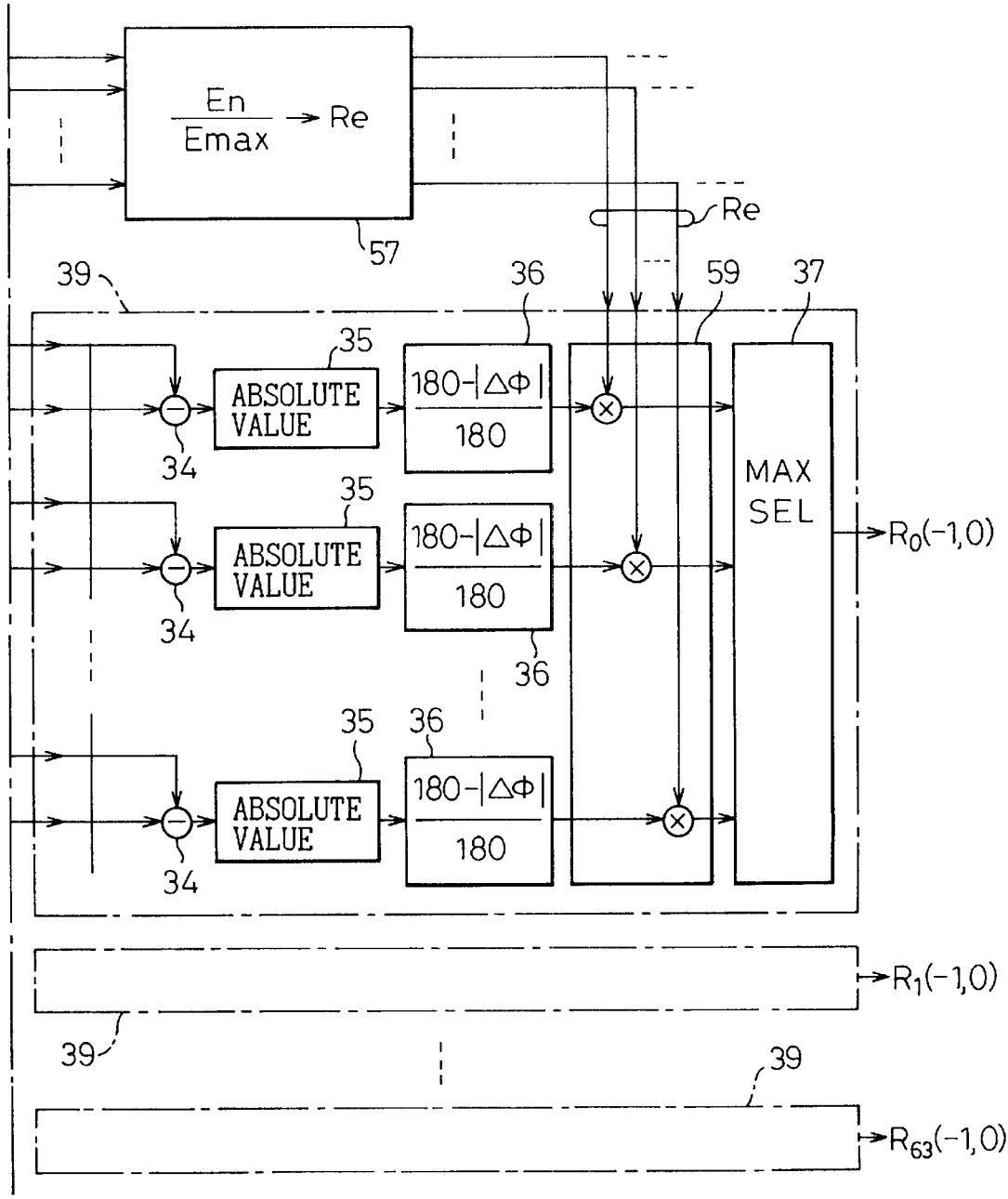
FIG. 19 is a second part of a view of an example of the reliability calculating unit 30 applied to the third embodiment (FIG. 17)

FIG. 18 and FIG. 19 are first and second parts of a view of an example of the reliability calculating unit 30 applied to the third embodiment (FIG. 17).

The reliability calculating unit 30 shown in FIG. 18 and FIG. 19 is substantially the same as the reliability calculating unit shown in FIG. 14 and FIG. 15. The difference resides in the point that the flip-flop stage 58 for the time adjustment is removed. This is because the signal (En') on the rear side of the calculating unit 30 is used in the third embodiment.

The final reliability R multiplied by the compensated reliability Re becomes as shown in the following equation (20) when viewing for example R[Wn(−1), W0(0)]:

$$R[Wn(-1), W0(0)](180 \text{ deg} - |\Phi 0(0) - \Phi n(-1)|)/180 \text{ deg} \times En(-1)/Emax(-1) \quad (20)$$

Namely, the final reliability is obtained by multiplying the compensated reliability (Re) calculated based on the correlation energy −(En, En') with respect to the reliability (R) computed based on the phase difference angle ΔΦ.

The method of thinking of weighting shown in equation (13) is applied to this equation (20) and can be adapted to a variety of system situations.

The first weighting method performs weighting so that the reliability R is made larger along with the reduction of the phase difference angle ΔΦ. When applying this to equation (20), the equation becomes the following equation (21):

$$R[Wn(-1), W0(0)] = \{(180 \text{ deg} - |\Phi 0(0) - \Phi n(-1)|)/180 \text{ deg}\}^2 \times En(-1)/Emax(-1) \quad (21)$$

The second weighting method performs weighting so that the compensated reliability (Re) more sharply approaches 1 as the compensated reliability (Re) approaches 1. When applying this to equation (20), the equation becomes the following equation (22):

$$R[Wn(-1), W0(0)] = \{[(180 \text{ deg} - |\Phi 0(0) - \Phi n(-1)|)/180 \text{ deg}] \times En(-1)/Emax(-1)\}^2 \quad (22)$$

Figure 20:
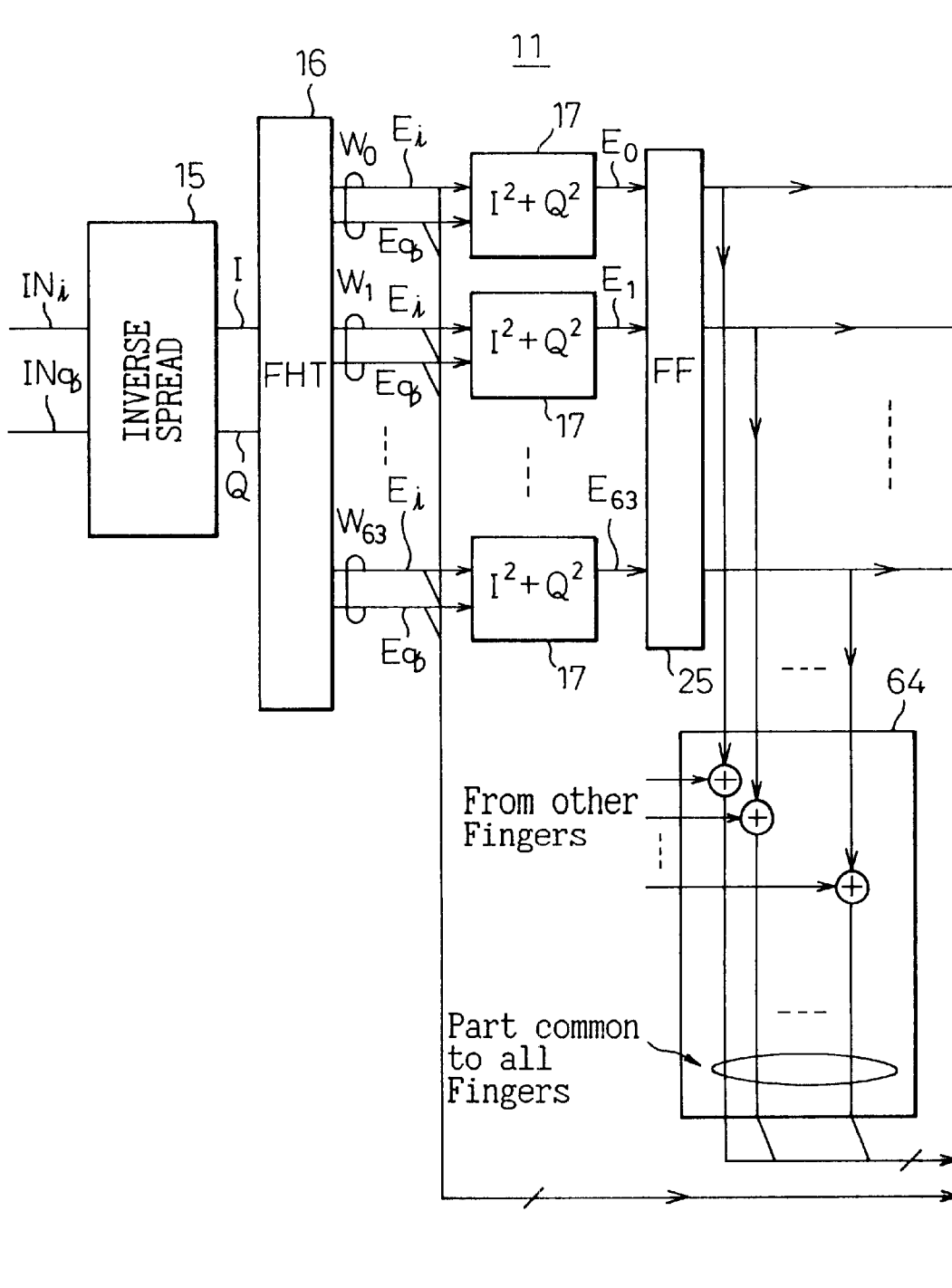
FIG. 20 is a first part of a view of a fourth embodiment of the demodulation apparatus based on the present invention.
Figure 21:
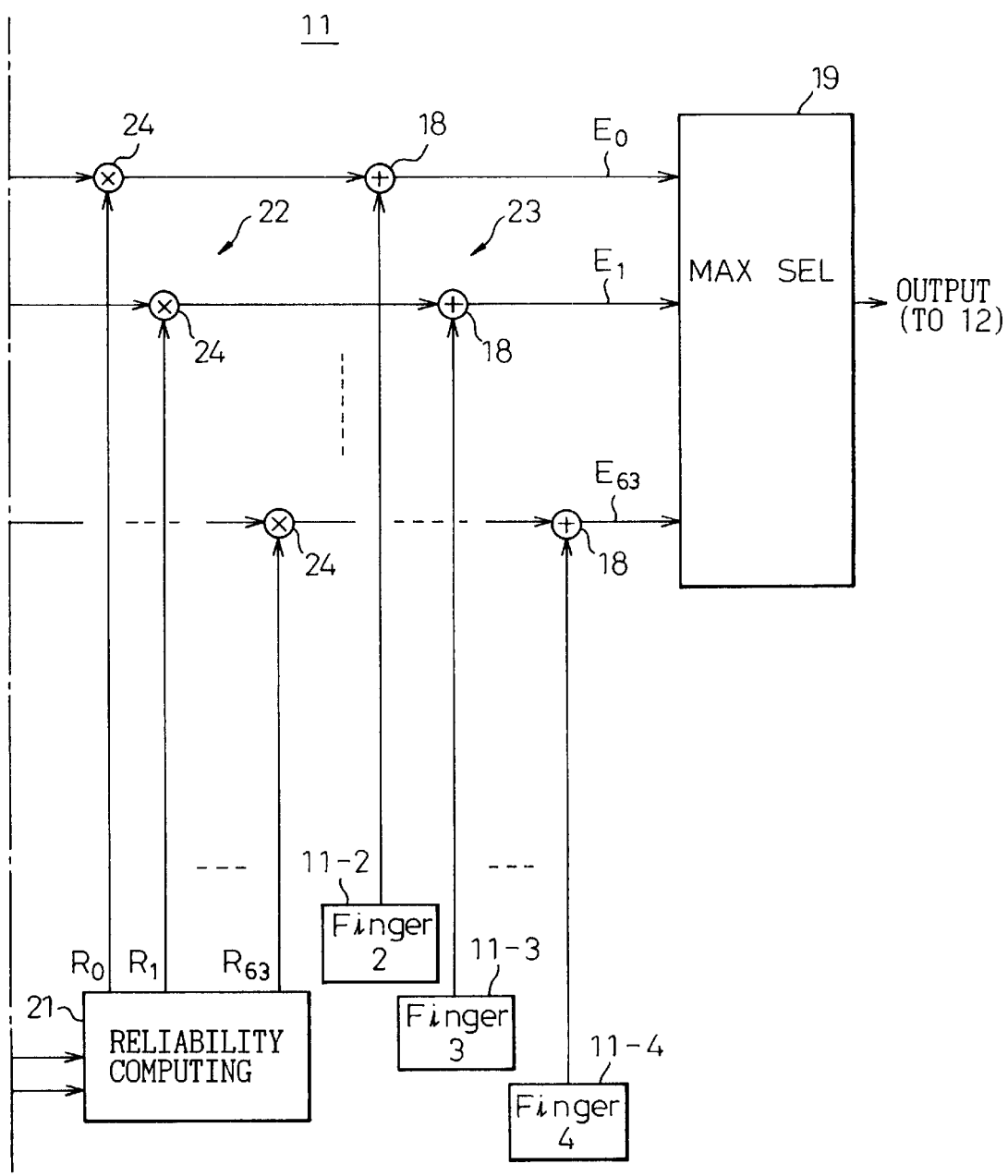
FIG. 21 is a second part of a view of the fourth embodiment of the demodulation apparatus based on the present invention.

FIG. 20 and FIG. 21 are first and second parts of a view of a fourth embodiment of the demodulation apparatus based on the present invention.

In this fourth embodiment, as shown in FIG. 35, attention was particularly paid to the fact that the finger demodulating unit 11 is constituted by a plurality of demodulators (Fingers) 11-1 to 11-4. In the computation of the reliability, the compensated reliability Re calculated based on the correlation energy (E0, E1, . . . , E63) at every Walsh symbol time (Tws) detected for every Walsh number (W0, W1, . . . , W63) was introduced. Here, correlation energies similarly output from a plurality of demodulators 11-1 to 11-4 are combined for every Walsh number to calculate the compensated reliability Re.

Not all of the plurality of demodulators (Fingers) shown in FIG. 35 are always operating. There are also cases where only the first demodulator 11-1 (Finger 1) in the present figure operates. The above explanation was made paying attention to only one demodulator. Note that to determine which among the four demodulators is to be made active, a searcher analyzes the circumstances of the multi path fading, determines each optimum phase delay, and makes two or more suitable demodulators active.

In this way, when two or more demodulators (of 11-1 to 11-4) have become active, the correlation energies output from these active demodulators are combined in correspondence with the Walsh numbers and input to the reliability computing means 21 (reliability calculating unit 30). The energy combining unit 64 shown in FIG. 20 performs this. Accordingly, in this case, other than combination of all Finger outputs by the original combining means 23, second combination such as energy combination will be added.

By doing this, the possibility that the correct correlation energy will always be output from one of the two or more demodulators is very high, and as a result, a higher precision compensated reliability R can be obtained.

Thus, the fourth embodiment is characterized in that provision is made of an energy combining unit 64 which combines the correlation energies E0, E1, . . . , En obtained by collection from all demodulators when the demodulation is carried out by the finger demodulating unit 11 comprising a plurality of demodulators (Fingers) 11-1 to 11-4 connected to each other in parallel, and the combined correlation energy from this energy combining unit 64 is input to the reliability compensating unit 57.

Figure 22:
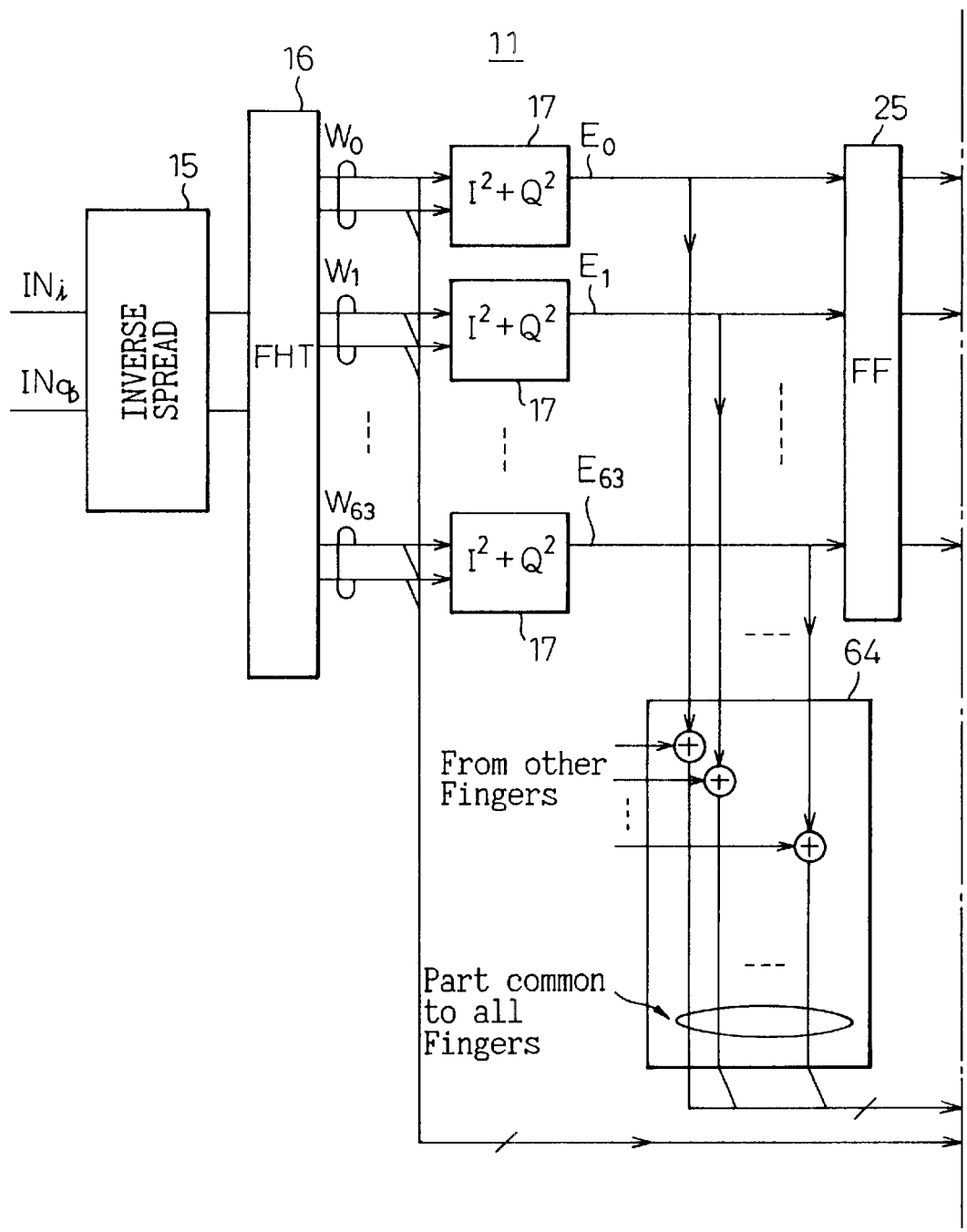
FIG. 22 is a first part of a view of a fifth embodiment of the demodulation apparatus based on the present invention.
Figure 23:
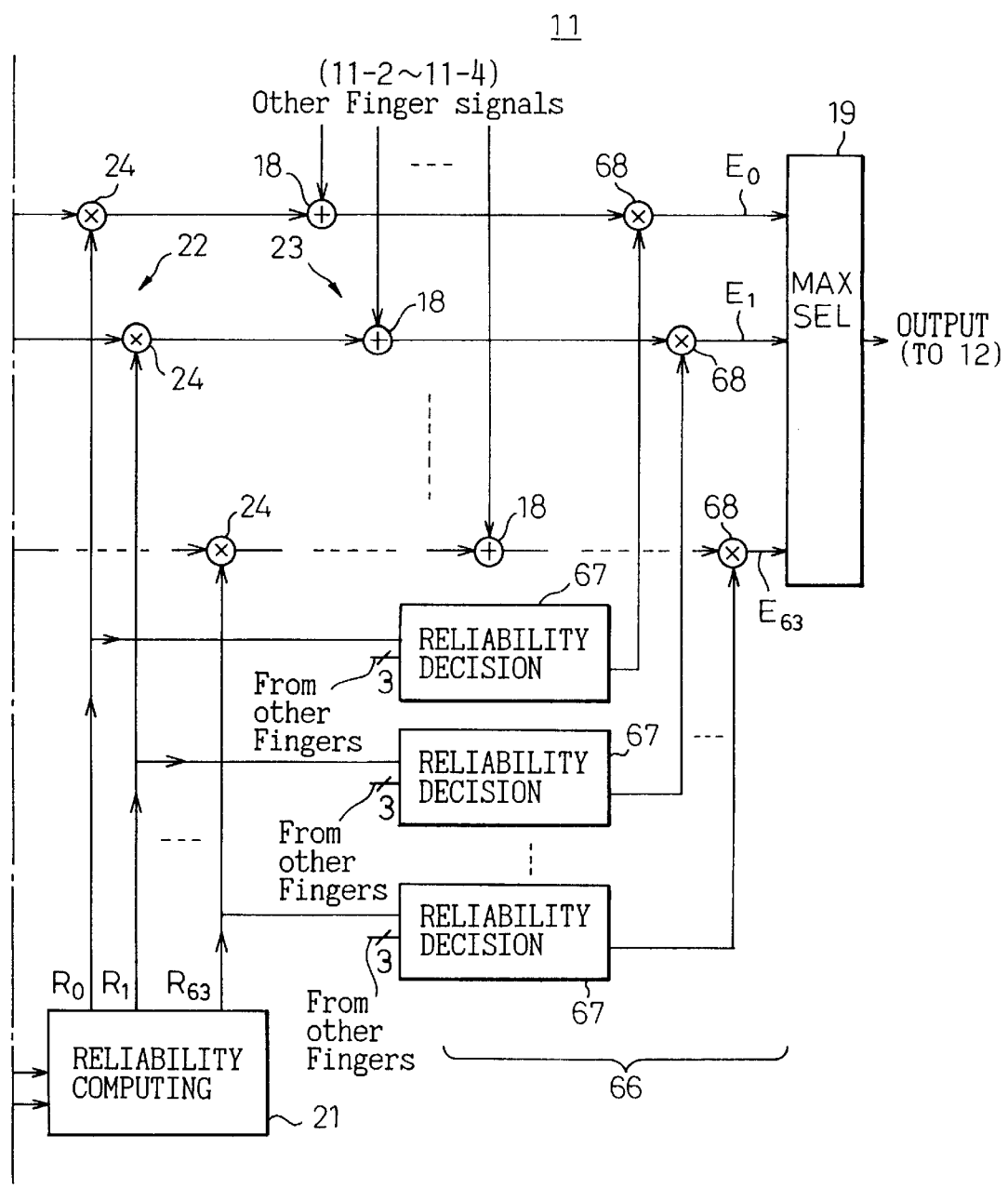
FIG. 23 is a second part of a view of the fifth embodiment of the demodulation apparatus based on the present invention.

FIG. 22 and FIG. 23 are first and second parts of a view of a fifth embodiment of the demodulation apparatus based on the present invention.

The configuration shown in FIG. 22 and FIG. 23 shows a configuration obtained by applying the concept of this fifth embodiment to the fourth embodiment as an example, but the concept can be similarly applied to other embodiments as well. The same is true for the entire explanation of the present invention.

The fifth embodiment also pays particular attention to the fact that the finger demodulating unit 11 is constituted by a plurality of demodulators (Fingers) 11-1 to 11-4 as shown in FIG. 35. In the computation of the reliability R, the reliabilities R similarly created in a plurality of demodulators (Fingers) are input in correspondence with the Walsh numbers (W0, W1, . . . , W63) to determine the optimum reliability. Further, it is multiplied with the corrected correlation energy in correspondence with each Walsh number. By this, it becomes possible to perform more correct demodulation by further optimizing the value obtained by combining the corrected correlation energies from other fingers (by the combining means 23)

Referring to FIG. 22 and FIG. 23, the fifth embodiment is characterized in that provision is made of a reliability optimizing means 66 for receiving as input the reliabilities R obtained by collection from all demodulators 11-1 to 11-4 in correspondence with the Walsh numbers and selecting the optimum reliability and further multiplying this with the corrected correlation energy in correspondence with each Walsh number when the demodulation is carried out by a finger demodulating unit comprising a plurality of demodulators connected to each other in parallel.

The reliability optimizing unit 66 can be constituted by a reliability decision unit 67 for deciding the optimum reliability based on the reliabilities R input in correspondence with the Walsh numbers and a multiplier unit 68 for further multiplying the reliability decided by this reliability decision unit 67 with each corrected correlation energy in correspondence with each Walsh number in front of the maximum energy selecting means 19.

Figure 24:
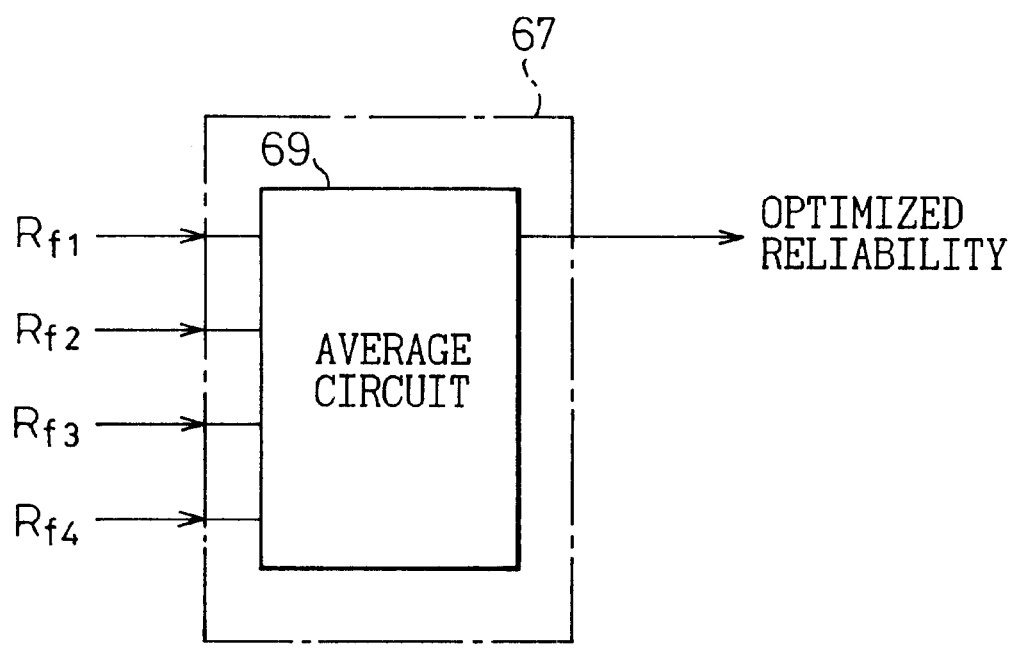
FIG. 24 is a view of a first example of a reliability decision unit 67.

FIG. 24 is a view of first example of the reliability decision unit 67. This reliability decision unit 67 produces the optimum reliability by taking the average value of reliabilities Rf1 to Rf4 obtained by collection from all demodulators (Finger1 to Finger4) 11-1 to 11-4. It adopts an average circuit 69 for this purpose. That is, it performs the calculation of (Rf1+Rf2+Rf3+Rf4)/4. In this case, if the searcher assigns for example only two demodulators 11-1 and 11-2, the calculation becomes (Rf1+Rf2)/2.

There is no guarantee that the corrected correlation energy obtained for every Walsh number by each demodulator (Finger) will always be correct. There may be a case where for example the corrected correlation energy E0 having the Walsh No. W0 appears abnormally large in for example the demodulator 11-1 due to for example noise. That is, Rf1 becomes an abnormal value. In such a case, by making the other three normal values Rf2 to Rf4 act upon that Rf1 (averaged), Rf1 can be kept from becoming the dominant value. By this, correct demodulation can be expected.

Figure 25:
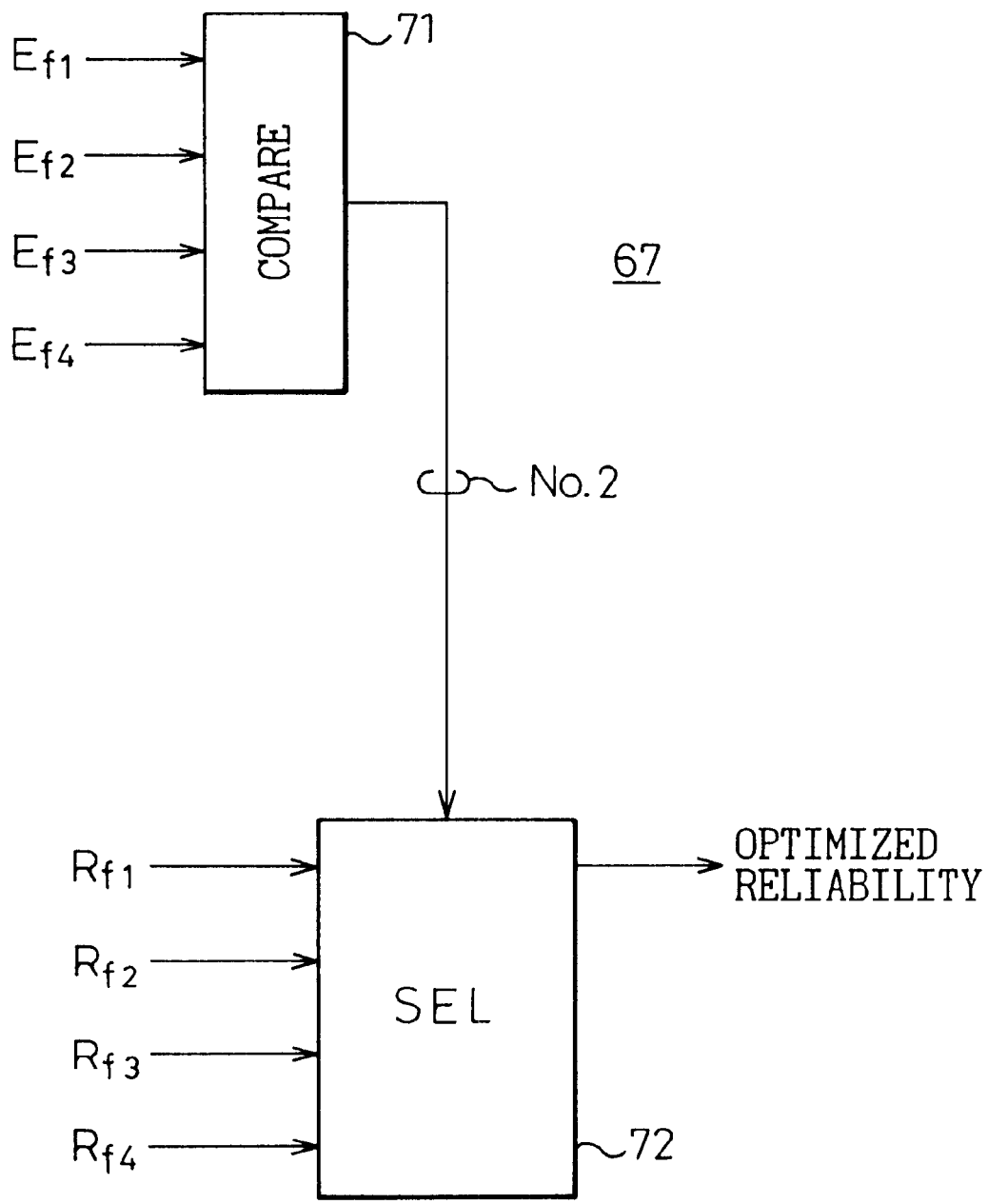
FIG. 25 is a view of a second example of the reliability decision unit 67.

FIG. 25 is a view of a second example of the reliability decision unit 67. This reliability decision unit 67 selects the reliability from the demodulator creating the second largest corrected correlation energy among corrected correlation energies Ef1 to Ef4 created at these demodulators from among reliabilities Rf1 to Rf4 obtained by collection from all demodulators 11-1 to 11-4 and defines this as the optimum reliability (optimized reliability).

As mentioned above, due to for example noise, there may exist a case where for example the corrected correlation energy E0 having the Walsh No. W0 appears abnormally large in for example the demodulator 11-1. In such a case, if the reliability from the demodulator creating the next largest (second largest) corrected correlation energy, for example, E1 is used, correct demodulation is made with a considerably high probability. This is based on results of various experiments or simulations.

Referring to FIG. 25, a comparing circuit 71 finds the second largest corrected correlation energy among corrected correlation energies created in the demodulators. Then, a selecting circuit 72 selects the reliability from the demodulator creating the second largest corrected correlation energy found by the comparing circuit 71 from among reliabilities obtained by collection from the demodulators.

Figure 26:
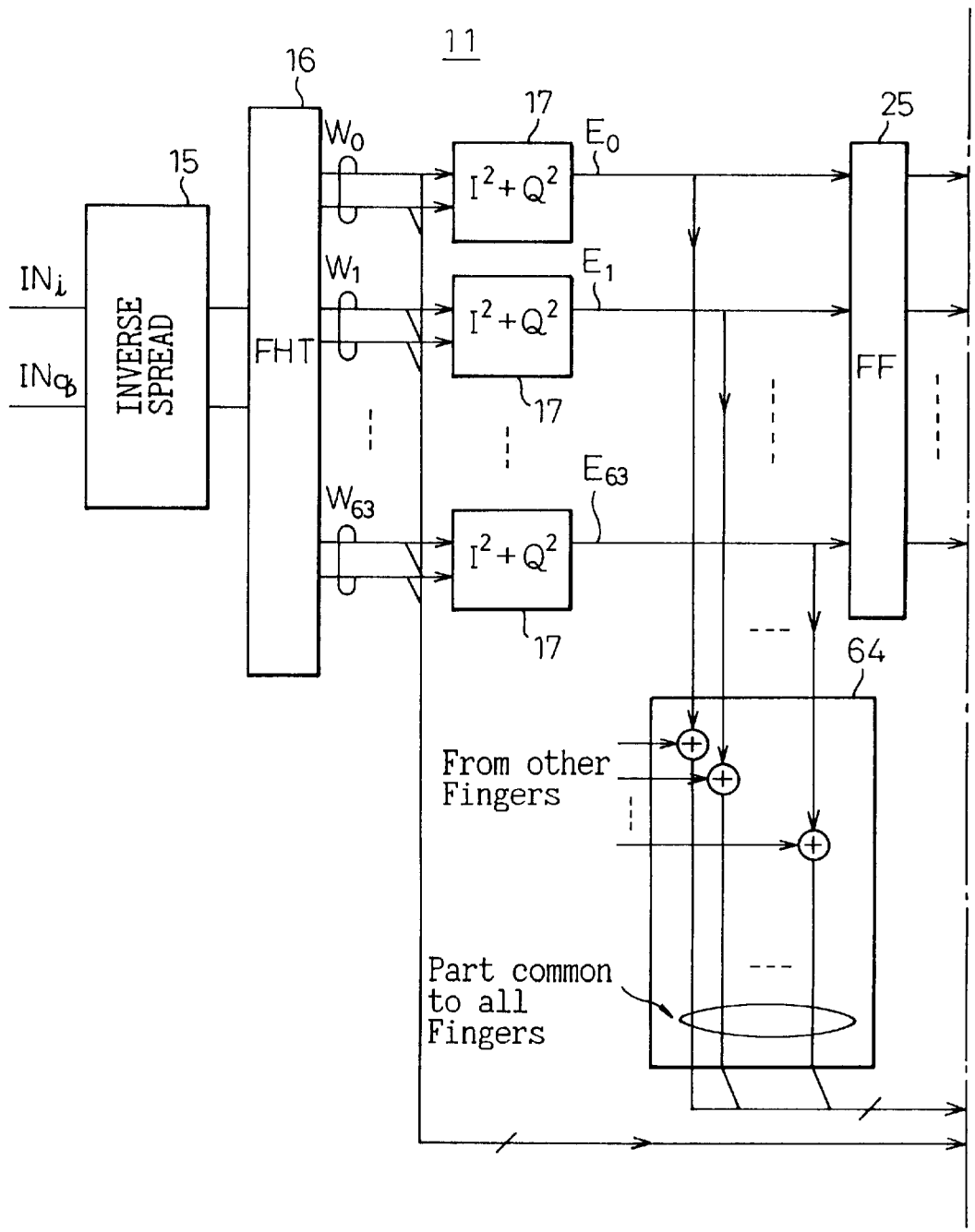
FIG. 26 is a first part of a view of the demodulation apparatus in a case where the reliability decision unit 67 shown in FIG. 25 is used.
Figure 27:
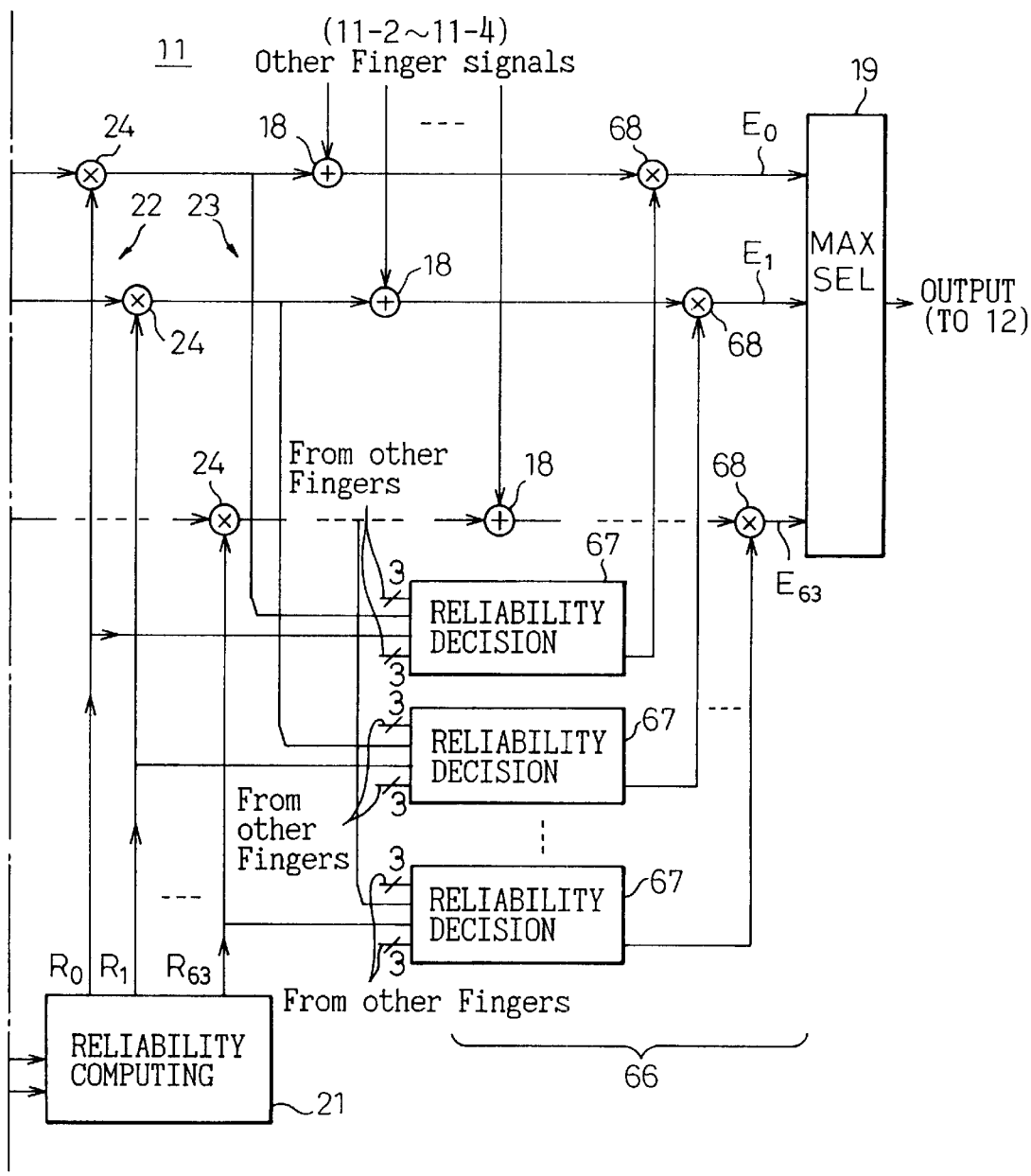
FIG. 27 is a second part of a view of the demodulation apparatus in a case where the reliability decision unit 67 shown in FIG. 25 is used.

FIG. 26 and FIG. 27 are a first and second part of a view of the demodulation apparatus of a case where the reliability decision unit 67 shown in FIG. 25 is used.

Note this reliability decision unit 67 is shown applied to the fifth embodiment (FIGS. 22 and 23) as an example. As shown in FIG. 27, each reliability decision unit 67 receives as its input the corrected correlation energy from other Fingers.

Figure 28:
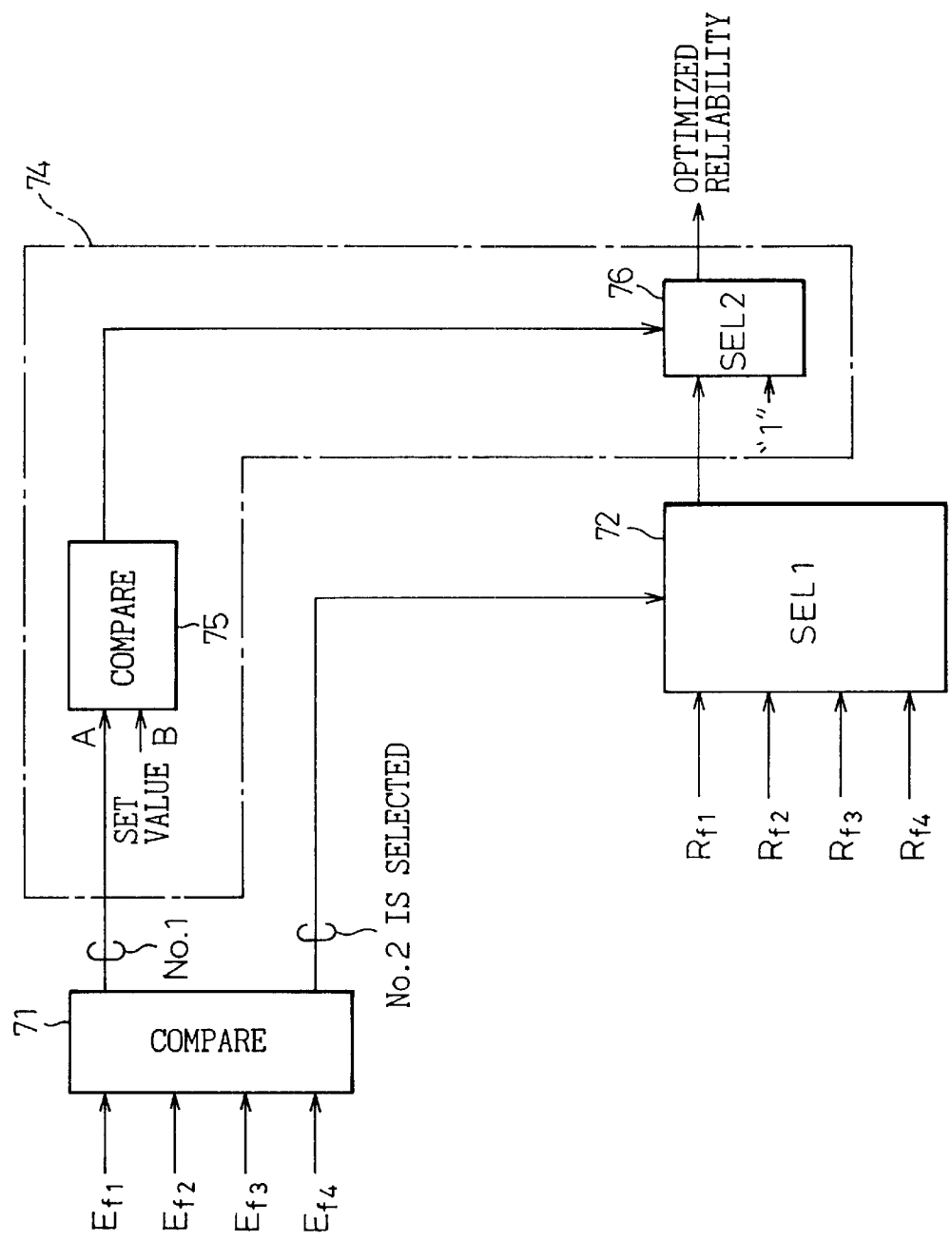
FIG. 28 is a view of a third example of the reliability decision unit 67.

FIG. 28 is a view of the third example of the reliability decision unit 67. In this third example, compared with the second example (FIG. 25), reliability dominated by an extremely large corrected correlation energy can be further finely eliminated. Specifically, only when the first largest corrected correlation energy A among corrected correlation energies Ef1 to Ef4 created at demodulators 11-1 to 11-4 is larger than the predetermined set value B, the reliability (either of Rf1 to Rf4). from the demodulator creating the second largest corrected correlation energy is defined as the intended optimum reliability, while when this first largest corrected correlation energy is smaller than the set value B, as the optimum reliability, the reliability=1 is set. A comparing/selecting means 74 performs this. The blocks of 71 and 72 are as shown in FIG. 25. The means 74 comprises for example a comparing circuit 75 and a selecting circuit (SEL2) 76. The comparing circuit 75 makes the selecting circuit 76 select the output corresponding to the second largest energy (No. 2) from the selecting circuit (SELL) 72 when A>B, while makes the selecting circuit 76 output the reliability=1 as the optimized reliability when A<B. As the set value B, the energy value from the Finger having the first largest energy is set in advance.

Figure 29:
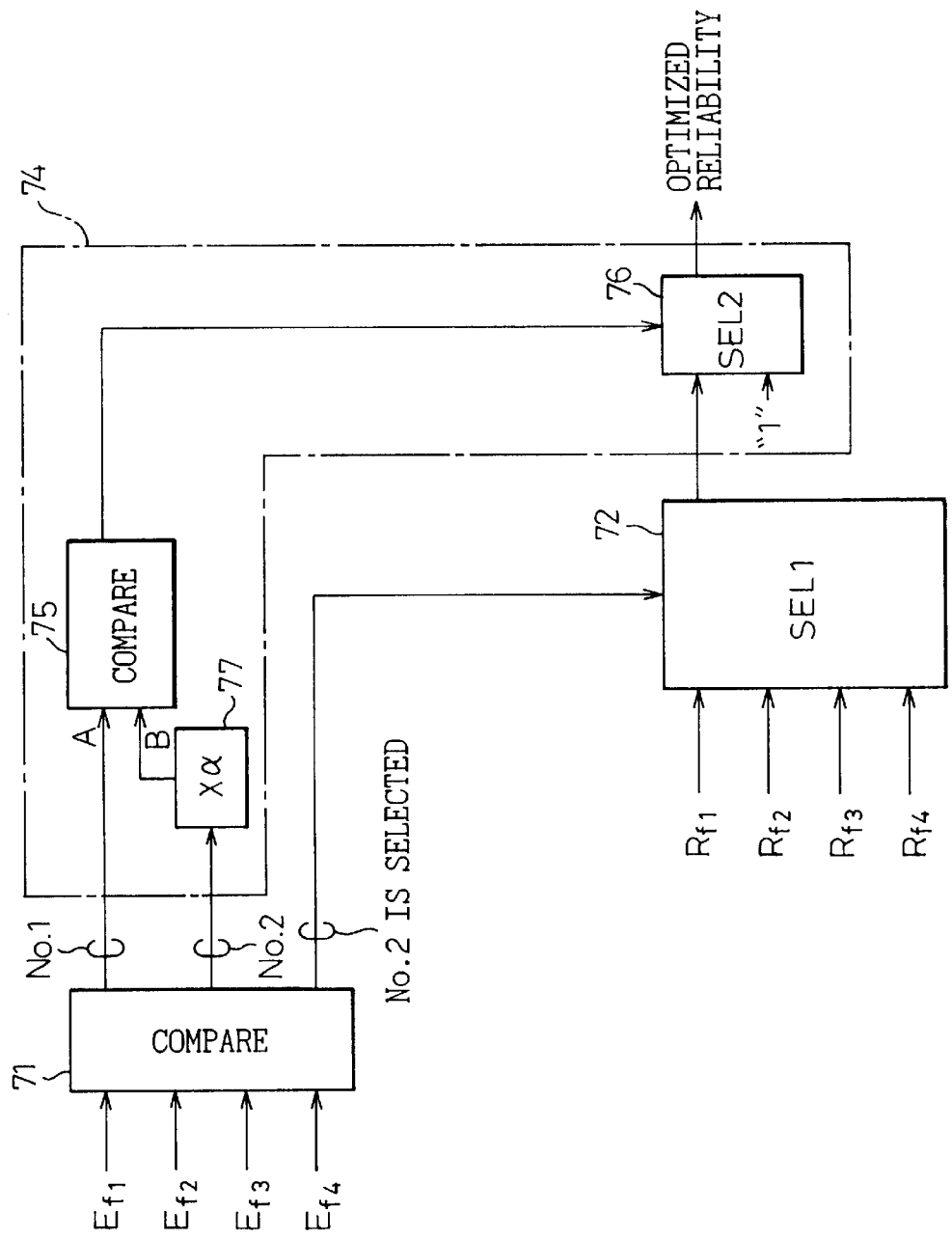
FIG. 29 is a view of a fourth example of the reliability decision unit 67.

FIG. 29 is a view of a fourth example of the reliability decision unit 67. The difference from the third example shown in FIG. 28 resides in that the set value B to be applied to one input of the comparing circuit 75 is not a fixed value (case of the third example), but a relative value. This relative value is a ($\alpha$>1) times the second largest (No. 2) corrected correlation energy $\alpha$ is indicated as $\alpha$=2, $\alpha$=4, or the like in real examples. This a becomes the system parameter.

For this reason, in FIG. 29, a multiplier (×$\alpha$) 77 is further provided in the comparing/selecting means 74 constituting the reliability decision unit 67 of the fourth example.

As already mentioned, it has been experimentally confirmed that the second largest energy usually does not become an abnormal value and that by using this value as the set value, a reverse-link rich in flexibility can be realized.

Thus, in the fourth example, the set value B was set a times ($\alpha$>1) of the second largest corrected correlation energy among corrected correlation energies Ef1 to Ef4, therefore, as shown in FIG. 29, it is constituted so as to further provide the multiplier 77 for multiplying the second largest corrected correlation energy by a ($\alpha$>1) and use the $\alpha$-times output of the multiplier 77 as the set value B.

Due to the various embodiments mentioned in detail above, the error rate characteristics in the reverse-link are greatly improved (refer to FIG. 34 mentioned later). However, 64 calculations and computations for each of the Walsh Nos. W0 to W63 are carried out with respect to the output from the Fast Hadamard Transform unit 16. Accordingly, an enormous processing process and hardware become necessary.

In order to solve this, in the present invention, the following two procedures will be proposed. The first procedure is thinning, and the second procedure is a high speed operational processing. First, an explanation will be made of the first procedure.

Figure 30:
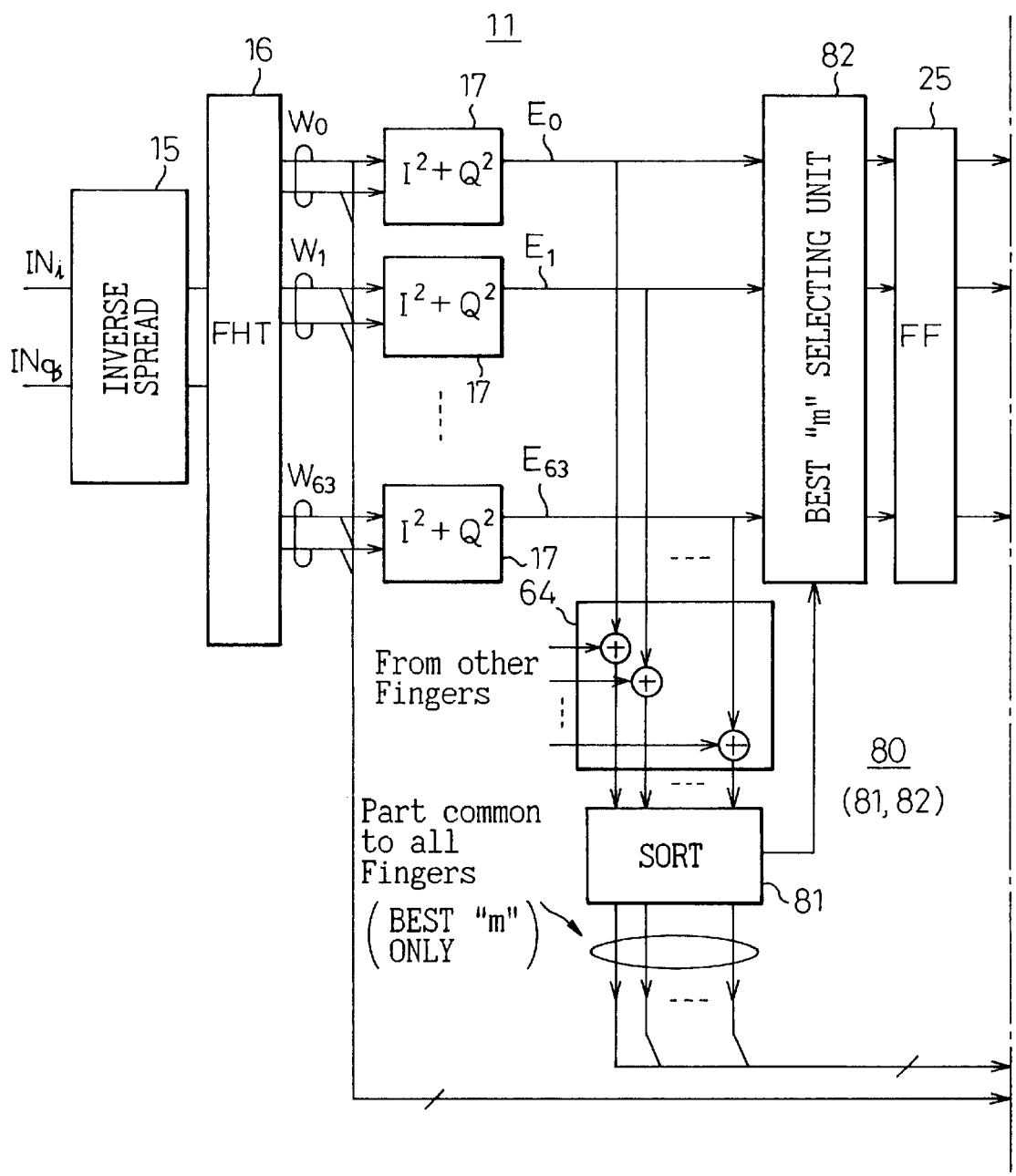
FIG. 30 is a first part of a view of a demodulation apparatus having a thinning processing means.
Figure 31:
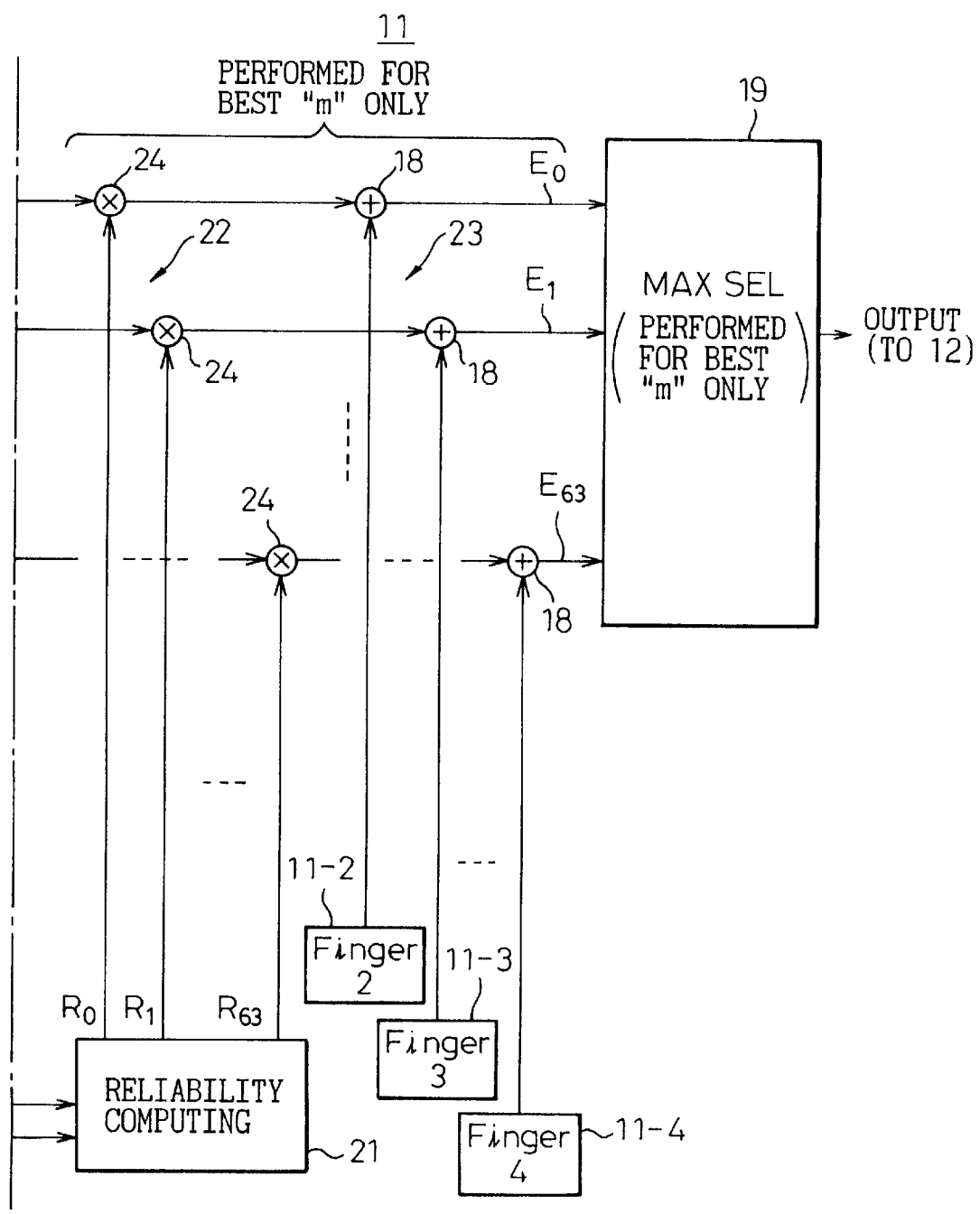
FIG. 31 is a second part of a view of the demodulation apparatus having the thinning processing means.

FIG. 30 and FIG. 31 are a first and second part of a view of the demodulation apparatus having the thinning means.

Note that, this thinning means can be applied to all of the embodiments, but, here, a case where it is applied to the fourth embodiment of FIGS. 20 and 21 is exemplified.

According to this thinning (first procedure), the thinning is carried out so as to make the correlation energies (either of E0, E1, . . . , E63) whose reliability R is to be computed the correlation energies for the Walsh numbers corresponding to m number of correlation energies from the first largest correlation energy to the m-th (integer in a range of 1<m<64) largest correlation energy among the correlation energies among the Walsh Nos. W0, W1, ..., W63.

According to the experimental results, when m is set equal to 8, that is where the best eight correlation energies corresponding to 64 Walsh numbers are selected and the reliability is computed, the accuracy thereof is considerably near that of the case where the reliability is computed for all of 64 correlation energies.

That is, it was seen that, in such thinning, of course, calculation error occurred and the error rate characteristic was slightly deteriorated, but there was no problem in practical use. The value of m is not limited to 8, but can be equal to 4 or equal to 16 too. It may be appropriately determined by a trade off of the calculation error and the hardware scale.

Referring to FIGS. 30 and 31, the thinning is carried out by a thinning means 80. The means 80 acts so as to perform the processing at the reliability computing means 21 and the correcting means 23 shown in FIG. 1 only for those of the Walsh numbers corresponding to the m number of correlation energies from the first largest correlation energy to the m-th (integer within the range of 1<m<64) largest correlation energy among the correlation energies of the Walsh numbers.

As a concrete example of the thinning means 80, in the figure, a sorting unit 81 and a best "m" selecting unit 82 are shown. The sorting unit 81 receives as its inputs 64 correlation energies corresponding to Walsh numbers (W0, W1, ..., W63), selects the best eight (when m=8) from among them, and then sequentially rearranges them. Further, it gives these eight correlation energies to the reliability computing means 21.

At this time, the information of the best eight selected at the sorting unit 81 is also given to the best "m" selecting unit 82. Here, only gates corresponding to the related eight Walsh numbers are made open, and the processing is carried out for only the signals of the best eight thereafter.

Figure 32:
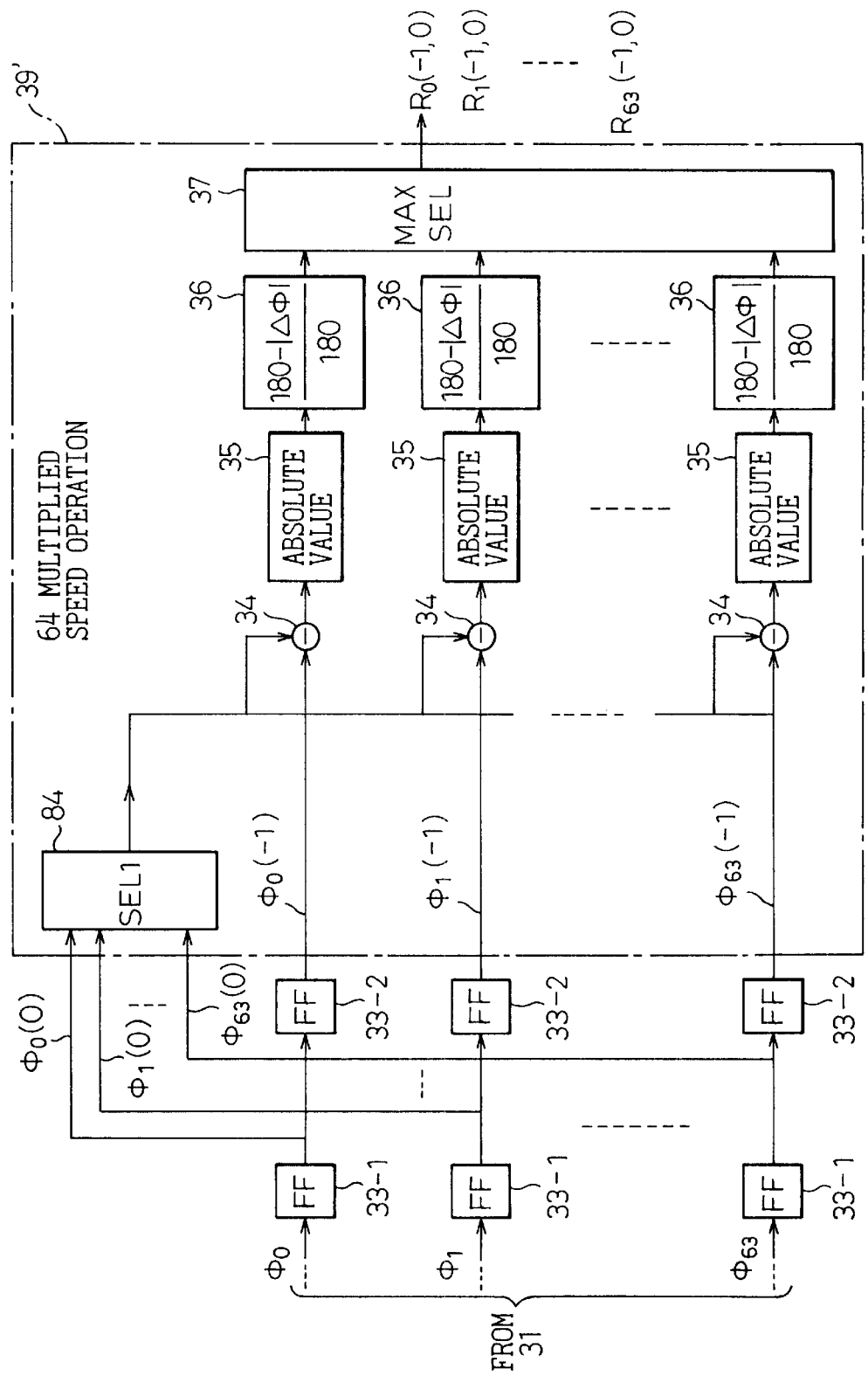
FIG. 32 is a view of a reliability calculating part 39' operating at a high speed.

Next, an explanation will be made of the high speed operational processing (second procedure). FIG. 32 is a view of a reliability computing part 39' operating at a high speed. When taking as an example FIG. 5 (first example of the reliability calculating unit 30), the reliability computing part 39' performs the computation with W0 to W63 for W0 at first, performs the computation with W0 to W63 for W1 second, ..., and performs the computation with W0 to W63 for W63 (refer to a column of Tws=−1 of FIG. 2), therefore when the reliability computing part 39 is actually assembled by an LSI chip, the hardware thereof becomes enormous. However, the process to be executed is the same for all of W0 to W63 (although data are different), so the reliability computing part 39' is made to operate at a high speed by providing the selecting unit (SEL1) 84. For example, it is made to operate at a 64-times higher speed. The speed is made a high 64-times, and a processing time t is divided into 64, i.e., t0 to t63. The reliability computing part 39' selects W0 by the selecting unit 84 at a processing time t0, and performs the computation with W0 to W63 for that W0. Next, at t1, it selects W1 by the selecting unit 84, and performs the computation with W0 to W63 for that W1. The same is true below for t2→t3 →... t63.

Thus, the reliability computing part 39' is repeatedly used 64 times for Walsh numbers, but the hardware is greatly reduced by that amount.

Figure 33:
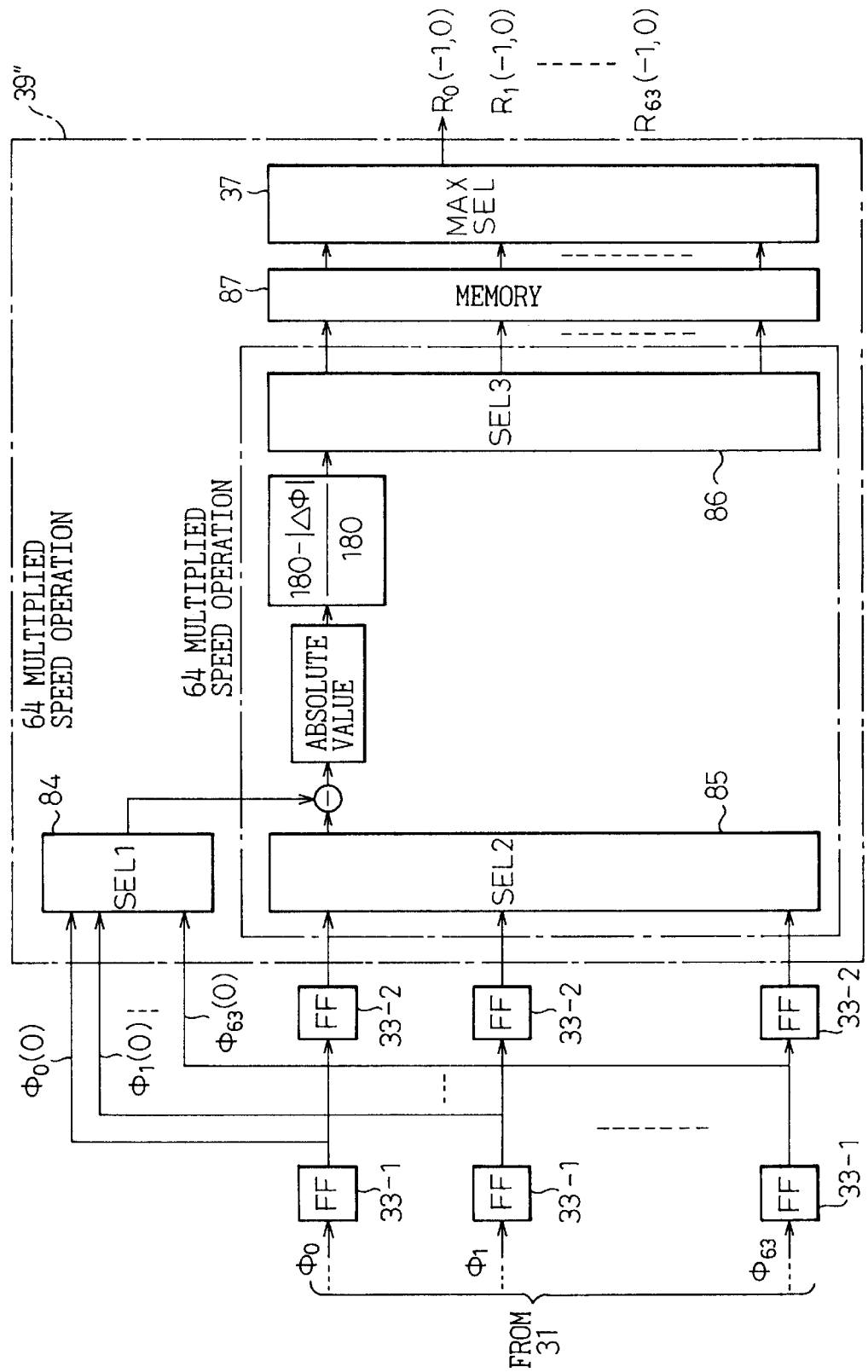
FIG. 33 is a view of a reliability calculating part 39" operating at a high speed.

FIG. 33 is a view of a reliability computing part 39" operating at a high speed. In the structure of the present figure, by further adding a selecting unit (SEL2) 85, a selecting unit (SEL3) 86, and a memory 87 compared with the case of FIG. 32, the subtractor 34, the absolute value circuit 35, and the reliability calculating circuit 36 are made to operate at a further higher speed of 64 times (4096 times), and the hardware of these parts (34, 35, and 36) is, greatly reduced.

The selecting unit (SEL2) 85 sequentially applies outputs on the FF33-2 side from W0 to W63 to the subtractor 34 at processing times t'00, t'01, ..., t'063 obtained by further dividing the above processing time t0 into 64, similarly sequentially applies outputs on the FF33-2 side from W0 to W63 to the subtractor 34 at processing times t'10, t'11, ..., t'163 obtained by further dividing the above processing time t1 into 64, ..., and sequentially applies outputs on the FF33-2 side from W0 to W63 to the subtractor 34 at processing times t'630, t'631, ..., t'6363 obtained by further dividing the above processing time t63 into 64.

The selecting unit (SEL3) sequentially selects the outputs obtained from the reliability calculating circuit 36 at processing times t'00 to t'063, t'10 to t'163, ..., and t'630 to t'6363 and further stores them once in a memory 87 of the next stage. The maximum reliability selecting circuit 37 selects the maximum value from the stored data in the memory 87.

Thus, the second procedure is characterized in that, when computing the certainty of the value of each correlation energy as the reliability R for correlation energies E0, E1, ..., E63 for the Walsh numbers W0, W1, ..., W63, the processing time (t) for the computation is divided by the number (64) of the Walsh numbers, and the processing for the computation is carried out by the high speed operation in each divided processing time (t0, t1, ..., t'00, t'01, ...)

Figure 34:
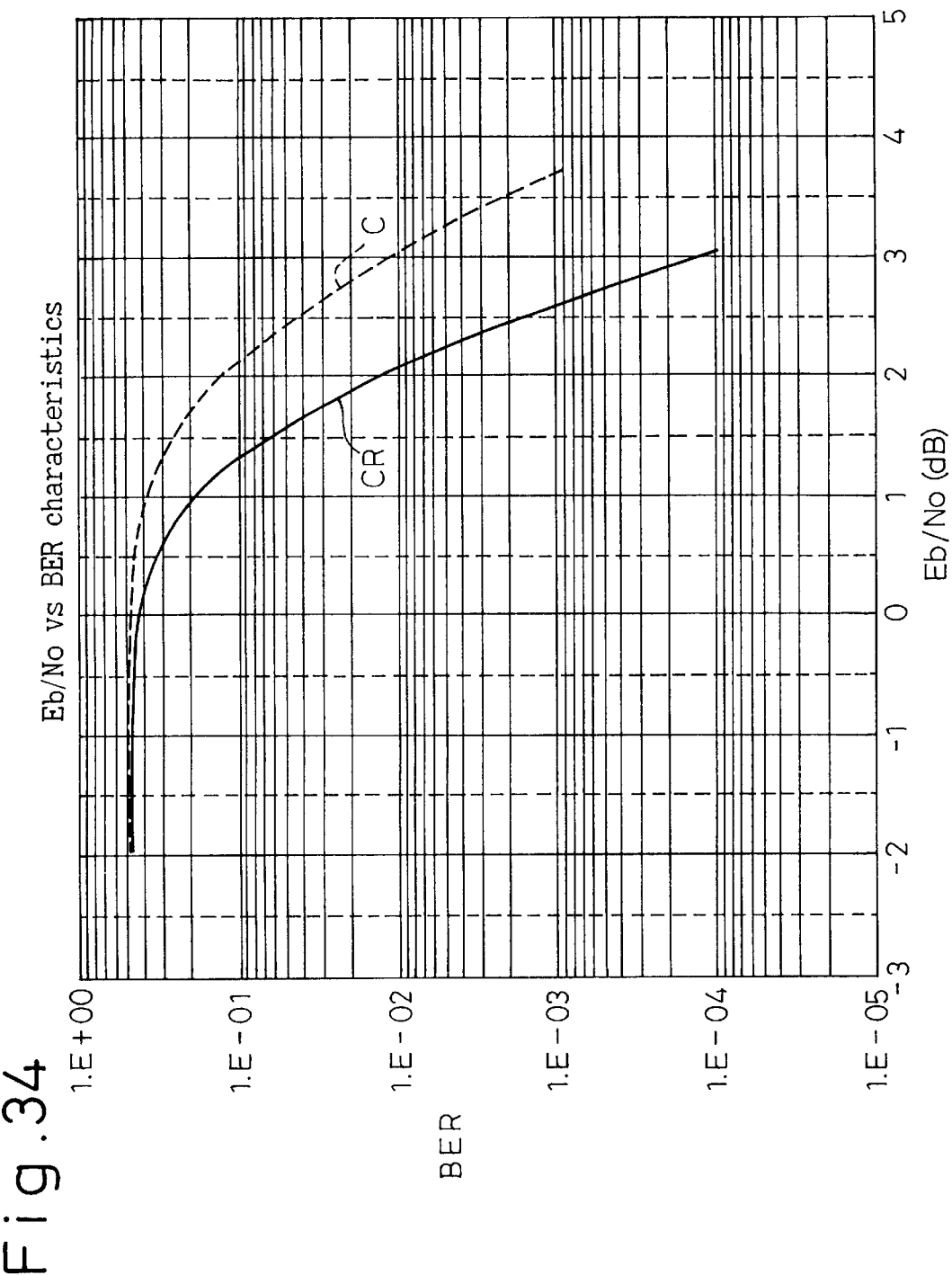
FIG. 34 is a graph of the error rate characteristic.

FIG. 34 is a graph of the error rate characteristic. This shows a so-called Eb/No vs BER characteristic. The Eb/No (noise amount normalized by bandwidth) is plotted on the abscissa, while the BER (bit error rate) is plotted on the ordinate. In the present graph, a curve C represents the characteristic obtained by the demodulation apparatus of the related art shown in FIG. 36, while a curve CR represents the characteristic obtained by the demodulation apparatus of the present invention shown in FIG. 1, that is, the characteristic obtained by multiplying the reliability R. By this, it is seen that the error rate characteristic (CR) according to the present invention has a gain of about 1 dB with respect to the error rate characteristic (C) of the related art.

Note that the characteristic shown in the present graph is the characteristic where the Viterbi code/decoding is adopted and is the characteristic where the finger demodulating unit 11 operates with 2 Fingers.

As explained in detail above, according to the present invention, by adopting the concept of reliability (R), a good error rate characteristic almost equivalent to the error rate characteristic achieved by the reverse-link of a synchronous system is realized although it is the reverse-link of an asynchronous system. For this reason, when referring to the characteristic of FIG. 34, each cellular unit in the mobile communications system can be given the capacity to accommodate about 25% more users than in the related art.

What is claimed is:

1. A demodulation method in a radio communications system using M-sequence orthogonal modulation wherein radio output signals which are subjected to M-sequence orthogonal modulation and transmitted from a transmission side as Walsh codes corresponding to Walsh numbers are received at a reception unit and reproduced as I-channel input signals and Q-channel input signals, correlation energies (E0, E1, ...) for every said Walsh number are obtained from outputs after Hadamard Transform processing, the maximum correlation energy among these correlation energies is selected, and a signal corresponding to the Walsh number corresponding to this is demodulated as a received signal, comprising the steps of:
computing a certainty of the value of each correlation energy as a reliability for the correlation energy for every said Walsh number,
acquiring corrected correlation energies by introducing said corresponding reliabilities with respect to said correlation energies, and
selecting said maximum correlation energy from among obtained said corrected correlation energies by using said corrected correlation energies.

2. A demodulation method as set forth in claim 1, wherein:
when said demodulation is carried out by a finger demodulating unit comprising a plurality of demodulators connected to each other in parallel,
each demodulator
computes the certainty of the value of each correlation energy as the reliability for the correlation energy for every said Walsh number,
obtains corrected correlation energies by introducing corresponding reliabilities with respect to said correlation energies,
collects and combines said corrected correlation energies obtained at all of said demodulators for every said Walsh number, and
selects said maximum correlation energy by using each said corrected correlation energy obtained by that combination.

3. A demodulation method as set forth in claim 1, wherein said reliability is determined by the maximum reliability among reliabilities computed based on a phase difference angle between a receiving phase angle at a present Walsh symbol time detected for every said Walsh number and the receiving phase angle at a Walsh symbol time preceding this.

4. A demodulation method asset forth in claim 1, wherein said reliability is determined by the maximum reliability among reliabilities computed based on a phase difference angle between the receiving phase angle at the present Walsh symbol time detected for every said Walsh number and the receiving phase angle at a Walsh symbol time following this.

5. A demodulation method as set forth in claim 1, wherein said reliability is determined by:
the maximum reliability among reliabilities computed based on the preceding phase difference angle between the receiving phase angle at the present Walsh symbol time detected for every said Walsh number and the receiving phase angle at the Walsh symbol time preceding this and
the maximum reliability among reliabilities computed based on the following phase difference angle between the receiving phase angle at the present Walsh symbol time detected for every said Walsh number and the receiving phase angle at the Walsh symbol time following this.

6. A demodulation method as set forth in claim 5, wherein an average value of a first reliability obtained based on said preceding phase difference angle and a second reliability obtained based on said following phase difference angle is computed and this is defined as said reliability.

7. A demodulation method as set forth in claim 5, wherein a larger one of the first reliability obtained based on said preceding phase difference angle and the second reliability obtained based on said following phase difference angle is selected and is defined as said reliability.

8. A demodulation method as set forth in claim 3, wherein, in the computation of said reliability, weighting is applied so that the reliability is made larger as said phase difference angle becomes smaller.

9. A demodulation method as set forth in claim 4, wherein, in the computation of said reliability, weighting is applied so that the reliability is made larger as said phase difference angle becomes smaller.

10. A demodulation method as set forth in claim 3, wherein, in the computation of said reliability, said computation is carried out by using a compensated phase difference angle obtained by compensating for said phase difference angle by a frequency difference between a received reference carrier frequency and the reference carrier frequency on the transmission side.

11. A demodulation method as set forth in claim 4, wherein, in the computation of said reliability, said computation is carried out by using a compensated phase difference angle obtained by compensating for said phase difference angle by a frequency difference between a received reference carrier frequency and the reference carrier frequency on the transmission side.

12. A demodulation method as set forth in claim 3, wherein, in the computation of said reliability, the compensated reliability calculated based on said correlation energy at every Walsh symbol time detected for every said Walsh number is further added.

13. A demodulation method as set forth in claim 4, wherein, in the computation of said reliability, the compensated reliability calculated based on said correlation energy at every Walsh symbol time detected for every said Walsh number is further added.

14. A demodulation method as set forth in claim 12, wherein said compensated reliability is calculated as a ratio of the correlation energy for every Walsh number with respect to the maximum correlation energy among said correlation energies detected for every said Walsh number one Walsh symbol time before said correlation energy detected at the present Walsh symbol time.

15. A demodulation method as set forth in claim 13, wherein said compensated reliability is calculated as a ratio of the correlation energy for every Walsh number with respect to the maximum correlation energy among said correlation energies detected for every said Walsh number one Walsh symbol time before said correlation energy detected at the present Walsh symbol time.

16. A demodulation method as set forth in claim 12, wherein said compensated reliability is calculated as the ratio of the correlation energy for every Walsh number with respect to the maximum correlation energy among said correlation energies to be detected, for every said Walsh number, after one Walsh symbol time continuing from said correlation energy to be detected at the present Walsh symbol time.

17. A demodulation method as set forth in claim 13, wherein said compensated reliability is calculated as the ratio of the correlation energy for every Walsh number with respect to the maximum correlation energy among said correlation energies to be detected, for every said Walsh number, after one Walsh symbol time continuing from said correlation energy to be detected at the present Walsh symbol time.

18. A demodulation method as set forth in claim 12, wherein said corrected correlation energy is used as the correlation energy when calculating the compensated reliability based on said correlation energy.

19. A demodulation method as set forth in claim 13, wherein said corrected correlation energy is used as the correlation energy when calculating the compensated reliability based on said correlation energy.

20. A demodulation method as set forth in claim 12, wherein a final reliability is obtained by multiplying the compensated rebliability (Re) calculated based on said correlation energy with the reliability (R) computed based on said phase difference angle.

21. A demodulation method as set forth in claim 13, wherein a final reliability is obtained by multiplying the compensated reliability (Re) calculated based on said correlation energy with the reliability (R) computed based on said phase difference angle.

22. A demodulation method as set forth in claim 20, wherein weighting is applied so that said reliability is made larger as said phase difference angle becomes smaller.

23. A demodulation method as set forth in claim 21, wherein weighting is applied so that said reliability is made larger as said phase difference angle becomes smaller.

24. A demodulation method as set forth in claim 22, wherein weighting is applied so that the compensated reliability (Re) more abruptly approaches 1 as said compensated reliability (Re) approaches 1.

25. A demodulation method as set forth in claim 23, wherein weighting is applied so that the compensated reliability (Re) more abruptly approaches 1 as said compensated reliability (Re) approaches 1.

26. A demodulation method as set forth in claim 2, wherein said reliability is determined by the maximum reliability among reliabilities computed based on the phase difference angle between the receiving phase angle at the present Walsh symbol time detected for every said Walsh number and the receiving phase angle at the Walsh symbol time preceding this.

27. A demodulation method as set forth in claim 2, wherein said reliability is determined by the maximum reliability among reliabilities computed based on the phase difference angle between the receiving phase angle at the present Walsh symbol time detected for every said Walsh number and the receiving phase angle at the Walsh symbol time following this.

28. A demodulation method as set forth in claim 26, wherein, in the computation of said reliability, the compensated reliability calculated based on said correlation energy at every Walsh symbol time detected for every said Walsh number is introduced.

29. A demodulation method as set forth in claim 27, wherein, in the computation of said reliability, the compensated reliability calculated based on said correlation energy at every Walsh symbol time detected for every said Walsh number is introduced.

30. A demodulation method as set forth in claim 28, wherein said compensated reliability is calculated by combining said correlation energies similarly output from said plurality of demodulators for every Walsh number.

31. A demodulation method as set forth in claim 29, wherein said compensated reliability is calculated by combining said correlation energies similarly output from said plurality of demodulators for every Walsh number.

32. A demodulation method as set forth in claim 26, wherein, in the computation of said reliability, an optimum reliability is determined by inputting said reliabilities similarly produced at said plurality of demodulators in correspondence with said Walsh numbers and further it is further multiplied with said corrected correlation energy in correspondence with each Walsh number.

33. A demodulation method as set forth in claim 27, wherein, in the computation of said reliability, an optimum reliability is determined by inputting said reliabilities similarly produced at said plurality of demodulators in correspondence with said Walsh numbers and further it is further multiplied with said corrected correlation energy in correspondence with each Walsh number.

34. A demodulation method asset forth in claim 32, wherein said optimum reliability is produced by taking the average value of said reliabilities obtained by collection from all of said demodulators.

35. A demodulation method as set forth in claim 33, wherein said optimum reliability is produced by taking the average value of said reliabilities obtained by collection from all of said demodulators.

36. A demodulation method as set forth in claim 32, wherein said reliability from the demodulator producing the second largest corrected correlation energy among said corrected correlation energies produced at said demodulators is selected from among said reliabilities obtained by collection from all of said demodulators and defined as said optimum reliability.

37. A demodulation method as set forth in claim 33, wherein said reliability from the demodulator producing the second largest corrected correlation energy among said corrected correlation energies produced at said demodulators is selected from among said reliabilities obtained by collection from all of said demodulators and defined as said optimum reliability.

38. A demodulation method as set forth in claim 36, wherein said reliability from the demodulator producing said second largest corrected correlation energy is defined as said optimum reliability only when the first largest corrected correlation energy among said corrected correlation energies produced at said demodulators is larger than a predetermined set value and a reliability=1 is set as said optimum reliability when the first largest corrected correlation energy is smaller than the set value.

39. A demodulation method as set forth in claim 37, wherein said reliability from the demodulator producing said second largest corrected correlation energy is defined as said optimum reliability only when the first largest corrected correlation energy among said corrected correlation energies produced at said demodulators is larger than a predetermined set value and a reliability=1 is set as said optimum reliability when the first largest corrected correlation energy is smaller than the set value.

40. A demodulation method as set forth in claim 38, wherein said set value is determined to be $\alpha$ times ($\alpha>1$) the second largest corrected correlation energy among said corrected correlation energies.

41. A demodulation method as set forth in claim 39, wherein said set value is determined to be $\alpha$ times ($\alpha>1$) the second largest corrected correlation energy among said corrected correlation energies.

42. A demodulation method as set forth in claim 1, wherein said correlation energy for which said reliability must be computed is the correlation energy for each Walsh number in correspondence with m number of correlation energies from the first largest correlation energy among correlation energies of Walsh numbers to the m-th (integer of 1<m<64) largest correlation energy among said Walsh numbers.

43. A demodulation method as set forth in claim 1, wherein when computing the certainty of the value of each correlation energy as the reliability for the correlation energy for every said Walsh number, a processing time for that computation is divided by the number of the Walsh numbers, and the processing for the computation is carried out by high speed operation in the divided processing times.

44. A demodulation apparatus in a radio communications system using M-sequence orthogonal modulation wherein radio output signals which are subjected to M-sequence orthogonal modulation and transmitted from a transmission side as Walsh codes corresponding to Walsh numbers are received at a receiving unit and reproduced as I-channel input signals and Q-channel input signals, correlation energies (E0, E1, . . . ) for every said Walsh number are obtained from outputs after Hadamard Transform processing, the maximum correlation energy among these correlation energies is selected, and the signal corresponding to the Walsh number corresponding to this is demodulated as a received signal, having:

a reliability computing means for computing the certainty of the value of each correlation energy as the reliability for the correlation energy for every said Walsh number, a correcting means for acquiring a corrected correlation energy by introducing said corresponding reliabilities with respect to said correlation energies to obtain corrected correlation energies, and a maximum energy selecting means for selecting said maximum correlation energy from among obtained corrected correlation energies by using said corrected correlation energies.

45. A demodulation apparatus as set forth in claim 44, wherein a combining means for collecting and combining said corrected correlation energies obtained at all of said demodulators for every Walsh number when said demodulation is carried out by a finger demodulation unit comprising a plurality of demodulators connected to each other in parallel is provided in a front stage of said maximum energy selecting means.

46. A demodulation circuit as set forth in claim 44, wherein:

said reliability computing means has a reliability calculating unit and the reliability calculating unit receives as its inputs an I-channel correlation electric power (Ei) and a Q-channel correlation electric power (Eq) obtained after said Hadamard Transform for every said Walsh number, calculates the receiving phase angle from values-of said I-channel and Q-channel correlation electric powers for each two consecutive Walsh symbol times, and outputs said reliability based on the obtained receiving phase angle.

47. A demodulation circuit as set forth in claim 46, wherein the phase difference angle between obtained two said receiving phase angles is calculated, and said reliability is output based on the phase difference angle.

48. A demodulation circuit as set forth in claim 47, wherein said reliability is computed based on said phase difference angle for every said Walsh number, and the maximum reliability among the computed reliabilities is output as said reliability.

49. A demodulation circuit as set forth in claim 47, wherein where said phase difference angle is $\Delta\Phi$, said reliability is computed by the phase difference angle normalized by (180 deg−$|\Delta\Phi|$)/180 deg.

50. A demodulation circuit as set forth in claim 44, wherein said reliability computing means has a reliability calculating unit, and said reliability calculating unit contains a receiving phase angle creation circuit which receives as its inputs the I-channel correlation electric power (Ei) and the Q-channel correlation electric power (Eq) obtained after said Hadamard Transform for every said Walsh number and creates the receiving phase angle from values of said I-channel and Q-channel correlation electric powers.

51. A demodulation circuit as set forth in claim 44, wherein said reliability computing means has a reliability calculating unit, and said reliability calculating unit contains a signal transition circuit which receives as its inputs the I-channel correlation electric power (Ei) and the Q-channel correlation electric power (Eq) obtained after said Hadamard Transform and acquires the receiving phase angle for each two consecutive Walsh symbol times.

52. A demodulation circuit as set forth in claim 51, wherein said signal transition circuit comprises cascade connected flip-flops.

53. A demodulation circuit as set forth in claim 44, wherein said reliability computing means has the reliability calculating unit, and said reliability calculating unit contains a subtractor which receives as its input two receiving phase angles created for each two consecutive Walsh symbol times from values of the I-channel correlation electric power (Ei) and the Q-channel correlation electric power (Eq) obtained after said Hadamard Transform, takes the difference between them, and outputs the same as the phase difference angle.

54. A demodulation circuit as set forth in claim 44, wherein provision is further made of an absolute value circuit for taking the absolute value of said phase difference angles.

55. A demodulation circuit as set forth in claim 44, wherein said reliability computing means has a reliability calculating unit, and said reliability calculating unit contains a reliability calculating circuit which acquires the receiving phase angle created from values of the I-channel correlation electric power (Ei) and the Q-channel correlation electric power (Eq) obtained after said Hadamard Transform for each two consecutive Walsh symbol times, acquires the phase difference angle as the difference between them, and calculates the reliability based on the phase difference angle.

56. A demodulation circuit as set forth in claim 55, wherein said reliability calculating circuit calculates said reliability by:

(180 deg−$|\Delta\Phi|$)/180 deg where said phase difference angle is $\Delta\Phi$.

57. A demodulation circuit as set forth in claim 44, wherein said reliability computing means has a reliability calculating unit, and said reliability calculating unit contains a maximum reliability selecting circuit which acquires two receiving phase angles created for each two consecutive Walsh symbol times from values of the I-channel correlation electric power (Ei) and the Q-channel correlation electric power (Eq) obtained-after said Hadamard Transform for every said Walsh number, selects the maximum reliability among reliabilities for every Walsh number computed based on the phase difference angle obtained by taking the difference between them, and outputs said reliability to be sought.

58. A demodulation circuit as set forth in claim 44, wherein said reliability computing means comprises:

a first reliability calculating unit which acquires two receiving phase angles created for each of the present Walsh symbol time and the Walsh symbol time preceding this from values of the I-channel correlation electric power (Ei) and the Q-channel correlation electric power (Eq) obtained after said Hadamard Transform for every said Walsh number, calculates the first reliability based on the first phase difference angle between these receiving phase angles, and outputs. the same, a second reliability calculating unit which acquires two receiving phase angles created for each of the present Walsh symbol time and the Walsh symbol time following this from values of the I-channel correlation electric power (Ei) and the Q-channel correlation electric power (Eq) obtained after said Hadamard Transform for every said Walsh number, calculates the second reliability based on the second phase difference angle between these receiving phase angles, and outputs the same, and a processing means which performs predetermined processing with respect to said first reliability and said second reliability and outputs said reliability to be sought.

59. A demodulation circuit as set forth in claim 58, wherein said processing means is an average circuit for taking the average value of said first reliability and said second reliability.

60. A demodulation circuit as set forth in claim 58, wherein said processing means is a maximum value selecting unit for selecting a larger one between said first reliability and said second reliability.

61. A demodulation circuit as set forth in claim 47, wherein said reliability calculating unit contains a weighting circuit that makes the reliability smaller as said phase difference angle becomes larger and makes the reliability larger as the phase difference angle becomes smaller.

62. A demodulation circuit as set forth in claim 55, wherein said reliability calculating unit contains a weighting circuit that makes the reliability smaller as said phase difference angle becomes larger and makes the reliability larger as the phase difference angle becomes smaller.

63. A demodulation circuit as set forth in claim 57, wherein said reliability calculating unit contains a weighting circuit that makes the reliability smaller as said phase difference angle becomes larger and makes the reliability larger as the phase difference angle becomes smaller.

64. A demodulation circuit as set forth in claim 58, wherein said reliability calculating unit contains a weighting circuit that makes the reliability smaller as said phase difference angle becomes larger and makes the reliability larger as the phase difference angle becomes smaller.

65. A demodulation circuit as set forth in claim 47, wherein said reliability calculating unit contains a frequency difference compensating unit for compensating for said phase difference angle by the frequency difference between a received reference carrier frequency and a reference carrier frequency on the transmission side.

66. A demodulation circuit as set forth in claim 55, wherein said reliability calculating unit contains a frequency difference compensating unit for compensating for said phase difference angle by the frequency difference between a received reference carrier frequency and a reference carrier frequency on the transmission side.

67. A demodulation circuit as set forth in claim 57, wherein said reliability calculating unit contains a frequency difference compensating unit for compensating for said phase difference angle by the frequency difference between a received reference carrier frequency and a reference carrier frequency on the transmission side.

68. A demodulation circuit as set forth in claim 58, wherein said reliability calculating unit contains a frequency difference compensating unit for compensating for said phase difference angle by the frequency difference between a received reference carrier frequency and a reference carrier frequency on the transmission side.

69. A demodulation circuit as set forth in claim 46, wherein said reliability calculating unit contains a reliability correcting unit which calculates the compensated reliability based on said correlation energy at every Walsh symbol time detected for every said Walsh number and further introduces the compensated reliability with respect to said reliability.

70. A demodulation circuit as set forth in claim 69, wherein said reliability correcting unit selects the maximum correlation energy among said correlation energies detected for every said Walsh number one Walsh symbol time before said correlation energy to be detected at the present Walsh symbol time and outputs the value of the ratio of the correlation energy for every Walsh number with respect to the maximum correlation energy as said compensated reliability.

71. A demodulation circuit as set forth in claim 69, wherein said reliability compensating unit selects the maximum correlation energy among said correlation energies detected, for every said Walsh number, after one Walsh symbol time continuing from said correlation energy to be detected at the present Walsh symbol time and outputs the value of the ratio of the correlation energy for every Walsh number with respect to the maximum correlation energy as said compensated reliability.

72. A demodulation circuit as set forth in claim 69, wherein said reliability calculating unit is provided with a feedback unit for applying said corrected correlation energy as said correlation energy to be applied to said reliability compensating unit.

73. A demodulation circuit as set forth in claim 69, wherein provision is made of an energy combining unit for combining said correlation energies obtained by collection from all of said demodulators when said demodulation is carried out by a finger demodulating unit comprising a plurality of demodulators connected to each other in parallel, and the combined correlation energy from the energy combining unit is input to said reliability compensating unit.

74. A demodulation circuit as set forth in claim 46, wherein provision is made of a reliability optimizing means for selecting the optimum reliability by inputting said reliabilities obtained by collection from all of said demodulators in correspondence with said Walsh numbers, and further multiplying the same with said corrected correlation energy in correspondence with the Walsh numbers when said demodulation is carried out by a finger demodulating unit comprising a plurality of demodulators connected to each other in parallel.

75. A demodulation circuit as set forth in claim 73, wherein said reliability optimizing means comprises a reliability decision unit for deciding the optimum reliability based on said reliabilities input in correspondence with said Walsh numbers and a multiplier unit for further multiplying the reliability decided by the reliability decision unit to said corrected correlation energies in correspondence with said Walsh numbers in the front stage of said maximum energy selecting means.

76. A demodulation circuit as set forth in claim 74, wherein said reliability decision unit comprises the average circuit for taking the average value of said reliabilities obtained by collection from all of said demodulators.

77. A demodulation circuit as set forth in claim 74, wherein said reliability decision unit comprises a comparing circuit for finding the second largest corrected correlation energy among said corrected correlation energies produced at said demodulators and a selecting circuit for selecting the reliability from the demodulator producing the second largest corrected correlation energy found by said comparing circuit among said reliabilities obtained by collection from said demodulators.

78. A demodulation circuit as set forth in claim 76, wherein provision is further made of a comparing/selecting means which defines said reliability from the demodulator producing said second largest corrected correlation energy as said optimum reliability only when the first largest corrected correlation energy among said corrected correlation energies produced at said demodulators is larger than the predetermined set value and sets reliability=1 as said optimum. reliability when the first largest corrected correlation energy is smaller than the set value.

79. A demodulation circuit as set forth in claim 77, wherein provision is further made of a multiplier for multiplying the second largest corrected correlation energy by $\alpha$ ($\alpha>1$) among said corrected correlation energies and the $\alpha$ times output of the multiplier is defined as said set value.

80. A demodulation circuit as set forth in claim 44, wherein provision is further made of a thinning means for performing the processing at said reliability computing means and said correcting means only for Walsh numbers corresponding to m number of correlation energies from the first largest correlation energy among correlation energies of the Walsh numbers to the m-th (integer of $1<m<64$) largest correlation energy among said Walsh numbers.

\* \* \* \* \*